(12) United States Patent
Taylor et al.

(10) Patent No.: US 8,456,571 B1
(45) Date of Patent: Jun. 4, 2013

(54) INTEGRATED LIVE VIDEO PRODUCTION SYSTEM

(75) Inventors: Benjamin Taylor, Hollis, NH (US); David Acker, Sudbury, MA (US)

(73) Assignee: Broadcast Pix, Inc., Billerica, MA (US)

( * ) Notice: Subject to any disclaimer, the term of this patent is extended or adjusted under 35 U.S.C. 154(b) by 1427 days.

(21) Appl. No.: 12/069,918

(22) Filed: Feb. 13, 2008

Related U.S. Application Data

(63) Continuation-in-part of application No. 11/789,452, filed on Apr. 24, 2007, now Pat. No. 7,903,903, which is a continuation-in-part of application No. 10/783,944, filed on Feb. 20, 2004, now Pat. No. 7,526,568.

(60) Provisional application No. 60/901,456, filed on Feb. 14, 2007, provisional application No. 60/794,343, filed on Apr. 24, 2006, provisional application No. 60/901,456, filed on Feb. 14, 2007.

(51) Int. Cl.
*H04N 5/225* (2006.01)

(52) U.S. Cl.
USPC .......................................................... 348/445

(58) Field of Classification Search
USPC .................. 348/441, 445, 554, 556, 581
See application file for complete search history.

(56) References Cited

U.S. PATENT DOCUMENTS

| | | | |
|---|---|---|---|
| 4,853,784 A | 8/1989 | Abt et al. | |
| 4,947,254 A | 8/1990 | Abt et al. | |
| 4,947,256 A | 8/1990 | Wood et al. | |
| 6,281,941 B1 | 8/2001 | Windrem | |
| 6,437,834 B1 | 8/2002 | Tagami | |
| 7,034,886 B2 | 4/2006 | Ross et al. | |
| 2002/0024613 A1* | 2/2002 | Ross et al. | 348/445 |
| 2004/0218094 A1* | 11/2004 | Choi | 348/441 |
| 2005/0180858 A1* | 8/2005 | Halgas, Jr. | 417/53 |

* cited by examiner

*Primary Examiner* — Vivek Srivastava
*Assistant Examiner* — Aklil Tesfaye
(74) *Attorney, Agent, or Firm* — Muirhead and Saturnelli, LLC

(57) ABSTRACT

Techniques are described for performing aspect ratio transformation. Frames of image data from each of one or more input sources are received. A first set of one or more options, including an input aspect ratio, is associated with a first input source. A set of control parameters is determined for each frame from the first input source in accordance with said first input aspect ratio and an output aspect ratio. Each frame from the first input source is processed in accordance with the control parameters for that frame. The processing includes processing a first image from said first input source having said first input aspect ratio to generate a second image having the output aspect ratio. The processing includes converting the first image having the input aspect ratio to the second image having the output aspect ratio if the first input aspect ratio is different from the output aspect ratio.

25 Claims, 59 Drawing Sheets

3800

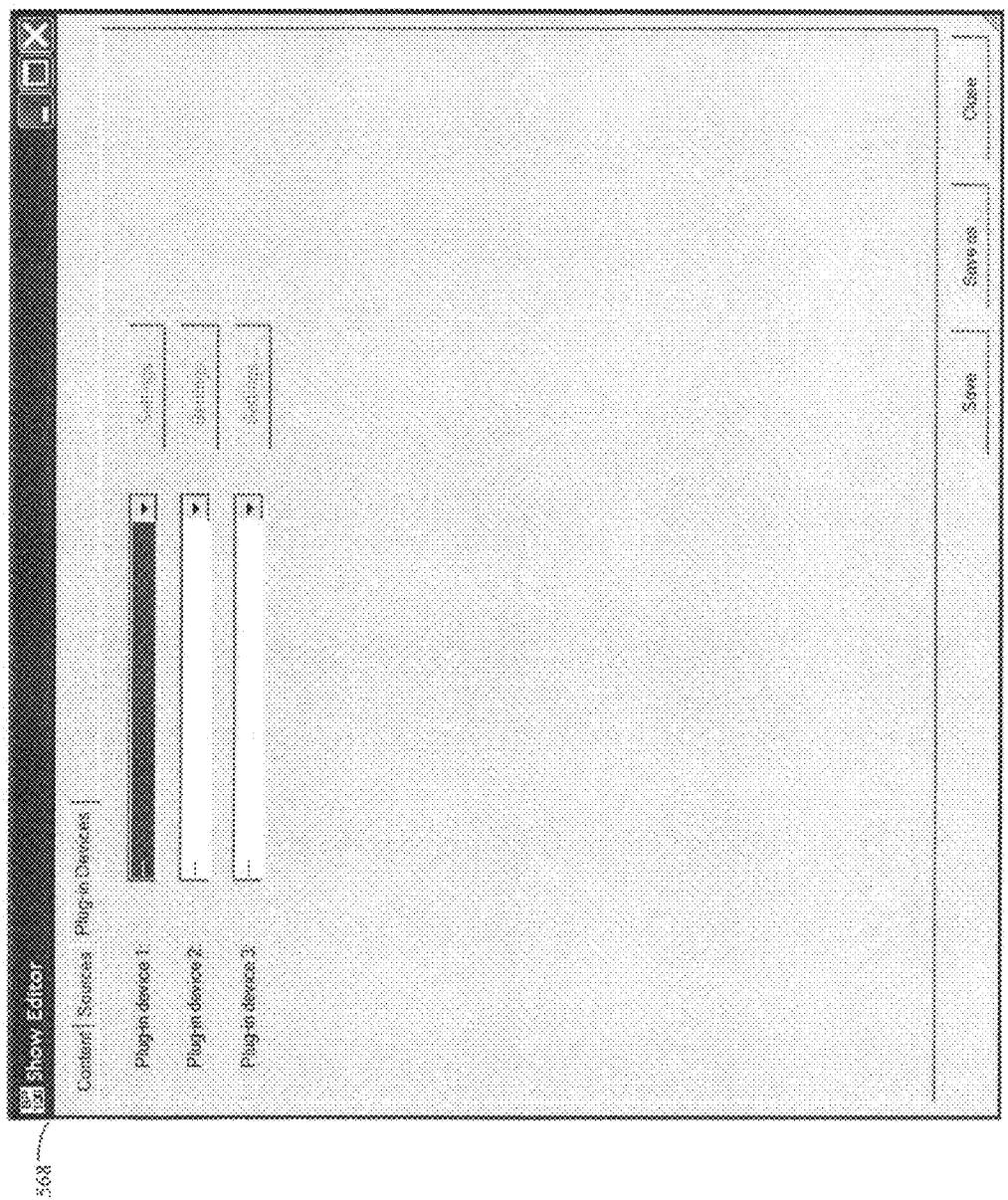

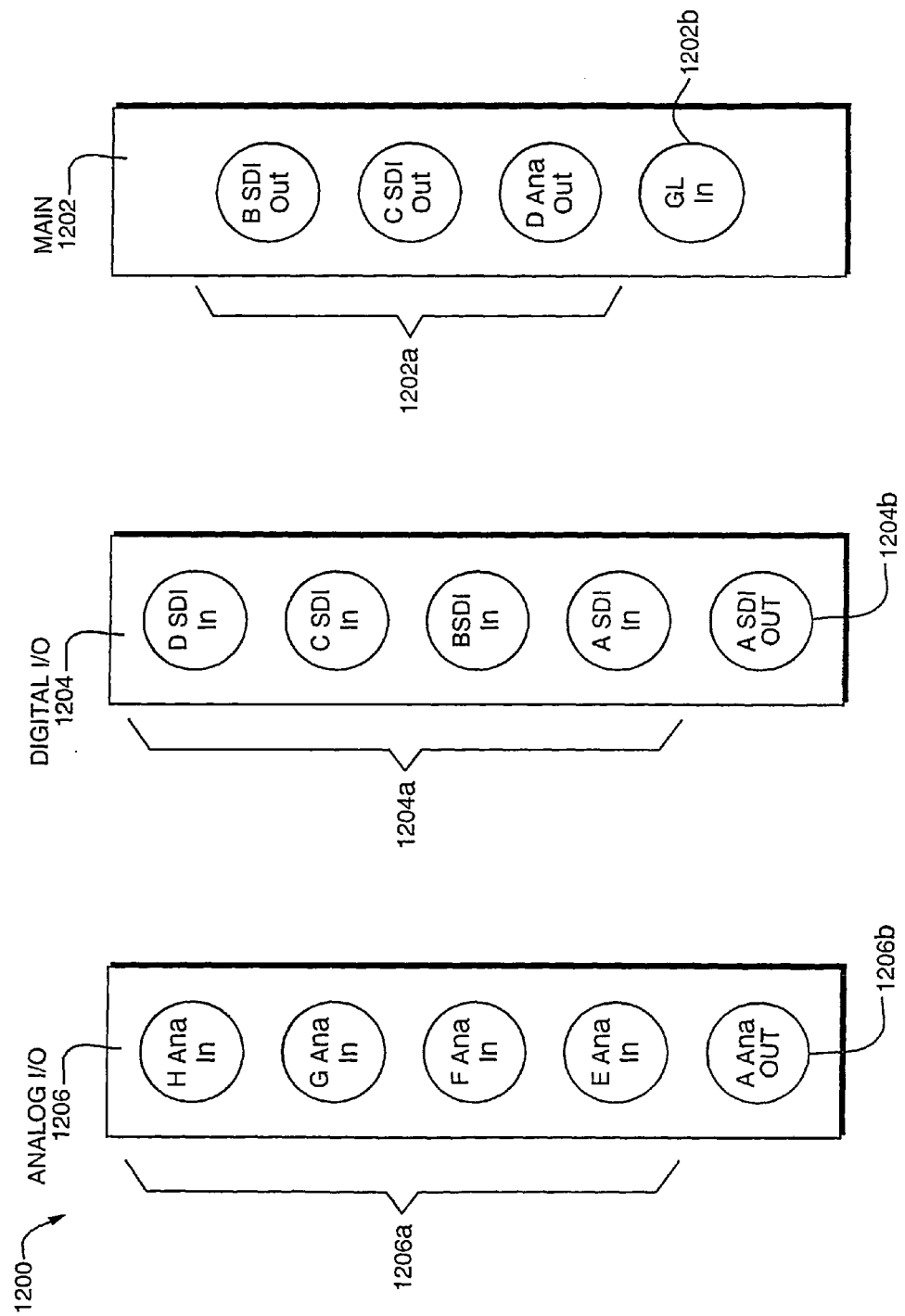

| 2002 | 2004 | 2006 Combiner 1 | 2008 Combiner 2 | 2010 Combiner 3 |
|---|---|---|---|---|
| Layer | Assignment | Out 1(Program) | Out2 (preview) | Out3(Aux/cleanfeed) |
| 1 | Program background | 100 | | C:100 |
| 2 | Program foreground/preview | X | X | C:X |
| 3 | Key1 | X | X | C:X |
| 4 | Key2 | X | X | C:X |
| 5 | Key3 | X | X | |
| 6 | Aux1 | | | A:100 |
| 7 | Aux2 | | | |
| 8 | Aux3 | | | |
| 9 | Aux4 | | | |

FIGURE 30

| 2052 Layer Priority | 2054 Assignment/ Source | 2056 Comb 1 Out 1 Program | 2058 Comb 2 Out 2 Preview | 2060 Comb 3 Out 3 Aux 1 | 2062 Comb 4 Out 4 Program | 2064 Comb 5 Out 5 Cleanfeed | 2066 Comb 6 Out 6 Preview |
|---|---|---|---|---|---|---|---|
| 1 | Program Background | 100 | 0 | 0 | 100 | 100 | 0 |
| 2 | Program Foreground | 0-100 | 100 | 0 | 0-100 | 0-100 | 100 |
| 3 | Aux 1 | 0 | 0 | 100 | 0 | 0 | 0 |
| 4 | Aux 2 | 0 | 0 | 0 | 0 | 0 | 0 |
| 5 | Aux 3 | 0 | 0 | 0 | 0 | 0 | 0 |
| 6 | Aux 4 | 0 | 0 | 0 | 0 | 0 | 0 |
| 7 | Key 1 | 0-100 | 0-100 | 0 | 0-100 | 0-100 | 0-100 |
| 8 | Key 2 | 0-100 | 0-100 | 0 | 0-100 | 0-100 | 0-100 |
| 9 | Key 3 | 0-100 | 0-100 | 0 | 0-100 | 0 | 0-100 |

| Input source 1 | Input or source Aspect ratio | Aspect ratio treatment | Justification | .. | Input or source Aspect ratio | Aspect ratio treatment | Justification | .. |
|---|---|---|---|---|---|---|---|---|
| | { User specified for input source 1 } | | | | { User specified for input source n } | | | |
| ... .. | | | | | | | | |
| Input source n | | | | | | | | |

INTEGRATED LIVE VIDEO PRODUCTION SYSTEM

CROSS REFERENCES TO RELATED APPLICATIONS

This application claims priority to U.S. Provisional Patent Application No. 60/901,456, filed on Feb. 14, 2007, TECHNIQUES FOR VIDEO PROCESSING USING ASPECT RATIO MANAGEMENT, and is a continuation-in-part of U.S. patent application Ser. No. 11/789,452, filed on Apr. 24, 2007, U.S. Pat. No. 7,903,903, INTEGRATED LIVE VIDEO PRODUCTION SYSTEM, which is a continuation in part of U.S. patent application Ser. No. 10/783,944, filed on Feb. 20, 2004, U.S. Pat. No. 7,526,568, Integrated Live Video Production System, and claims priority to U.S. Provisional Patent Application No. 60/794,343, filed on Apr. 24, 2006, PC-BASED LIVE TELEVISION PRODUCTION SYSTEM, and U.S. Provisional Patent Application No. 60/901,456, filed on Feb. 14, 2007, TECHNIQUES FOR VIDEO PROCESSING USING ASPECT RATIO MANAGEMENT, all of which are incorporated by reference herein.

BACKGROUND

1. Technical Field

This application generally relates to television production, and more particularly to an integrated television production system.

2. Description of Related Art

Existing control rooms and television production systems as may be used in connection with a live television broadcast, for example, from a television studio, of a sporting event, from a church, or from a corporate studio, typically include a collection of components, such as a tape deck, a switcher, one or more cameras, various data stores for graphics, clips, logos and the like. Each component may have its own control surface. To operate such traditional configurations may require a team of operators, such as a switcher operator, a tape deck operator, a graphics operator, and a director to direct all other operators to perform the needed operations at the correct times.

Existing systems may have a variety of drawbacks. For example, existing systems may be characterized as cumbersome since they are generally designed for use by a team of operators. Additionally, there may be instances where only a single operator is available thereby forcing the single operator may attempt to use the multiple controls for the collection of devices. Existing systems can be costly in terms of equipment, staffing, and space required for use during operation.

Thus, it may be desirable to provide an efficient and integrated television production control system which is generally less costly than the foregoing traditional system. It may also be desirable to have such a system be scalable for ease of use and control in accordance with a varying numbers of operators. It may also be desirable that such a system be easily configurable for use in different environments and applications.

SUMMARY OF THE INVENTION

In accordance with one aspect of the invention is a method for performing aspect ratio transformation comprising: receiving frames of image data from each of one or more input sources, wherein a first set of one or more options is associated with a first input source, said first set including a first input aspect ratio of said first input source; determining, for each frame received from said first input source, a set of control parameters, said determining being performed in accordance with said first input aspect ratio and an output aspect ratio; and performing processing of said each frame in accordance with said set of control parameters, said processing including first processing of a first image from said first input source having said first input aspect ratio to generate a second image having said output aspect ratio, wherein, said first processing includes converting said first image having said first input aspect ratio to said second image having said output aspect ratio if said first input aspect ratio is different from the output aspect ratio, and otherwise, as indicated by said set of control parameters, said first processing does not include performing said converting. The step of said determining said set of control parameters may be performed by code executing on a central processor of a computer system for each frame time and said set of control parameters may be transmitted to a component of the computer system to perform said performing using said set of control parameters. The first set of one or more options may include an aspect ratio treatment option and a justification option, said aspect ratio treatment option specifying a treatment option affecting how to transform frames from the first input source in said performing when converting from said first input aspect ratio to a different output aspect ratio, said justification option affecting how an image is positioned with respect to an output frame in said performing when converting from said first input aspect ratio to a different output aspect ratio. The step of receiving may receive image data from each of a plurality of input sources, wherein a different set of options is specified for each of said plurality of input sources, each of said different set of options including an input aspect ratio of said each input source. The step of said determining said set of control parameters may include performing processing to determine the combined effect of performing aspect ratio transformation processing for converting an image having said first input aspect ratio from said first input source to an image having said output aspect ratio when said first input aspect ratio and said output aspect ratio differ and one or more other video effects applied to said image from said first input source. The step of said determining may determine control parameters including one or more scaling parameters, one or more position parameters, and one or more cropping parameters. The input sources may include at least one of previously stored image data, data from a file stored on a storage device of a computer system, and previously stored video data. The aspect ratio treatment option specified for said first input source may be selected from one of a plurality of options, said plurality of options including a box treatment option, a cropping treatment option, a 14:9 intermediate aspect ratio treatment option, and an anamorphic treatment option. The justification option specified for said first input source may be selected from one of a plurality of justification options, said plurality of justification options indicating whether to justify an image at a top, middle or bottom portion of an output frame and whether to justify an image at a left, center, or right portion of an output frame. The method may also include: defining a plurality of sets of options, each of said plurality of sets of options being associated with each of a plurality of input sources, each of said plurality of sets of options including an input aspect ratio for images received from said each input source; selecting one of said plurality of input sources associated with one of said plurality of sets of options, wherein said determining and said performing processing are performed in accordance with said one set of options; and selecting a different one of said plurality of input sources to be used in place of said selected one of said plurality of input sources, and wherein, in response to said selecting, said determining and said performing processing are performed in accordance with a different one of said plurality of sets of options associated with said different one of said plurality of input sources.

In accordance with another aspect of the invention is a method for performing aspect ratio transformation comprising: receiving a plurality of frames of image data from a plurality of input sources each having an associated input aspect ratio; performing, for each frame of image data received from each of said plurality of input sources, processing to mathematically combine one or more video effects to be applied to each of said plurality of input sources, wherein said video effects include converting from an input aspect ratio for said each input source to a first output aspect ratio only when said input aspect ratio and said first output aspect ratio differ, and wherein said video effects include converting from said input aspect ratio for said each input source to a second output aspect ratio only when said input aspect ratio and said second output aspect ratio differ; determining, for each frame from each of said plurality of input sources in accordance with said performing, a first set of control parameters in accordance with an input aspect ratio of said each frame and said first output aspect ratio, and a second set of control parameters in accordance with said input aspect ratio of said each frame and said second output aspect ratio; determining a third set of control parameters and a fourth set of control parameters, each of said third set and said fourth set used to combine one or more output frames; processing each of said plurality of frames from each of said plurality of input sources to generate a corresponding one of the output frames having said first output aspect ratio in accordance with the first set of control parameters; processing each of said plurality of frames from each of said plurality of input sources to generate a corresponding one of the output frames having said second output aspect ratio in accordance with the second set of control parameters; and combining a first portion of the output frames having said first output aspect ratio into a first result frame in accordance with said third set of control settings; and combining a second portion of the output frames having said second output aspect ratio into a second result frame in accordance with said fourth set of control settings. Each of said plurality of input sources may be associated with one of a plurality of sets of options, each of said plurality of sets of options including an input aspect ratio of said each input source. Each of said plurality of sets of options may include an aspect ratio treatment option and a justification option, said aspect ratio treatment option specifying a treatment option affecting how to transform frames of said each input source when converting from said input aspect ratio to a different output aspect ratio, said justification option affecting how an image is positioned with respect to an output frame when converting frames from said each input source having said input aspect ratio to a different output aspect ratio. At least one of said plurality of input sources may have an input aspect ratio different from another input aspect ratio of at least one other of said plurality of input sources. The step of said performing, said determining a first set of control parameters and a second set of control parameters, and said determining a third set and a fourth set of control parameters may be performed by code executed on a computer system, and the method may also include: communicating the first set of control parameters, said second set of control parameters, said third set of control parameters, and said fourth set of control parameters to a component included in the computer system, said component performing said processing to generate a corresponding one of the output frames having said first output aspect ratio, said processing to generate a corresponding one of the output frames having said second output aspect ratio, said combining said first portion of the output frames, and said combining said second portion of the output frames.

In accordance with another aspect of the invention is a system comprising: means for receiving one or more frames of one or more input sources for a frame time, each of said one or more input sources received on an associated input line; first computer readable memory including first instructions thereon to determine a set of one or more control parameters for each frame associated with each of said input sources for the frame time, said set of one or more control parameters used to control processing performed by a first component programmed to apply one or more video effects to a frame from said each input source, said one or more video effects for said each input source including converting a first frame received from said each input source having a first input aspect ratio to a second frame having an output aspect ratio when said first input aspect ratio and said output aspect ratio differ, wherein said set of one or more control parameters associated with said each input source are determined in accordance with said first input aspect ratio and said output aspect ratio, and the one or more control parameters include scaling and positioning parameters; a processor that executes said first instructions; said first component configured to perform processing in accordance with a set of control parameters for each of one or more input sources, said processing including scaling and positioning of the one or more frames from the one or more input sources for a frame time using the scaling and positioning parameters for each of the one or more frames to generate one or more corresponding frames having said output aspect ratio; and means for communicating the set of control parameters for each of the one or more frames associated with one of the input sources to the first component. The first component may generate a first component output having said output aspect ratio, and the system may further comprise: a second component that receives as an input said first component output having a first format and generates a second component output having a second format in accordance with an output device, said second component performs processing including converting said first component output having said first format to said second component output having said second format, said first format having a first set of pixel dimensions and being one of interlaced or progressive, said second format having a second set of pixel dimensions and being one of interlaced or progressive. The first component may be selectively enabled or disabled to run in a low latency mode. When said first component is enabled to run in low latency mode, said first component may perform processing in accordance with an external timing delay determined in accordance with an amount of time it takes to convert a frame from a format of an input source to another format used when communicating with said first component. The first instructions may determine a first set of control parameters for a first of said one or more input sources in accordance with a first input aspect ratio of said first input source and said output aspect ratio. The first instructions may determine a second set of control parameters for said first input source in accordance with said first input aspect ratio and a second output aspect ratio. The first component may generate, from a first input frame from said first input source and in accordance with said first set of control parameters, a first output frame having said output aspect ratio in accordance with said first set of control parameters and, said first component may generate, from said first input frame and in accordance with said second set of control parameters, a second output frame having said second output aspect ratio. The first instructions of said first computer readable memory may include instructions to determine, for each frame associated with each of said input sources for the frame time, a set of one or more control parameters used to control processing performed by said second component; and the system may further include: means for communicating a set of control parameters for each of the one or more frames associated with one of the input sources to the second component; and the first instructions may determine a first set of control parameters for a first of said one or more input sources in accordance with a first input aspect ratio of said first input source and said output aspect ratio, said first instructions may determine a second set of control parameters for said first input source in accordance with said first input aspect ratio and a second output aspect ratio, said first component may generate, in accordance with said first set of control parameters, a first output frame as said first component output having said output aspect ratio, said second component may process said first output frame in accordance with said second set of control parameters to generate a second output frame as said second component output having said second output aspect ratio.

In accordance with another aspect of the invention is a system comprising: a plurality of input sources each having a set of options associated therewith, said set of options for each of said plurality of input sources including an input aspect ratio of said each input source; first instructions stored on a computer readable medium for determining, for each frame from each of said plurality of input sources for a frame time, a set of control parameters used to control a first component that applies one or more video effects to said each frame, wherein, if said input aspect ratio of said each frame differs from an output aspect ratio, said set of control parameters includes scaling and positioning parameters incorporating an aspect ratio conversion of said each frame from said input aspect ratio to said output aspect ratio, and if said input aspect ratio matches said output aspect ratio, said set of control parameters includes scaling and positioning parameters which do not incorporate aspect ratio conversion; means for communicating said set of control parameters for each of said plurality of input sources for one or more frame times to said first component; and said first component configured to perform processing in accordance with a set of control parameters for each frame from each of said plurality of input sources for a frame time, said processing including applying said one or more video effects to said each frame by performing scaling and positioning of said each frame in accordance with said scaling and positioning parameters included in said set of control parameters, wherein if said input aspect ratio of said each frame is different from said output aspect ratio, said processing includes performing scaling and positioning of said each frame incorporating aspect ratio conversion from said input aspect ratio to said output aspect ratio. The set of options for each of said plurality of input sources may be stored on a storage area, and said set of options for each of said plurality of input sources may include an aspect ratio treatment option and a justification option, said aspect ratio treatment option specifying a treatment option affecting how to transform frames of said each input source when converting from said input aspect ratio of said each input source to a different output aspect ratio, said justification option affecting how an image is positioned with respect to an output frame when converting frames from said each input source having said input aspect ratio to a different output aspect ratio. The control parameters may include one or more cropping parameters indicating a number of pixels to be removed from each row and each column relative to a side of an input frame.

In accordance with another aspect of the invention is a system comprising: means for receiving frames of image data from each of one or more input sources, wherein a first set of one or more options is associated with a first input source, said first set including a first input aspect ratio of said first input source; executable code stored on a computer readable medium for performing processing including determining, for each frame received from said first input source, a set of control parameters, said determining being performed in accordance with said first input aspect ratio and an output aspect ratio; a processor for executing said executable code; a first component that performs processing of said each frame in accordance with said set of control parameters, said processing by said first component including first processing of a first image from said first input source having said first input aspect ratio to generate a second image having said output aspect ratio, wherein, said first processing includes converting said first image having said first input aspect ratio to said second image having said output aspect ratio if said first input aspect ratio is different from the output aspect ratio, and otherwise, as indicated by said set of control parameters, said first processing does not include performing said converting; and means for communicating said set of control parameters to said first component. The control parameters may include scaling, positioning and cropping parameters.

BRIEF DESCRIPTION OF THE DRAWINGS

Features and advantages of the present invention will become more apparent from the following detailed description of exemplary embodiments thereof taken in conjunction with the accompanying drawings in which:

FIGS. 12 and 12A are examples of embodiments of a graphical user interface of a show editor;

FIGS. 21-25 are block diagrams of processing boards that may be included in an embodiment of a computer system using the techniques herein;

FIGS. 30 and 30A are an example of settings that may be specified in an embodiment;

FIG. 39 is an example illustrating information that may be defined in an embodiment for each input source for use in connection with automatic aspect ratio transformation processing;

DETAILED DESCRIPTION OF EMBODIMENT(S)

Figure 1:
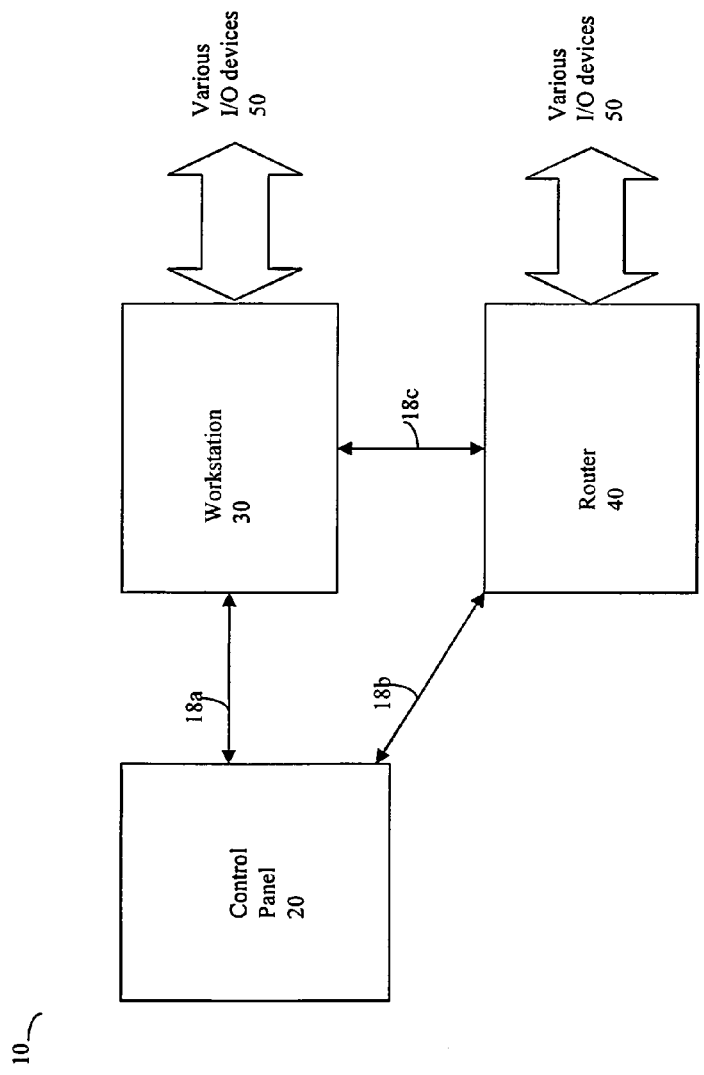
FIG. 1 is an example of an embodiment of a system according to the present invention.

Referring now to FIG. 1, shown is an example 10 of an embodiment of components that may be included in a system whose operation is described herein. The components of the system 10 may include a control panel 20, a workstation 30, a router 40, and one or more I/O devices 50. As will be described in following paragraphs, the components in the arrangement 10 may be included in an embodiment of a system used in connection with live television broadcasting as well as other applications. The components included in 10 may be characterized as an integrated system used, for example, in live video and/or audio production systems. Particular applications are described elsewhere herein in more detail. It should be noted that the components of 10 may be combined with other components not shown depending on the particulars of each embodiment and/or application.

The control panel 20 provides a switching capability for selecting between one or more of the various I/O devices 50. As shown in 10, the various I/O devices 50 may be connected to the control panel 20 through the router 40, and may also be connected, directly or indirectly, to the workstation 30. The control panel 20 is described in more detail elsewhere herein and may also provide, for example, for switching between other types of I/O sources that may be included in one or more data storage devices connected to the workstation 30, or on other data storage devices not shown in the system 10 on FIG. 1. Additionally, as will be described elsewhere herein, an embodiment of the control panel 20 may be implemented as a hard panel control device as well as via a soft panel control device. In connection with the soft panel control, the control panel may be displayed, for example, via a graphical user interface in a Windows-based environment on a computer display device.

During operation in a first mode in one embodiment, the control panel 20 may control operation of the I/O devices 50 and other I/O sources by issuing commands or requests using the workstation 30. The workstation 30 may channel the appropriate input source(s) to the appropriate output source(s), such as, for example, by interfacing with the router 40. In a second mode of operation, such as when the workstation 30 is offline with respect to the connection with the control panel 20, the control panel 20 may use a second mode of operation and directly interface with the router 40. The first mode may be characterized as a normal mode of operation. The second mode of operation may be characterized as a secondary or backup mode of operation. Both of these modes of operation are described elsewhere herein in more detail.

The workstation 30 may include hardware, such as a computer processor, and/or software, to perform processing associated with production as well as pre-production processing. For example, in connection with live production, a control selection message may be sent to the workstation 30 from the control panel 20. The workstation 30 may then control selection of the various I/O devices and associated streams in accordance with the message received from the control panel 20 and the current state of the control panel. The control panel 20 may send a message to the workstation 30 causing an input video stream to be displayed on a first output device, such as a monitor, connected to the router 40. The input video stream may come from, for example, a file stored on a data storage device of the workstation, a camera directly connected to the workstation 30, a camera also connected to the router 40, and the like. The foregoing are just some examples of how the components of the example 10 may be used in production. More details of the workstation 30 are described elsewhere herein.

The workstation 30 may be used in connection with pre-production processing. An embodiment of the workstation 30 may include, for example, pre-production software used to create and define shows, edit and store data, and the like. The results of pre-production processing may later be used in connection with live broadcasting or the production activities.

The one or more various I/O devices 50 may include, for example, tape recorders, microphones, video cameras, and the like. Additionally, as mentioned above, the control panel 20 may access, for example, still stores, logo stores, stored video and/or audio streams and animations, and the like, from data stores of the workstation 30. The foregoing I/O devices and data stores may be accessed during production, such as a live broadcast, as well as in connection with pre-production, such as in connection with editing.

An embodiment of the control panel 20 may include switcher functionality for switching between one or more I/O devices 50, and switching between other types of data stores or devices, such as may be included in, or connected to, the workstation 30. The control panel 20 may also provide for selection of special effects as well as program previewing, handling synchronous sources, such as video cameras and video tape recorders, as well as frame synchronizers for use in connection with untimed sources of input An embodiment may include a router 40 such as, for example, the Leitch Panecea Router. Particulars of the router used in an embodiment may be varied in accordance with the different types, number, and other characteristics of the I/O devices 50 included an embodiment of the system 10. In this embodiment, the router 40 may be characterized as a digital switcher interfacing with one or more digital type of devices. However, an embodiment of the system 10 may also include one or more I/O devices which are also analog devices. The analog devices may be connected to the router with or without an appropriate converter, such as an A/D or analog to digital or D/A converter placed therebetween, depending on the data stream direction. Similarly, other embodiments may include other system components such as video and/or audio embedders and/or de-embedders that may vary in accordance with the particular system and application. Some additional examples are described elsewhere herein. Such embedders and de-embedders are known to those of ordinary skill in the art such as those by, for example, AJA and Link.

It should be noted that an embodiment may include functionality of an embedder and/or demembedder with functionality of a router within a single component.

The workstation 30 may include any one of a variety of different computer processors in addition to the particular hardware and software described elsewhere herein in more detail. The workstation 30 in one embodiment may include, for example, a multi-stream Pinnacle TARGA 3000 board. The TARGA board, as will be described elsewhere herein in more detail, may be used in connection with the workstation 30 communicating with a router 40.

An embodiment of the workstation 30 may include pre-production software used offline, for example, in preparing elements to be included in a live broadcast. The pre-production software may be used, for example, to create graphics, assemble content, select devices for a show, and set up the switcher functionality of the control panel 20.

The components of the example 10 may communicate with each other and other components using one or more different communication mediums 18a, 18b and 18c. The communication mediums 18a-18c may be any one of a variety of network or other type of communication connections as known to those skilled in the art. The communication medium may be a network connection, bus, and/or other type of data link, such as a hardwire, wireless, or other connection known in the art. For example, the communication medium may be the Internet, an intranet, Ethernet, or other network or non-network connection(s) to facilitate communication as needed between the components of 10 and other components in accordance with the processing described herein.

It should be noted that the particulars of the hardware and software included in each of the components of 10, examples of which are described herein in more detail, may vary with each particular embodiment. Additionally, each of the components of 10 may all be located at the same physical site, or, alternatively, may also be located in different physical locations. The components of the example 10 and others included in a system may communicate with each other using any one or more different communication protocols that may vary in accordance with each embodiment. Some or all of the connections by which the components of 10 may communicate with each other and others may pass through other communication devices, such as switching equipment including, without limitation, a phone line, a repeater, a multiplexer or even a satellite.

Figure 2:
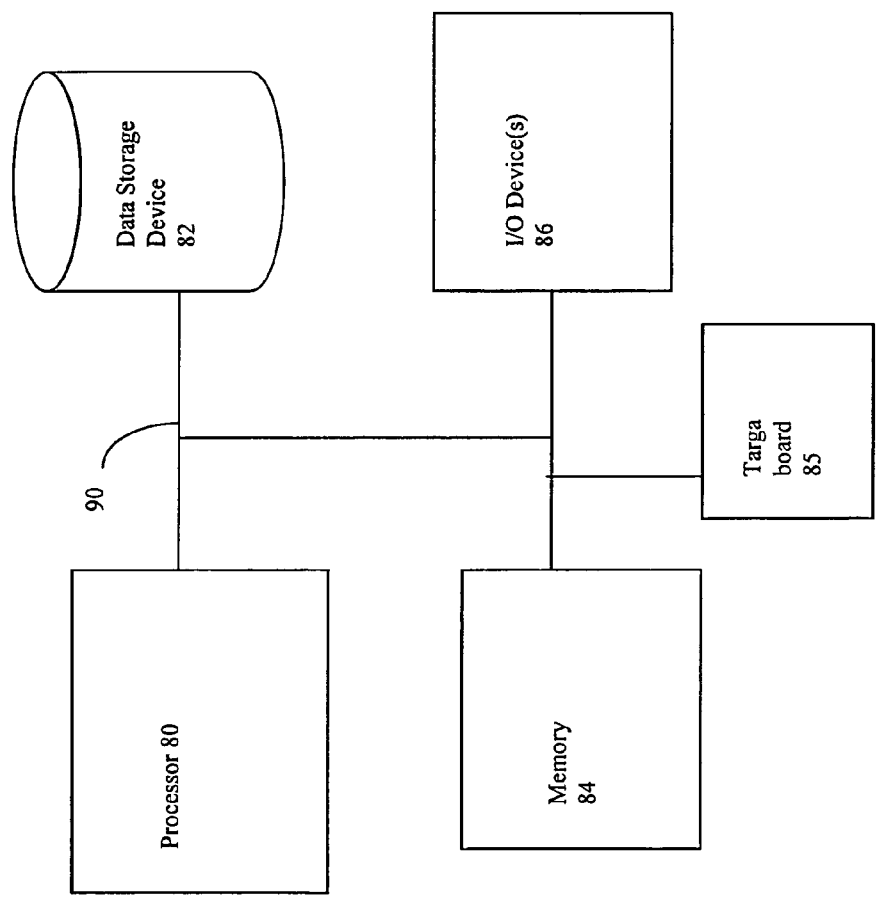
FIG. 2 is an example of hardware components that may be included in an embodiment of the workstation of the system of FIG. 1.

Referring now to FIG. 2, shown is an example of different hardware components that may be included in an embodiment of the workstation 30 previously described in connection with the system 10 of FIG. 1. It should be noted that components other than those depicted in FIG. 2 may be included within an embodiment of the workstation. The example 30 includes a processor 80, a TARGA board 85, a data storage device 82, memory 84, and one or more I/O devices 86.

The processor 80 of the workstation 30, and other processors that may be included in other components described elsewhere herein, may be any one or more of a variety of different commercially available, as well as proprietary, computer processors that are able to execute code to perform the functionality described herein. The processor 80 may be single or multi-processor system. The particular code may include, for example, code that performs pre-production processing or other processing described herein, interfaces with different components, and the like. The pre-production processing code may be stored, for example, on one or more data storage devices 82 such as a disk drive. Other code, such as lower-level code used to control devices, may also be stored in a read-only memory (ROM), a programmable ROM (PROM), and the like. As known to those of ordinary skill in the art, code may be loaded into memory 84, such as a random access memory (RAM) and executed by the processor 80. Data, such as a still store, video images, clips, and the like may be stored, for example, on the hard drive or other data storage device 82 of the workstation 30.

The data storage device 82 may include any number and type of data storage devices. For example, the data storage device 82 may include a single device, such as a disk drive, as well as a plurality of devices in a more complex configuration, such as with a storage area network and the like. Data may be stored, for example, on magnetic, optical, or silicon-based media. The particular arrangement and configuration may vary in accordance with the parameters and requirements associated with each embodiment. In one embodiment, data on the data storage device 82 may be accessed using logical device names or logical volumes. The logical volumes may or may not correspond to the actual data storage devices. For example, one or more logical volumes may reside on a single physical data storage device.

The embodiment 30 may also include one or more I/O devices 86 such as, for example, a keyboard, a mouse, a display device such as a monitor, and the like. Each of the components within the workstation 30 may communicate via any one or more of a variety of different communication connections 90 in accordance with the particular components included therein. For example, different components within the workstation 30 may communicate via a 64 bit, or other size, bus. It should be noted that the memory 84 may include, for example, read only memory (ROM), random access memory (RAM), or RAM and other types of memory that may be included in an embodiment of the system 30.

Figure 3:
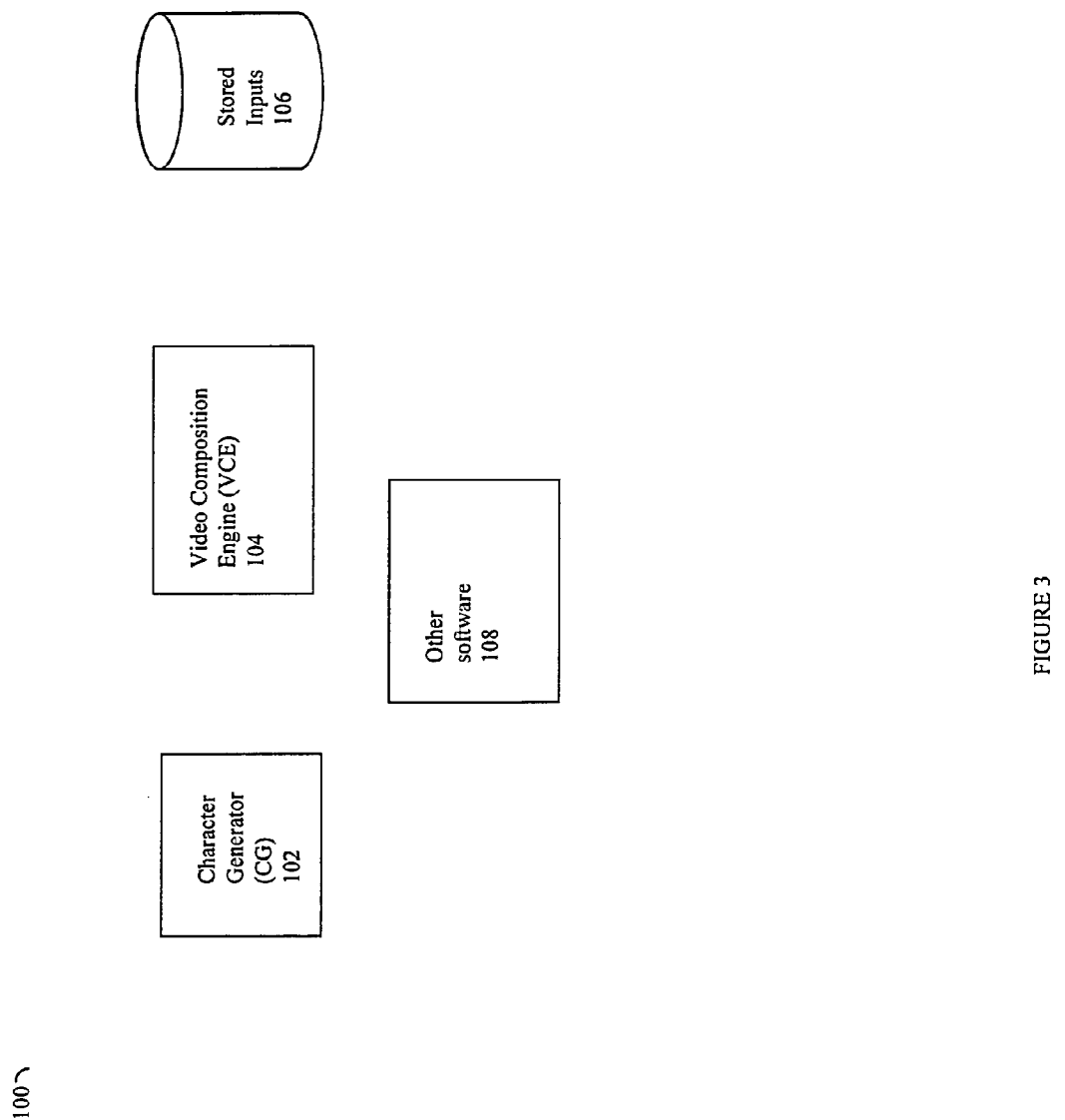
FIG. 3 is an example of software components that may be included an embodiment of the workstation of the system of FIG. 1.

Referring now to FIG. 3, shown is an example 100 of some of the software components that may be included within an embodiment of the workstation. In this example 100, the software components may include character generator (CG) 102, a video composition engine (VCE) 104, stored inputs 106, and other software 108.

The VCE 104 may be characterized as software that takes one or more source inputs and may be used in connection with producing the final image output. For example, the VCE may take as input sources from one or more cameras, a pre-stored title, and the like, and may produce as an output an image which is a composition of the one or more inputs stored for later production use. The VCE may also include the pre-production software as described elsewhere herein. The CG 102 may be used in creating of graphics, animations, and other files, for example, that may be stored within the inputs 106.

The stored inputs 106 may include, for example, clips, graphics, titles, logos and the like, that may be on a hard drive or other data storage device included in a workstation. The other software 108 may include, for example, any one or more operating systems and associated application software, such as the Microsoft Windows XP operating system and the Microsoft .Net Software, Internet Explorer or other browser, Flashplayer, lower level software such as device drivers to interface to the hardware, such as the TARGA board, and the like.

Figure 4:
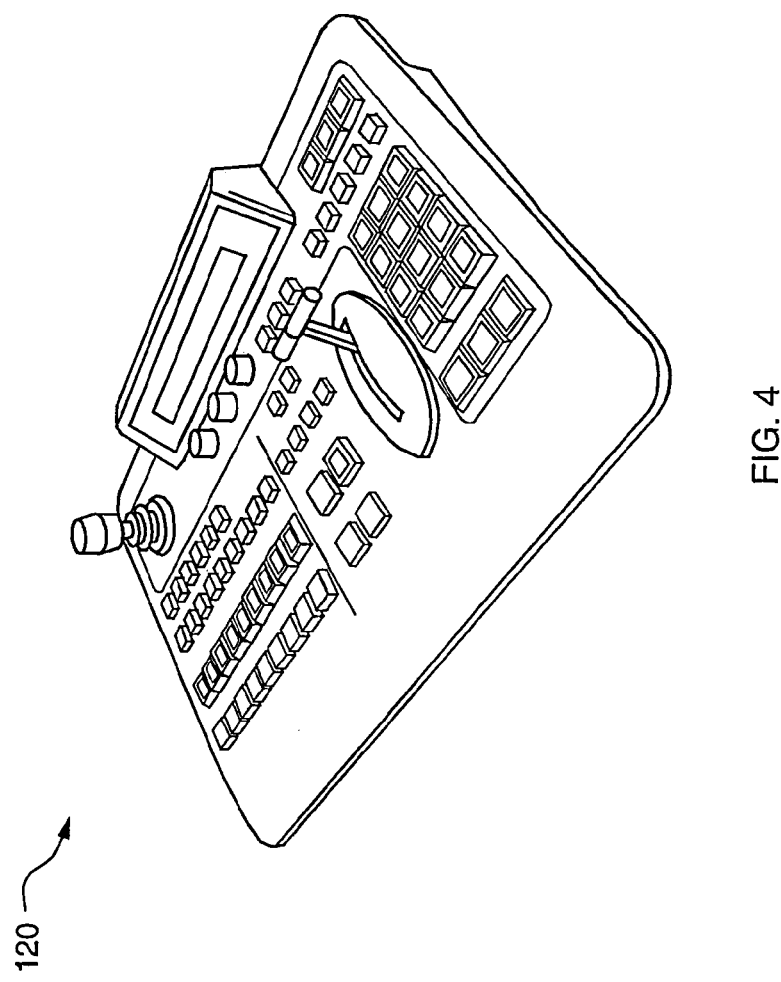
FIG. 4 is an example of an embodiment of a hard control panel.

Referring now to FIG. 4, shown is an example of an embodiment of the control panel previously described in connection with the components of FIG. 1. As also mentioned elsewhere herein, the control panel in an embodiment may be implemented as a hard control panel or a soft control panel. The control panel 120 of FIG. 4 is an example of an embodiment of a hard control panel. As will be illustrated in connection with subsequent figures, an embodiment of a hard control panel may include an interface design similar to that of a soft control panel that may be implemented, for example, as a graphical user interface using software.

It should be noted that although an embodiment may implement a hard control panel and a soft control panel with similar interfaces, an embodiment may also implement one or more of the foregoing using different interfaces. Additionally, although the embodiment shown in FIG. 1 includes a single control panel, as will be illustrated elsewhere herein, an embodiment may include one or more control panels each of which may be a hard control panel or a soft control panel.

Figure 5:
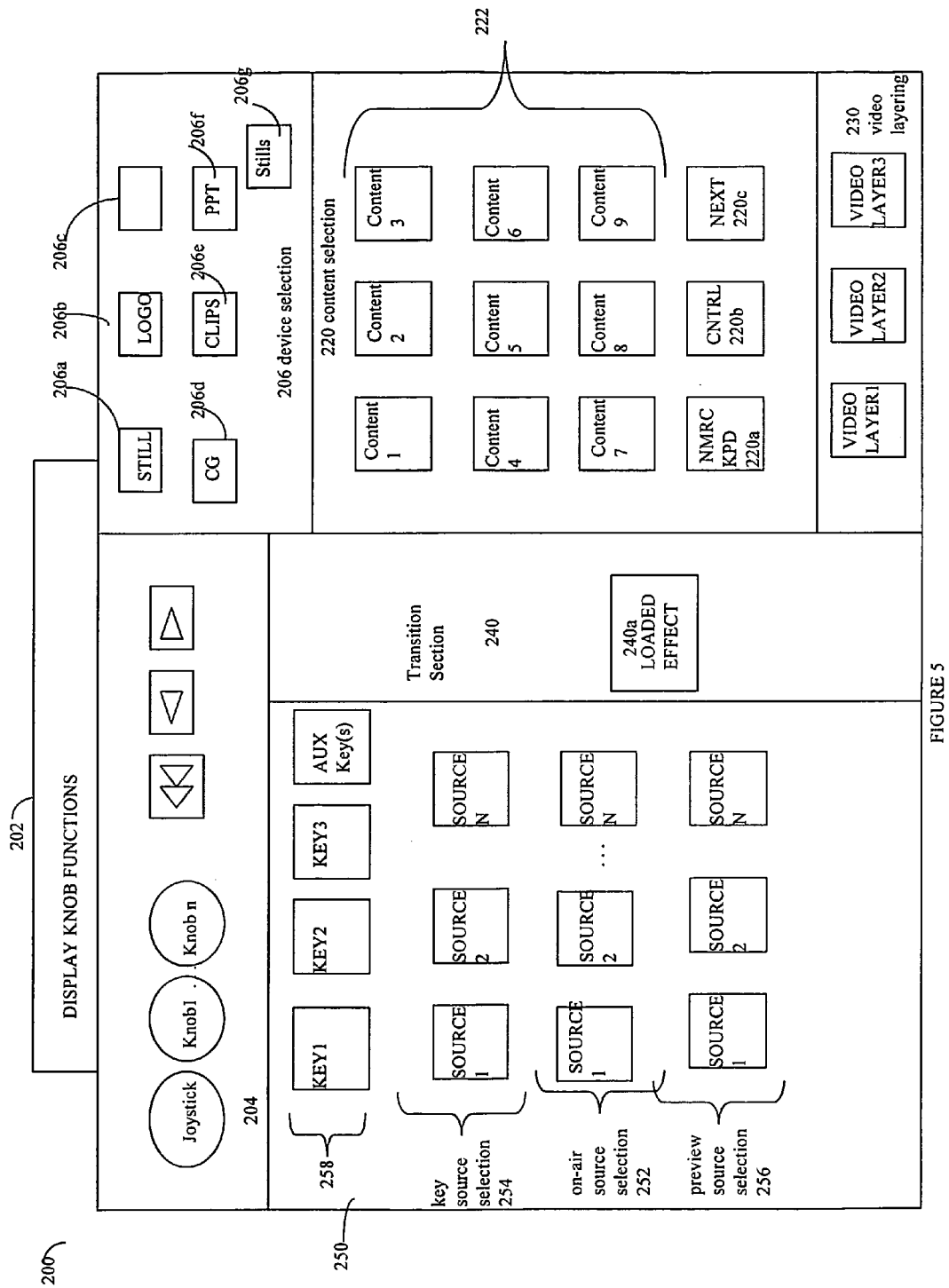
FIG. 5 is an example of an embodiment of a configuration of a control panel.

Referring now to FIG. 5, shown is an example of an embodiment of one configuration of a control panel that may be used in the components 10 of FIG. 1. The configuration 200 may be used in connection with a soft panel and/or a hard panel. The example configuration 200 of a control panel includes a display area 202, such as an LCD display for the different knob functions, a device adjustment area 204, a device selection area 206, a content selection area 220, a video layering area 230, a transition section 240, and a region 250. It should be noted that the particular buttons and controls shown in 200 are for purposes of illustration. Embodiments may include other or different elements than as shown in 200.

It should be noted that 220 may also be referred to as a second device adjustment area in addition to section 204. The function and/or display of elements in 220, 204, and 202 may vary in accordance with selection of another element from 206, 258 and 240a as described in more detail in following paragraphs. In other words, the function and/or display of the controls in 220 may be used in connection with content selection, for example, when a device from 206 is selected. When button 240a is selected, the function and display of the controls in 220 have different associated functionality and display contents that are described elsewhere herein in more detail.

The device adjustment area 204 may include, for example, different knobs, a joystick, and other controls that provide for adjusting a particular device that may be selected from region 206. The functionality of the particular adjustment component included in the region 204, such as a knob, may vary in accordance with a particular device that is active at a particular point in time. Thus, the display area 202 may be accordingly updated with the proper functionality associated with an element in the region 204. For example, if a particular device selected is an audio device, the knobs may provide for adjusting different audio features, such a volume. In the event that a video device is selected, for example, the knobs may be associated with different adjustment functionality. The device adjustment area 204 may also vary in accordance with other selections, such as a key or auxiliary output source from area 258.

Region 206 may include different devices that may be selected as an input or an output source. In this example of the control panel 200, the device selection region 206 may include the following buttons for selection: a first channel of stills 206a, logo 206b, CG (graphics) 206d, clips 206e, PPT or Power Point 206f, and a second channel of stills 206g. Additionally, in this example the control panel 200 includes a currently unassigned button 206c. As will be described in more detail elsewhere herein, the region 206 may include one or more programmable buttons, such as 206a-206c, each associated with a device. In this embodiment, a portion of the devices included in 206 may be varied in accordance with a show definition generated using pre-production software, as described elsewhere herein. The particular devices that may be varied have a display defined in accordance with information specified with a show definition. In other words, rather than have a fixed display, the button labeling and device associated with one or more buttons in region 206 (such as 206a-206c) may be varied and reprogrammed within an embodiment of the control panel. The programming of the buttons may be performed in an embodiment in which the control panel is a hard panel as well as a soft panel.

It should be noted that an embodiment of the control panel may include additional programmable buttons in other regions of the control panel as will be described in more detail elsewhere herein.

The embodiment 200 of the control panel of FIG. 5 also includes a content selection area 220. As described elsewhere herein, the controls in 220 may have other functionality and/ or display than for use in connection with content selection. When a particular device from region 206 is selected, the functionality of some or all of the 12 buttons included in the content selection region 200 may be reassigned in accordance with the particular device selection button in 206 that is currently active. In this example, the top 9 buttons of 220 (222) may be assigned in accordance with different content elements for a particular device selected in region 206. Below the 9 content selection buttons 222 in this example are 3 more programmable buttons: 220a, 220b and 220c. Button 220a may provide for selection of the numeric keypad. If button 220a is depressed, the functionality associated with the 9 buttons of 222 as well as the control button 220b may reflect digits 0-9 and operate like a numeric keypad. If the control button 220b is selected, control functionality that varies with the particular device selected may be associated with the content selection buttons 222. If button 220c is selected, the next block of content may be displayed causing content buttons 1-9 of 222 to be reprogrammed or redisplayed with the next 9 content elements associated with the selected device 206. In other words, use of the next button 220c provides a scrolling capability to the next 9 content elements associated with a particular device selected in 206. Additional detail that may be included in an embodiment for the button displays are described elsewhere herein. It should be noted that the numeric keypad selection button 220a provides for input via content element by numbers, such as 1, 2, 3, and the like, which may be useful in connection with large content libraries.

Region 230 of the control panel 200 includes 3 video layering buttons. The different video layering buttons may display information as to what is included in each layer as may be related to a particular content element selected from 222. For example, as known to one of ordinary skill in the art, a particular content button may be associated with a file which is a video file that includes data comprised of different video layers. The different video layers, in addition to a background, may include different elements, for example, an image, a logo, and a title. Each one of these different elements may correspond to a particular video layer. Each of the different buttons included in the region 230 display additional video layering information in accordance with the particular content button that is selected in region 220.

Region 240 may be characterized as a transition section which may include buttons and other controls used in connection with transitioning, for example, between different input sources, such as cameras. Shown in 240 is the loaded effect button 240a. Other buttons and controls may be included in an embodiment of the transition section 240 that may be associated with traditional control panels and functionality. The loaded effect button 240a may be characterized as a transition effect button showing the particular technique selected for use in transitioning between input sources, such as in connection with transitioning between input sources on the air.

An embodiment of the control panel 200 may include other buttons and selection elements in region 250. Included in region 250 in this embodiment may be on-air source selection buttons 252, key source selection buttons 254, preview source selection buttons 256 and key buttons 258. Area 254 specifies sources for different video overlays associated with each of the keys or auxiliary sources of region 258. Area 256 specifies preview sources such as those used in connection with a preview monitor or device. Area 252 specifies sources for on-air selection such as those used in connection with an on-air monitor or device. In this embodiment, the on-air source selection buttons in 252 may be additional programmable buttons whose values are defined for a particular show duration. In other words, the values of the buttons 252 may change in accordance with each show. The particular on-air source selection button from 252 that is selected may specify, for example, a particular directory, folder, or other source of input. In one embodiment, there may be 9 on-air source selection buttons included in row 252. Other embodiments may vary the number and type of controls included in an embodiment of the control panel than as described herein. The particulars described in connection with FIG. 5 and others are merely for the purposes of illustration and example and should not be construed as a limitation of the techniques described herein.

As described above in one embodiment of the control panel 200, a portion of the buttons may have modifiable or programmable displays. Some of the programmable buttons may have a definition that lasts for the duration of a show as may be defined, for example, using pre-production software described elsewhere herein. These buttons may include, for example, the buttons in 250 and all of the buttons in section 240 except the button 240a. Other controls and programmable buttons have display content and/or functionality that may vary in accordance with the selection of other options or controls. These may include, for example, the display screen 202, the controls of 204, the buttons in 220 and 230, button 240a, and device buttons in 206. Furthermore, the different devices may be associated with buttons 206a-206c in accordance with a selected on-air source selection 252. The particular association among the programmable buttons as well as other information may be defined using pre-production software included in an embodiment of the workstation 30 or other computer system for defining what may be characterized as a show. This is described elsewhere herein in more detail in an off-line preproduction process.

In one embodiment, the control panel 200 may include a total of 28 programmable buttons. For example, one embodiment may include the 12 programmable buttons in region 220, 9 source programmable buttons in the on-air source selection row 252, 3 programmable buttons in the video layering region 230, 3 programmable device selection buttons in region 206 (206a, 206b and 206c), and a button in the transition section 240 called the loaded effect button 240a. Additionally, the display of 202 and controls in 204 may vary in accordance with a particular device in 206 selected or the particular key selected in 258.

To illustrate the use of the programmable buttons in connection with the control panel 200 of FIG. 5 consider the following example. A particular directory on a device located in a workstation may contain a variety of different types of stored data files. This directory may include, for example, power point files, graphics, clips from previously stored videos, and the like. The directory may be associated with a particular source button from 252. Certain types of files within the directory may be used in connection with a live broadcast show defined previously using pre-production software. The particular types of devices, or file types in this example, for the directory or folder may be associated with different device selection buttons in area 206. When the source selection button is selected from area 252 for this directory, a corresponding device selection button may also be selected from region 206 such that, for example, some or all Power Point files in a particular directory are displayed on the content buttons in the content selection region 220. This is one example of how the buttons in regions 252, 206, and 220 may be related. Selection of a different device in region 206 causes a change in the content selection 220 for buttons 1 through 9. This redisplay of content buttons 1 through 9 in region 220 happens in response to a user, for example, depressing a button in the device selection region 206.

In one embodiment with reference to FIG. 5, selection of an element from 258, 240*a* or 206 effects the functionality and/or display of controls in 202, 204 and 220. Additionally, selection of a content from 220 causes an update of a button/control included in on-air source selection 252. During live production, associations are made between an element of 254 and an element of 258. This association may be modified also during runtime or live production. Buttons in 230 display information about the particular content of each of the corresponding keys of 258. Each of the elements in 230 at a particular point in time have a corresponding element in row 252. Each of source1, source2, etc. buttons included in each of 252, 254 and 256 have a same source (such as a camera, clip store, and the like) as may be defined using pre-production software or other techniques off-line prior to the live production.

Figure 6:
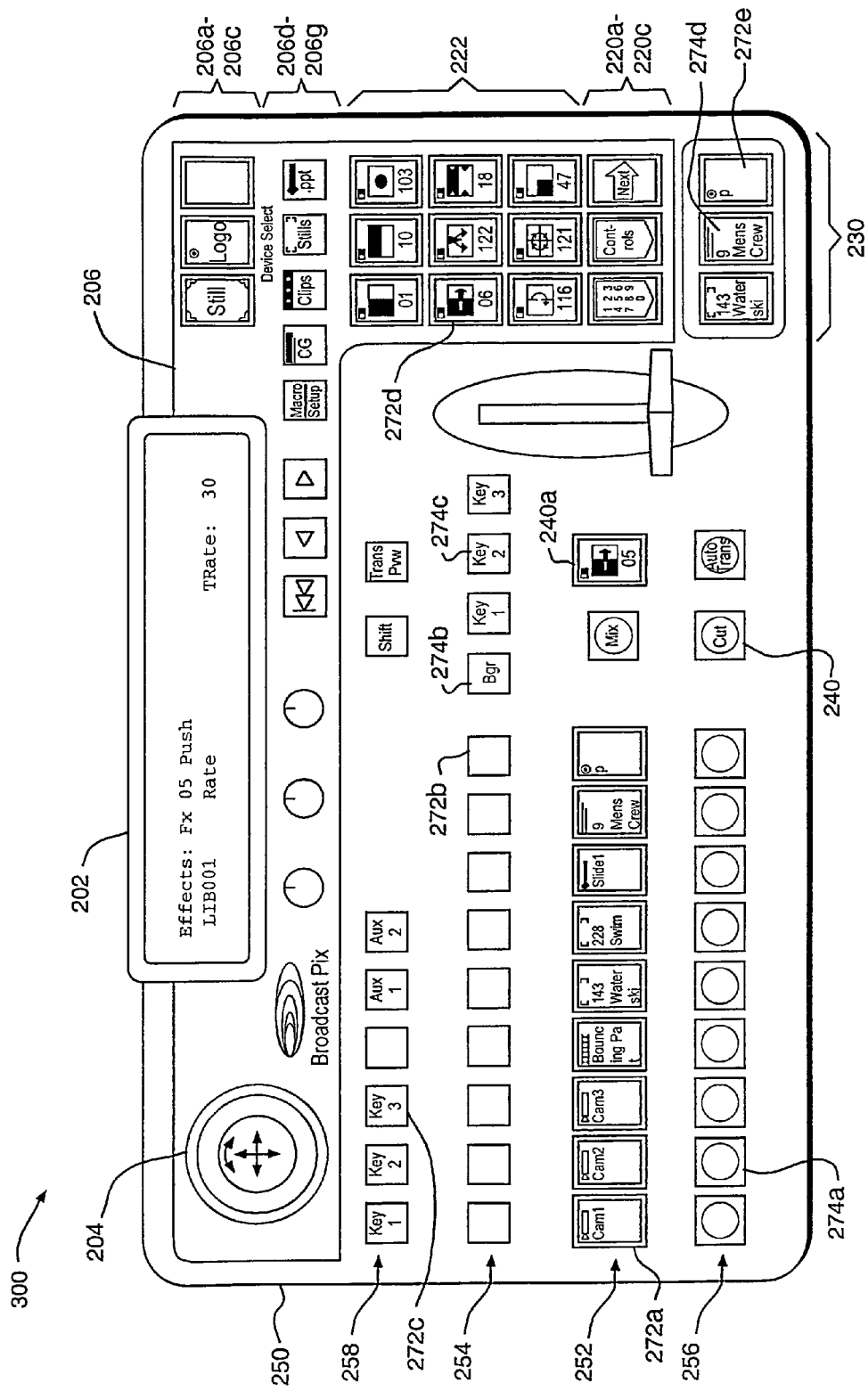
FIG. 6 is a more detailed representation of one embodiment of a control panel configuration.

Referring now to FIG. 6, shown is a more detailed example of an embodiment of a control panel. The example 300 shows additional detail in accordance with the description 200 previously shown in FIG. 5. It should also be noted that the particular details of the control panel 300 of the FIG. 6 may also be implemented in a hard control panel as well as a soft control panel.

In this particular example 300, the control panel includes 28 programmable buttons as described previously in connection with 200 of FIG. 5.

In one embodiment, each of the nine content selection buttons included in region 220 includes three particular portions. At the top portion of each of the nine content selection buttons may be an icon corresponding to the particular device selected, such as the device selected in area 206 which is currently active. It should be noted that this top portion may also include a device channel in the event that there are multiple channels, such as multiple clip stores. In the middle portion below the icon may be an image or other display corresponding to the content associated with each button. The middle portion of the button may include, for example, the actual name of the file that may be obtained in accordance with a previously defined show, or an image associated with the content. The name of the file may be obtained, for example, using the directory command in the event that the source selection button that is currently active corresponds to a directory within the workstation. In addition to the content name, there may also be a content number which may also be used when referring to a particular content element. An embodiment may provide for customization of the button displays to include different information or a different arrangement on a programmable key display than as described herein.

In connection with the foregoing, the display of the programmable buttons may be varied in accordance with the selection of a particular device. In particular, the content of the programmable display buttons 1 through 9 in the top portion of the content selection area 220 may be determined automatically when a particular device in area 206 is selected. As another example, if the clip device is selected in area 206 by depressing the clips button 206*e* referring back to FIG. 5, a clip icon may appear on the top of the button. Below the clip icon may be the content number and name for each particular clip. Similar behavior may occur when stills, CG, or any content is imported into a show in that the content number and name as well as device selected may automatically be displayed on a particular content button in 220. It should also be noted that in connection with displaying information on each of the programmable buttons regarding the content, the content may also be graphically represented such as with an image. An embodiment may also include the file name. The particular display of a programmable button may be defined in connection with a show definition using pre-production software.

In a similar manner, the display associated with other programmable buttons included in the embodiment 300 may be varied in accordance with currently active devices and selections. For example, the video layering buttons included in area 230 in the lower right corner include an icon at the top corresponding to the particular source from 254. At the bottom of each button in 230 is content identifier, such as a title corresponding to each of the particular file names. Included also may be a numeric identifier corresponding, for example, to a particular channel of the device, such as, for example, a still or clip store.

It should be noted that in connection with all of the buttons including the programmable buttons, a variation in color, shading, and the like may be used to indicate those particular buttons which are associated with an "on-air" status, or with a "preview" status. As known to those of ordinary skill in the art, the on-air status may be associated with those elements currently being broadcast to the particular on-air device or channel. The preview status may be used, for example, to preview elements that are going to be on-air next. The transition section 240 of the control panel may be used in transitioning from a current on-air element to a next element currently in the preview state. In one embodiment, the on-air state may be indicated by a red button display. Those elements of the control panel associated with the preview state may be indicated by an orange display. Buttons which are not selected in either preview or on air states may be of another color. Button colors may progress through a series of the three states. For example, selecting a white button causes the associated content to move to the preview monitor and the button display to be updated to orange. Through use of the transition section, an orange button may have its corresponding button display updated to red as it moves to on-air.

Consider the following example with reference to FIG. 6. Camera 1 272*a* may be selected as the current on-air background source. 274*b* is selecting that the next transition will involve a background transition from preview, which 274*a* is selecting as camera 2. 272*e* indicates that key 3 is currently on air and shows that its content is the logo generator (source9). 274*b* and 274*c* indicate that the background and key2, respectively, will be involved in the next transition from preview to on-air. 274*c* (key2) is also selected for preview display having content as indicated by 274*d*. In this embodiment, each of the different video overlays in 230 correspond to a respective one of key1-key3 included in the transition section 240 and 258. The preview element transitions 274*b* and 274*c* using the selected effect of 240*a* when a transition is performed, for example, using the lever or AutoTrans button from 240. In this example, the selected effect is indicated by button 272*d* which indicates that a push-off transition effect will be used. The push-off effect provides for a transitioning of the new on-air content to be pushed from the left to the right as the current on-air content is pushed off to the right. This and other transitions effects are well-known to those of ordinary skill in the art. Each of the different transition effects as displayed in 300 may correspond to a different one of the transitions, as described elsewhere herein in more detail. By selecting the Controls key in 222 and by turning the leftmost knob, the possible effects may be displayed on the keys in 222. Currently, the selected effect is that as indicated by 272*d* and 240*a*.

Region 240, as described in connection with other figures, is the transition section. The region 240 of FIG. 6 includes additional detail in comparison to that of FIG. 5. The controls in the transition section 240 with the exception of 240a are as known to those of ordinary skill in the art. It should be noted that particular embodiment described herein includes the additional control 240a in this section and the additional functionality of having the content of each of the key1-key3 in 240 have a corresponding content display button in 230.

It should be noted that the use of on-air source selection buttons 252 may not be typically used in connection with certain application such as, for example, live broadcasting. Content may progress from the preview status as may be displayed, for example, on a preview monitor, prior to going on the air.

What will now be described are particular examples of the different programmable buttons and how they may be used in an embodiment of the control panel.

Figure 7A:
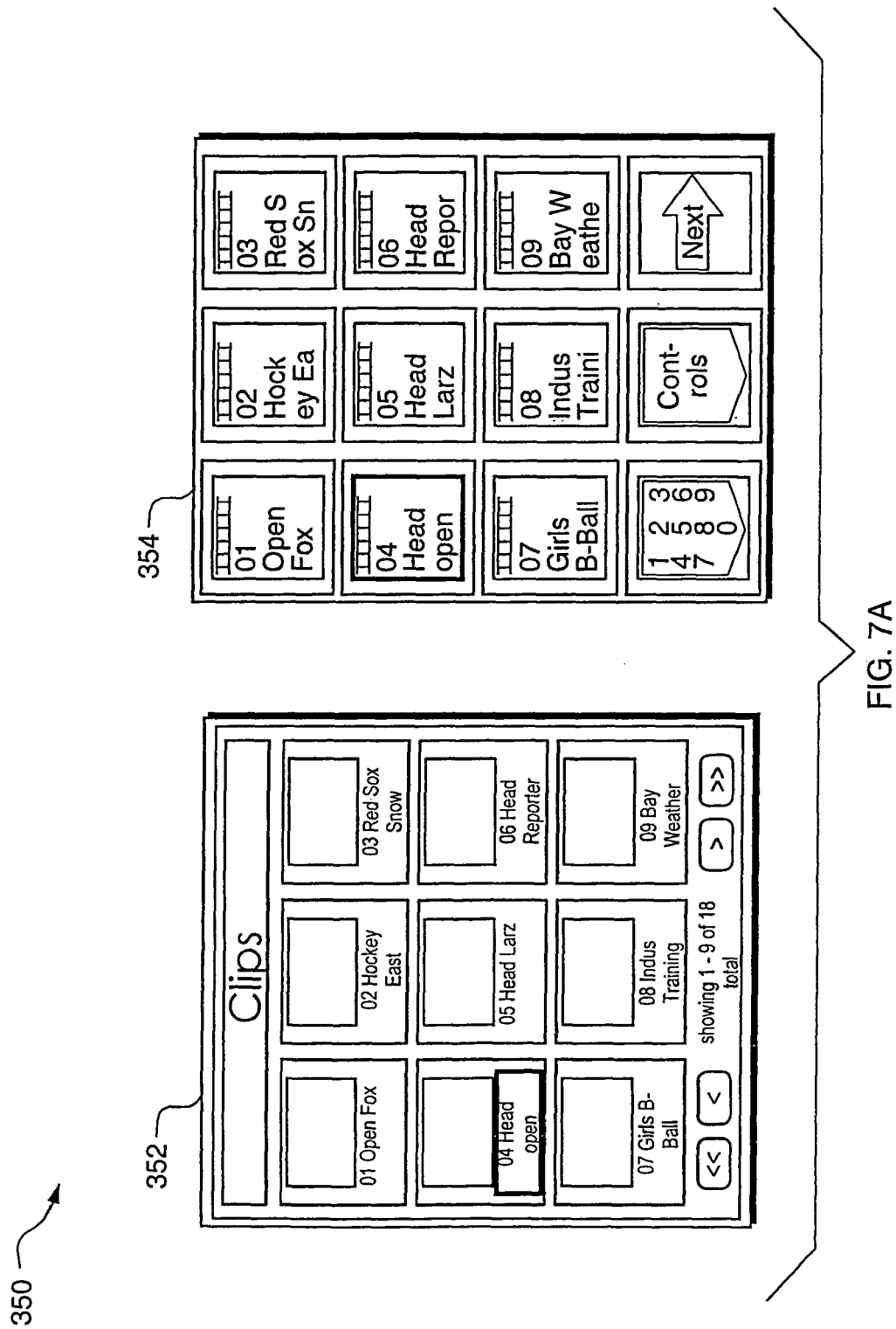
FIG. 7A is an example of a set of clips and corresponding content selection buttons that may be included in an embodiment of a control panel.
Figure 7B:
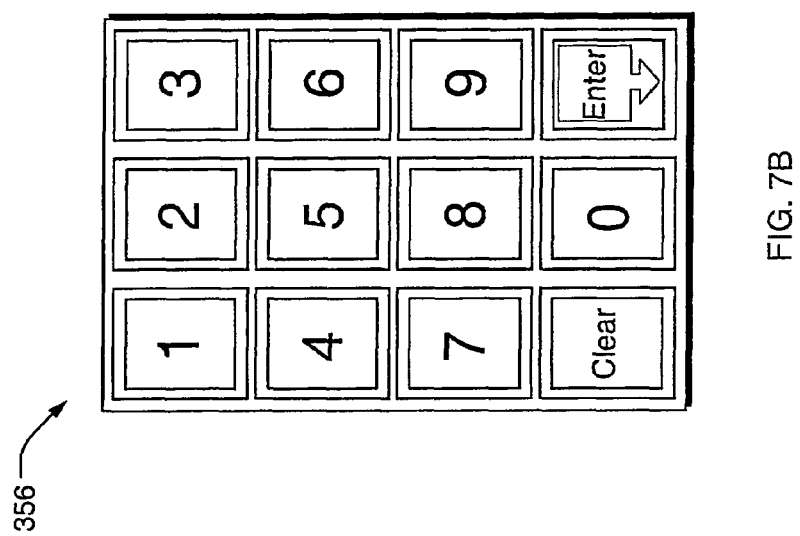
FIG. 7B is an example of a numeric keypad display that may be included in an embodiment of a control panel.

Referring now to FIG. 7A, shown is an example of a set of clips and corresponding content selection buttons that may be included in a portion of a control panel when the clips device in region 206 is selected. The clips 352 may correspond to particular video clips stored, for example, on a data storage device at the workstation 30. In the illustration 350, each of the clips included in 352 has a corresponding programmable button display in region 354. Each of the buttons included in 354 may correspond to the twelve buttons included in the contents selection area 220 previously described in the control panel 200 of FIG. 5. If the clips device is selected from region 206 of a control panel, the programmable buttons in the contents selection area 220 may be displayed as indicated by 354. The top portion of each of the content buttons 1-9 includes an icon corresponding to a device that is a clip. Unique to each of the buttons below the icon is information related to the content of the clip itself. In this example, a number corresponds to a particular number associated with a clip that may be included in a library. Beneath the number is a title that may be associated with the title of a clip file as stored, for example, on a data storage device. In the bottom of the clip display 352, it is shown that there are 18 clips of which 9 are currently displayed in 352. Subsequently, assuming all 18 clips have been associated with this particular show and are located in the input source area, selection of the NEXT button from the display 354 results in an update of content buttons 1 through 9 with the corresponding clip information for clips 10 through 18. It should be noted that an embodiment may include other button displays. Additionally, an embodiment may provide for other ways of advancing through a particular content library. For example, referring back to the control panels 200 and 300, a knob may be associated with particular device. Twisting of the knob, for example, in a forward direction may cause the content of the library to advance forward and accordingly cause an update of the keypad programmable display buttons within the region 220 for the particular content. Selection of the lower left button from the display 354 causes the numeric keypad to be displayed as illustrated for example in 356 of FIG. 7B.

Figure 7D:
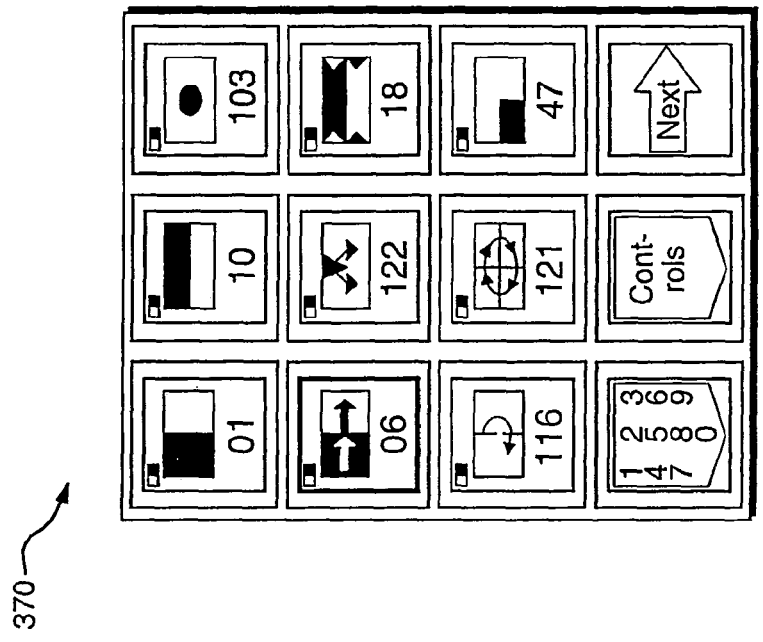
FIG. 7D is an example of buttons that may be displayed in a region of a control panel configuration for different effects.
Figure 7C:
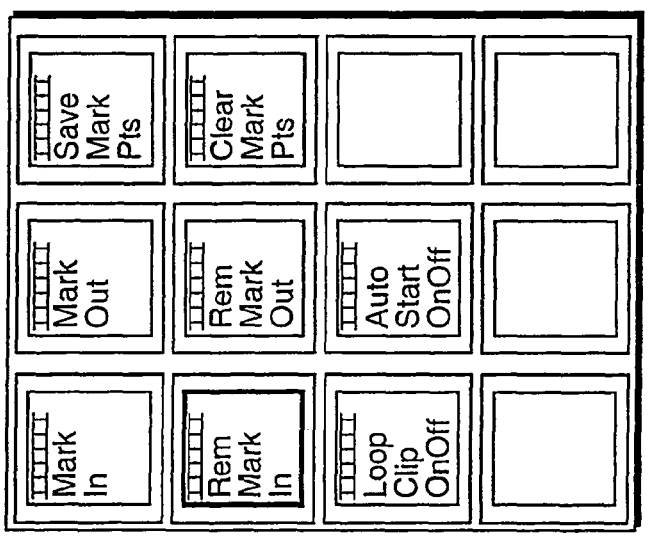
FIG. 7C is an example of buttons that may be displayed in a region of a control panel configuration for clip control modifiers.

Referring now to FIG. 7C, shown is an example 360 in which the buttons in region 220 in an embodiment of a control panel may be used in connection with clip control modifiers. The button display 360 may be performed in response to selecting the middle control button (CONTROLS) in the bottom row of the display 354 of FIG. 7A. Generally, selection of the CONTROLS button in the bottom row of the display 354 causes the controls for the particular device selected to be displayed on each of the buttons in 220. The various buttons in 360 may be used in connection with clip modifiers. For example, as known to those of ordinary skill in the art, the buttons may be used to set mark in and mark out points, or set a clip to loop, or to auto start when taken from preview to program or on-air. Each of these different clip controls and others are known to those of ordinary skill in the art. Other types of tools or devices that may be included in an embodiment of 206 may have their own particular modifiers.

Referring now to FIG. 7D, shown is an example 370 of the buttons in region 220 associated with different effects. In one embodiment, the display 370 may be in response to selection of the effects button 240a displaying the various effects. It should be noted that the different transition effects are known to those of ordinary skill in the art. Each of the different effects that may be included in an embodiment may have a corresponding button and display.

Figure 8:
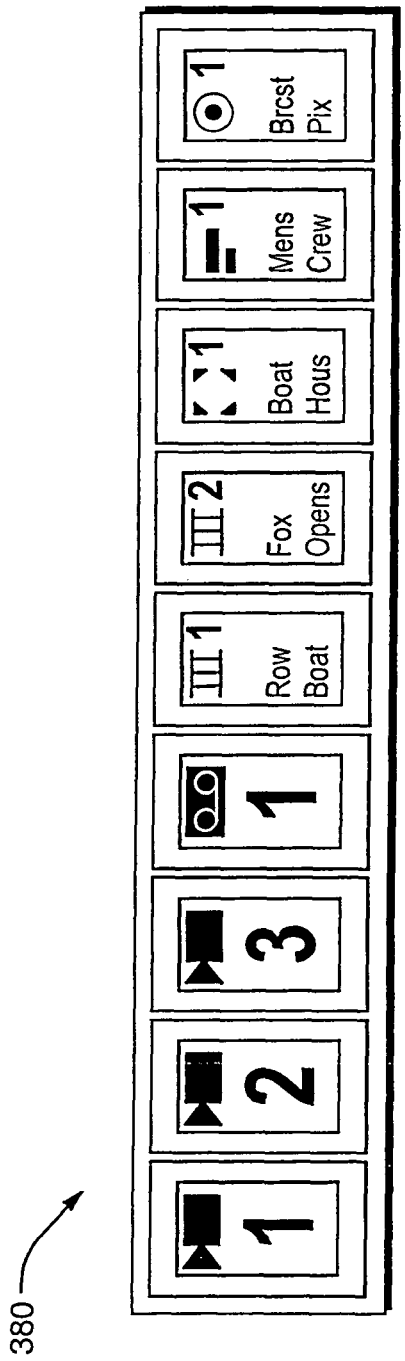
FIG. 8 is an example of programmable button displays that may be included in an on-air source row selection of an embodiment of a control panel.

Referring now to FIG. 8, shown is an example of the programmable button displays that may be included in an on-air background source selection row 252 of a control panel. In this example, the first button on the left corresponds to a camera that is selected and is on the air. The other sources as indicated by the remaining buttons are two additional cameras, a digital recording device, two channels of still store (as indicated by the rowboat and FOX Opens), a Power Point store (as indicated by Boat House), a CG Store or graphic store (as indicated by Men's Crew), and a logo store (as indicated by Brest Pix). The particular device as described elsewhere herein in connection with other display buttons may correspond to the icon at the top of each of the buttons included in 380. Additional information regarding the content and/or channel may be displayed in addition to the particular icon as also indicated by the display button 380.

In one embodiment described herein, there are 28 programmable buttons and other controls that may be partitioned into two general classes: those which may vary in accordance with a current selection of another control, and those which are assigned a value for the entire duration of a show although they may be change in accordance with each show With reference to FIG. 5, the controls included in regions 202, 204, 206, 220 and 230 as well as button 240a may vary in accordance with a current selection of another control. The controls in 250 and the remainder of 240 may be defined for the duration of a show.

Figure 9:
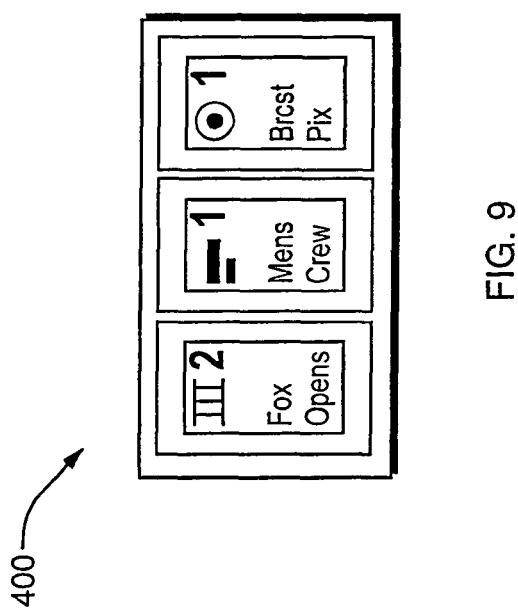
FIG. 9 is an example of video layering buttons that may be included in an embodiment of the control panel.

Referring now FIG. 9, shown is an example of particular buttons that may be included in the region 230 characterized elsewhere herein as the video layering buttons. The content of these buttons may be displayed, for example, in response to a particular content selection of a button in 220. The display buttons included in 400 include a first button corresponding to a clip as indicated by the device icon at the top. The top portion of these buttons may vary in accordance with the currently active device such as may be selected from region 206. The middle button indicates that "Men's Crew" corresponds to a title. The right most button which may be selected and have the on-air status indicates that a particular logo is used.

The foregoing are example arrangements and configurations of buttons that may be included on a control panel. As described herein, during production or real time, the devices and the show may be controlled from either a hard control panel or a soft control panel. It should be noted that an embodiment may use hard control panels and soft control panels interchangeably or together for a team operation, for example, when multiple operators might work together in a particular configuration. While an embodiment of the hard panel may provide better performance in terms of run time, the soft panel may be used in connection with providing a lower cost alternative.

Figure 10:
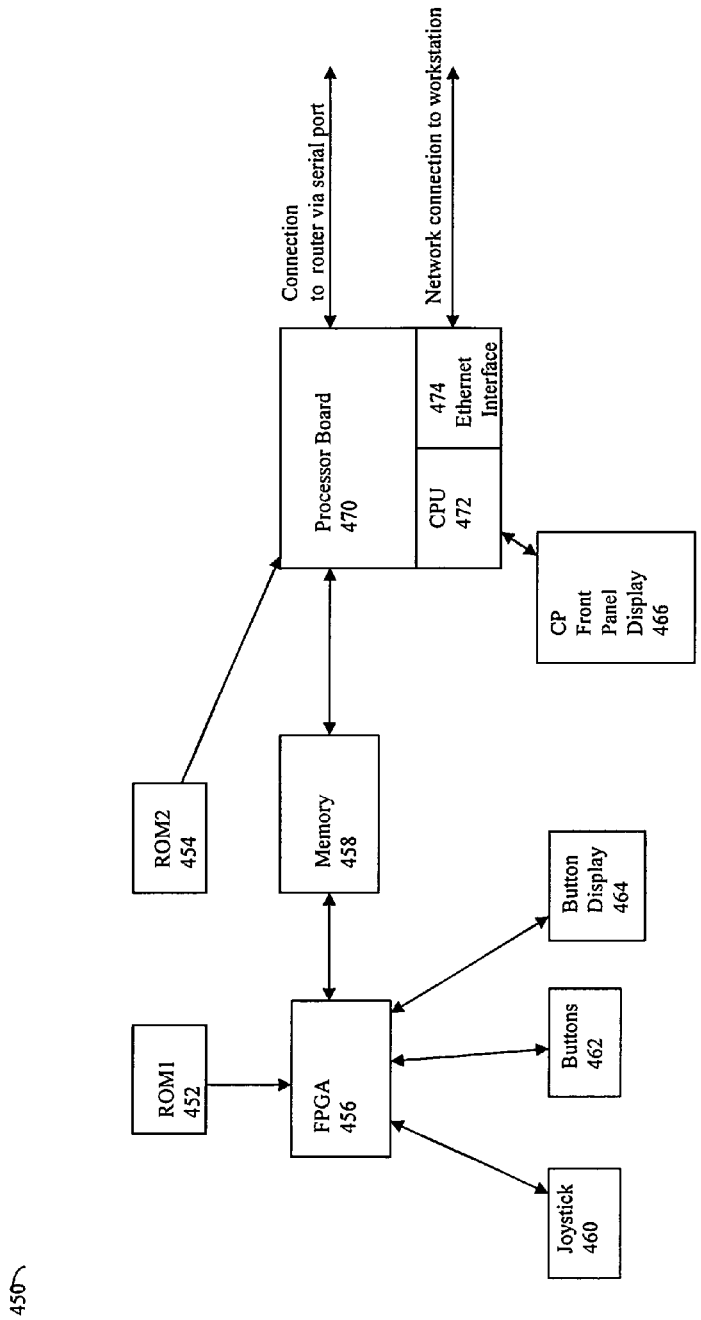
FIG. 10 is an example of components that may be included in an embodiment of a hard control panel.

Referring now to FIG. 10, shown is an example of hardware that may be included in an embodiment of the hard control panel. Included in this embodiment 450 are a first ROM (ROM1) 452 a second ROM (ROM2) 454, an FPGA 456, a memory 458, outputs to the various elements of the hardware (including, for example, the joy stick 460, the buttons 462 and the buttons display updates 464), a processor board 470 and a connection to the control panel display 466. Included on the processor board 470 may be a processor or CPU 472 and one or more communication interfaces, such as an Ethernet card or interface 474. In one embodiment, the CPU 472 included within a control panel hard panel implementation may be the eZ80 processor by Zilog. ROM2 454 may be used to store instructions that are executed by the CPU 472. ROM1 452 may include instructions used by the FPGA 456. Memory 458 may be, for example, a random access memory (RAM). In addition, the Ethernet interface card 474 may provide, for example, a connection to the workstation as described elsewhere herein. Similarly, the processor board 470 may include a connection to the router via the serial port as well. It should be noted in this particular embodiment that both ROM1 and ROM2 may come loaded with instructions with functionality that will be described elsewhere herein. It should also be noted that an embodiment may include a programmable ROM (PROM) in place of one or both of ROM1 and ROM2. An embodiment including a PROM, for example, may load other instructions from a network connection or other port.

In one embodiment, ROM2 454 may include instructions that simulate a Flash Player running within a browser to simulate the soft control panel. Additionally, ROM2 454 may include instructions providing for interpretation, sending, and receiving of XML commands as may be communicated between an embodiment of the control panel, which in this instance is a hard control panel, and the workstation as described elsewhere herein. In order to determine the instructions that need to be included in an embodiment of the ROM 2 454, the XML commands coming out of the workstation may be examined and then simulated using instructions stored in the ROM2 454. It should be noted that an embodiment may vary the instructions stored in the ROM 2 454 in connection with simulating other types of software, the particular hardware, and other particulars that may vary in accordance with an embodiment. In this particular embodiment, the hard control panel and the soft control panel behave in a similar fashion so that the workstation may communicate with either the hard control panel or the soft control panel in the same manner. By having the ROM2 454 include instructions that simulate the behavior of a soft panel by simulating Flash Player, and interpreting and sending XML commands from/to the workstation, the workstation may interact with a control panel that is implemented in hardware and/or software in an embodiment in which the soft control panel also runs the software which is simulated by executing the instructions included in ROM2.

It should be noted that an embodiment may include a different number of components in different configurations than as shown in FIG. 10. For example, an embodiment may include a different number of ROMs than as shown in FIG. 10. An embodiment may include, for example, a single ROM or more than 2 ROMs. Other variations of the configuration of FIG. 10 and others described herein are known to those of ordinary skill in the art.

In one embodiment, ROM 1 452 may include instructions which are loaded into the FPGA (field programmable gate array) 456 to control the buttons and associated displays, and other controls. As known in the art, the FPGA may be used in an embodiment as an alternative to a custom-designed integrated circuit and may be programmed to perform a variety of different operations. In one embodiment, the FPGA is responsible for the state of all controls except for the display 202. In this embodiment, the display area 202 is updated by instructions loaded from ROM2. The FPGA may poll the joystick, buttons, and other controls to detect any selection changes, such as when a user makes a selection via the control panel. Alternatively, an embodiment may have a signal generated to notify the FPGA when a selection or state change of a control occurs. The state change with respect to a control in the control panel is then communicated from the FPGA 456 through memory 458 to the processor board 470. Appropriate XML messages are formed and sent to the workstation over the network connection. The XML message sent to the workstation includes state information about the particular button or control and the selected configuration or state. This may include, for example, a particular button and a status, such as a change to "preview" or "on-air" status. The workstation stores the configuration and state of each control panel which may be updated in response to XML messages received from the control panel.

Initially, the workstation sends two sets of information to the control panel: 1) all controls that stay fixed for the duration of the show and 2) controls that may vary from control panel to control panel. The workstation may update those in 2) in accordance with a particular button selection and associated state during operation. For example, if the device selected changes, the new content information, as stored in the workstation configuration information for each control panel, is communicated from the workstation to the control panel. The workstation may also communicate to the control panel a color state change of a button, such as when a selected button has its associated state changed from preview to on-air.

The FPGA in this embodiment also includes instructions for updating the button displays at predetermined time intervals. For example, the programmable buttons may be updated 10 times every second. This update is necessary because in this embodiment the text and content as displayed on the different buttons and/or display may fade and need to be accordingly refreshed. This is the technique used in this embodiment to update the buttons and the corresponding displays. Other embodiments may use different techniques and/or different refreshing rates.

Figure 11:
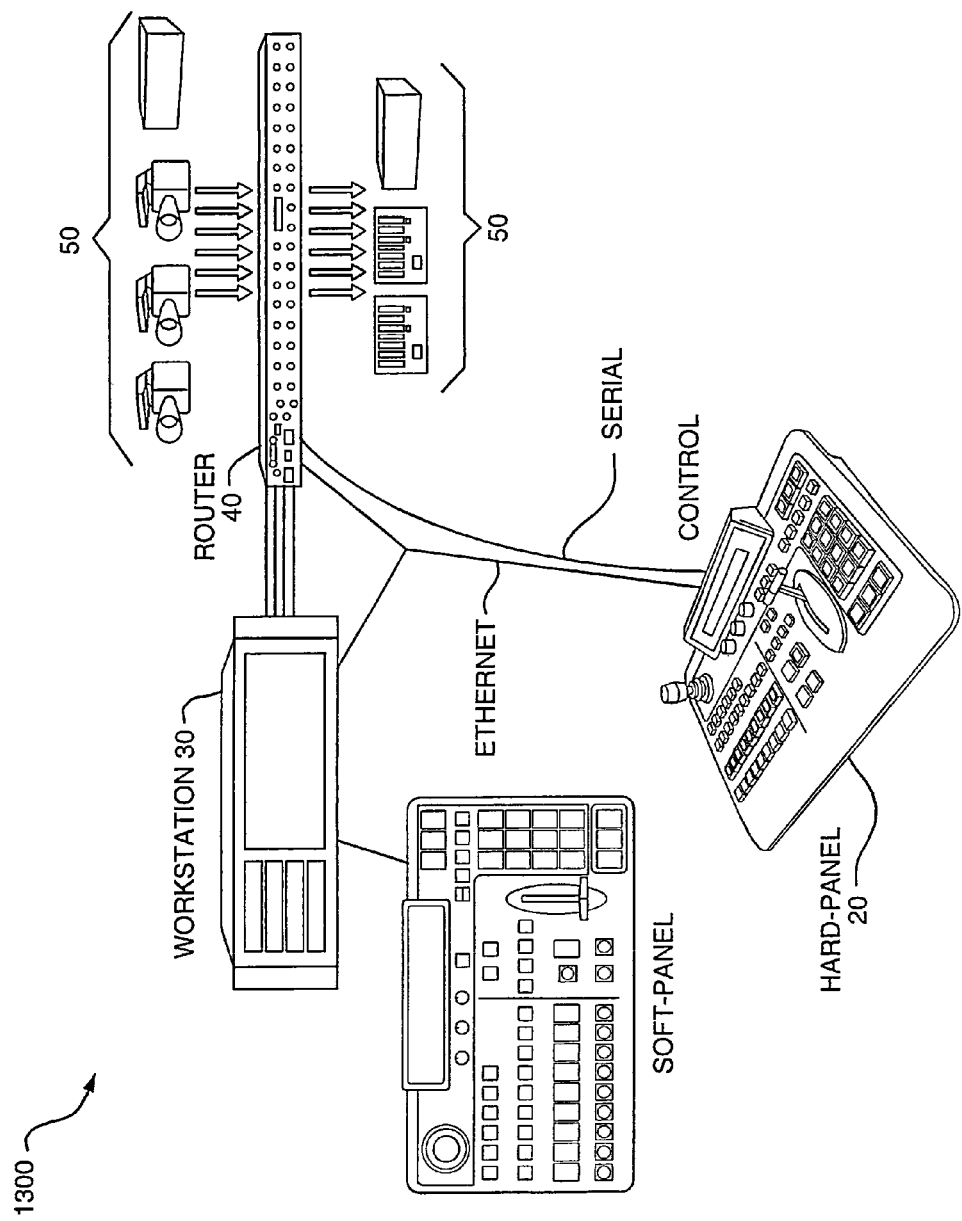
FIG. 11 is an example of components that may be included in an embodiment of a system of FIG. 1.

An embodiment of the hard control panel 20 may execute instructions, such as may be loaded from ROM2, to determine if a particular connection is on-line. Referring now to FIG. 11, shown is an example 1300 of components that may be included in an embodiment of a system. The example 1300 illustrates the components and connections therebetween to control the devices 50. An embodiment of the hard control panel 20 may include code that continually detects whether a particular primary connection, such as an Ethernet or other connection, to the workstation 30 is functioning. If the hard control panel 20 determines that the primary communication connection between the control panel 20 and the workstation 30 is not functioning, the hard control panel 20 may stop sending information to the workstation and use an alternate backup connection, such as a serial connection for controlling the various I/O devices 50. In this instance, for example, information from the workstation 30, such as a particular still store, logo, and the like may not be available while the workstation 30 is unavailable to the hard control panel 20. However, the hard control panel 20 may directly connect to the router 40 in connection with controlling and communicating with the one or more various I/O devices 50 previously described in connection with FIG. 1 in the event that the workstation becomes unavailable or is perceived as off-line by the control panel. Also included in 1300 is a soft control panel that may be displayed, for example, on a monitor of the workstation, or another computer system, such as a laptop computer with a processor different than that of the workstation.

It should be noted that the backup connection in this embodiment is a serial connection. However, an embodiment may use other types of communication connections as the backup connection. For example, the backup connection can be a parallel or other communication connection. The backup connection can be from a hard control panel or soft control panel that may be displayed, for example, on a laptop or other computer system in addition to the workstation. Additionally, an embodiment may include multiple backup connections.

An embodiment of the hard control panel may include a timer which sends a message to the workstation at predetermined time intervals. The workstation may respond to this message to indicate that it is on-line and available. This message may be characterized as a PING command used to test the presence of an active system at the other end of a connection. The workstation may send a PING message at regular intervals to the hard control panel. If the hard control panel does not receive successive PINGs within a predetermined amount of time, the hard control panel may consider the workstation to be offline.

The connection between the hard control panel and the workstation may be re-established when the workstation and its connection to the hard control panel come back on-line. This may be performed using any one or more different approaches. In one embodiment, there may be a reconnect button on the hard control panel. The reconnect button may be selected by an operator to reconnect the hard control panel and the workstation. When selected, the reconnect button may cause the hard control panel to send an XML message to the workstation to resume the connection and operations for controlling the devices, and the like. Until the workstation receives this reconnect XML message, the workstation does not resume the previous mode of operation and communication with the hard control panel. The determination of the workstation returning to an available or on-line state may be determined using manual and/or automated techniques. For example, an operator may reboot the workstation or fix a communication problem with the workstation. The operator may then select the reconnect button on the hard control panel to re-establish communications between hard control panel and the workstation using the network or communication connection. An embodiment may also provide an indicator on the hard control panel which indicates when the workstation is on-line. This indicator may be set as in response to the workstation sending a message to the control panel that it is back on-line. In response to viewing this indicator on the control panel indicating that the workstation is back on-line, an operator may select the reconnect button.

The messages exchanged between the control panel and the workstation may happen during broadcasting of a show. As described elsewhere herein, the show may be defined off-line prior to the real-time broadcasting using pre-production software that may be included in the workstation.

As described elsewhere herein, an embodiment may perform pre-production processing, such as using pre-preproduction software executing on the workstation or other computer system, to define a show. In one embodiment, the pre-preproduction software may include, for example, tools to create graphics, assemble content, select devices for a show and set up the control panel. The pre-production processing may be performed off-line without tying up the studio or its components. In connection with assembling content, the pre-production production processing may also include, for example, extracting frames from a video feed output from a device. The device can be, for example, a camera recording in real time in which the frames may be extracted in real time and then stored. The video feed may come from a video player playing back a previously stored video stream. The preproduction processing may also include audio editing and/or mixing with a video stream. Results from preproduction processing may be stored, for example, on a data storage device of the workstation or other device connected to the workstation.

What will now be described are examples of user interfaces and associated functionality that may be included in an embodiment in connection with defining a show. It should be noted that for the purposes of example, the show defined in following paragraphs may be used to produce the control panel display described elsewhere herein in connection with 300 of FIG. 6. Where appropriate, references may be made to elements in FIGS. 5 and 6 in following paragraphs.

Figure 12:
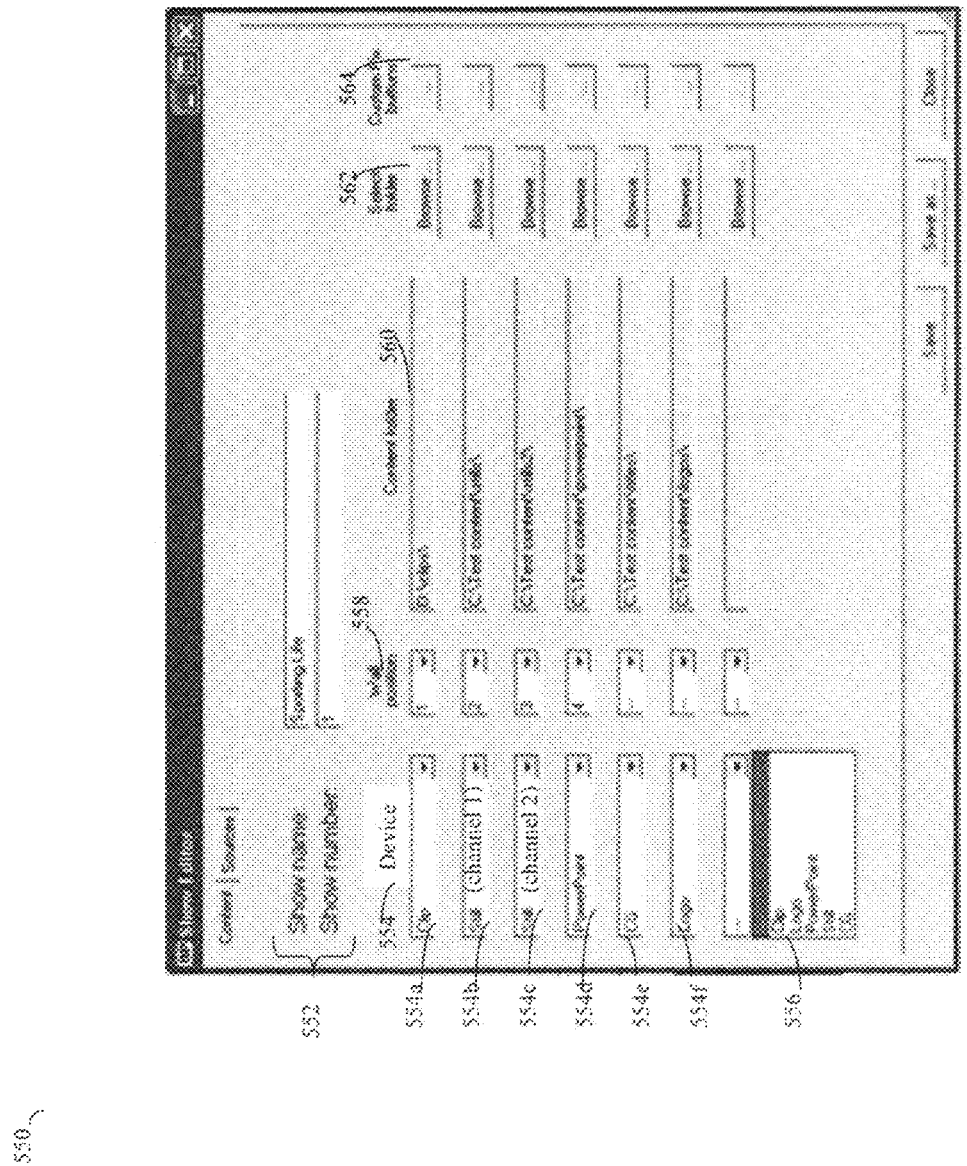

Referring now to FIG. 12, shown is an example 550 of a graphical user interface of a show editor that may be produced using the pre-production software. The example 550 includes fields 552 for a show name and number used to identify this particular show being created. The example 550 also includes a device field 554, a wall position field 558, a content folder 560, a select folder field 562 and options to customize an associated button 564. The particular devices used for a show and content to be associated with each device are selected, respectively, using fields 554 and 560. Element 556 shows a drop down menu that may be used in connection with selection of particular devices. It should be noted that the devices specified in 554 and associated content in 556 may be used in defining the device buttons included in area 206 and the content buttons in area 220 of the control panel example of FIG. 5. In 550, the show being defined includes 6 stores in total: a clip store, 2 still stores, a Power Point store, a CG store and a logo store. The content associated with each of these stores, such as a particular directory or folder, may be specified in fields of 560. This content may then be displayed on buttons of area 220 in the control panel of FIG. 5 when the show is being broadcast. Using fields from 562, a file browser may be used in selecting the particular content for 560. The wall position 558 in this embodiment refers to a display position in an arrangement of images on a monitor of the workstation. During broadcasting of the show in this embodiment, the arrangement of images may be displayed on the workstation monitor in the designated display position. The programmable content buttons, with reference to FIG. 5 area 220, may be defined using the fields in 564. In one embodiment, the names displayed for each content button may be obtained from the filenames, or may be customized. Using this interface, an association is made between a specific button in 206 and a device of 554. It should be noted that an embodiment may include multiple channels of a particular device type, such as a still store as illustrated in 554b and 554c of FIG. 12.

Referring now to FIG. 12A, shown is an example of a graphical user interface 568 that may be used in connection with performing device assignments to use other third-party devices. 568 may be used, for example, in connection with associating plug-in devices with the buttons in the device selection area 206. These plug-in devices may include, for example, third party devices connected to the workstation such as a pan and tilt device used to automatically control a camera, a lighting device, and the like. The foregoing provides for controlling the plug-in device using controls on the control panel, such as those from 204, 202, and 220. In one embodiment, the workstation may control the third party device using a communications port of the workstation. Controls from 220 may be used in defining preset camera positions, for example, when the plug-in device controls the angle of a camera. In one embodiment, the joystick may be used in position the pan and tilt camera control device in different positions. Each of the different positions may be defined and associated with a corresponding content selection button of 220. These are just some examples of how the different controls may be varied and associated in an embodiment.

Figure 13:
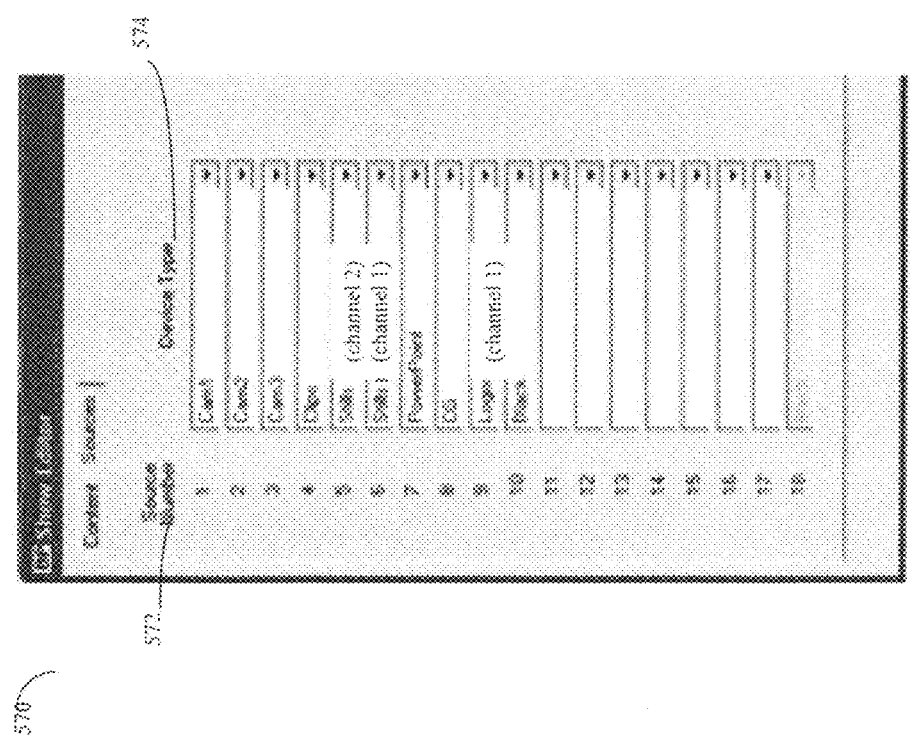
FIG. 13 is an example of a graphical user interface that may be used in defining the on-air source buttons of a control panel.

Sources may be assigned for each of the on-air source buttons, for example, with reference to the buttons 252 of FIG. 5. Referring now to FIG. 13, shown is an example 570 of a graphical user interface that may be produced using the pre-production software for defining the on-air source buttons. The particular source button of 252, 254 and 256 of FIG. 5 may be identified in 572 and associated with the device type in 574. Using 564 from FIG. 12, an embodiment may include functionality for defining a customized button display by letting a user select and/or define icons. The content name for the key display in 252 of FIGS. 5 and 6 in this embodiment is determined during preproduction of a show, such as from the name of a folder, directory, or file. It should be noted that using the selection of folder(s) and/or file(s) using menu button 562, selection of some or all of the files in one or more directories or folders may be performed.

As described above, creation of a show definition using the pre-production software may include: defining sources (as described, for example, in connection with FIG. 13), defining devices and associated content (as described, for example, in connection with FIG. 12), and identifying any plug-in devices (as described, for example, in connection with FIG. 12). It should be noted that an embodiment may provide for associating a device icon or other small image to be displayed in an area on the programmable keys. A predefined image selection may also be displayed such as, for example, in connection with a particular device type. An embodiment may also provide for displaying on a button a user-defined element such as, for example, a bitmap image created with another third-party software application. Other embodiments may use other interfaces and other techniques in connection with providing data for defining a show.

Once a show has been defined and created, such as using pre-production software, the show definition may be saved. For example, the show definition may be stored on a device of the workstation 20. At some later point, the show definition may be used in connection with a broadcast. The show definition may be used in defining initial and subsequent states of the control panel.

The data saved for a show definition may be in any one or more different formats and configurations, and may be stored in any one or more different data containers, such as in an XML file of a file system residing on the workstation. The organization and data container used may vary with each embodiment. It should be noted that content and format of XML files are known to those of ordinary skill in the art.

Figure 14:
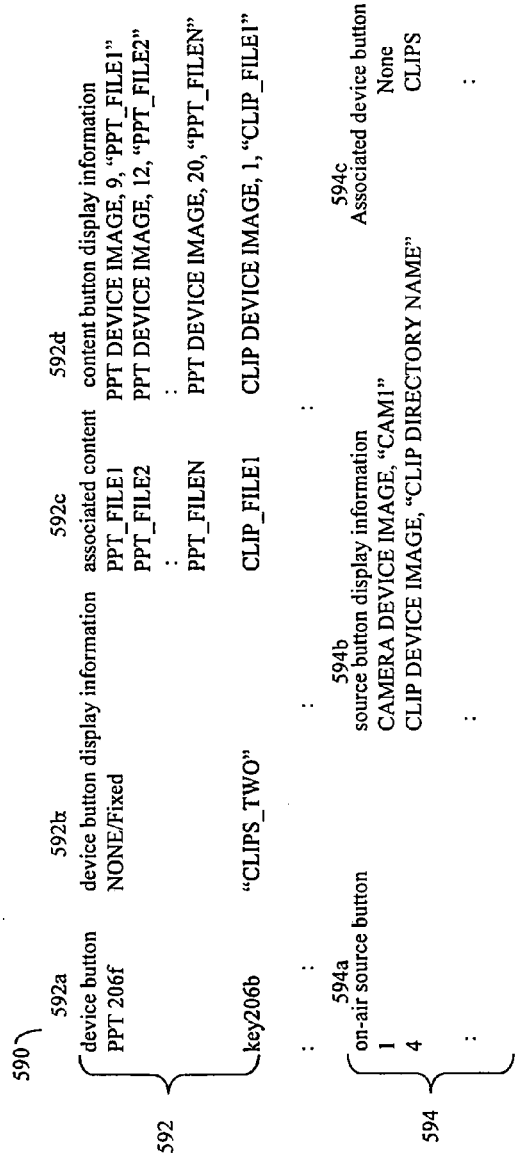
FIG. 14 is a representation of show definition data that may be included in an embodiment.

Referring now to FIG. 14, shown is one representation 590 of data that may be stored in connection with a show definition. The data of 590 may be stored in a file included in a file system of the workstation. Included in 590 may be the device button information 592 (for the device selection buttons of 206 of FIGS. 5 and 6) and source button information 594 (for the on-air source buttons 252 of FIGS. 5 and 6). In this example, the device button information may include one or more rows of data for each device defined. The device button information 592 may include device button data 592*a*, device button display information 592*b*, associated content 592*c* and content button display information 592*d*. The data in 592*a* may physically identify the particular button on a control panel being defined. The data in 592*b* may specify the text or other information to be displayed on the device button. Associated with each device button may be one or more occurrence of data in 592*c* and 592*d*, one for each content element. The data in 592*c* may specify the actual file name or other identifier as to where the particular content may be found during a broadcast when the show definition is used at a later time. The data in 592*d* may specify the display of each content button. For example, for the file PPT_FILE1, the corresponding content button is the numeric keypad position 1. The display of this content button includes a top portion with the PowerPoint device image, an associated numeric content identifier of "9", and the filename of the content "PPT_FILE1". The source button information 594 may include on-air source button data 594*a*, source button display information 594*b*, and an associated device button 594*c*. The data in 594*a* may identify the physical button on the control panel being defined (such as in area 252 of FIGS. 5 and 6). The data in 594*b* may specify the data to be displayed on the source button of 594*a*. In this example, a particular image or bitmap may be defined followed by a text string. The data in 594*c* may specify which device button is associated with this particular source.

It should be noted that the show definition data may include data other than as shown in 590 including, for example, show name and number data, particular functionality associated with controls in area 204 of FIGS. 5 and 6. For example, an embodiment may include definitions for plug-in or third party devices using data similar to that as included in 592.

A show definition may be loaded and used in connection with an on-line live broadcast. What will now be described is an example of a system using a previously created show definition.

Figure 15:
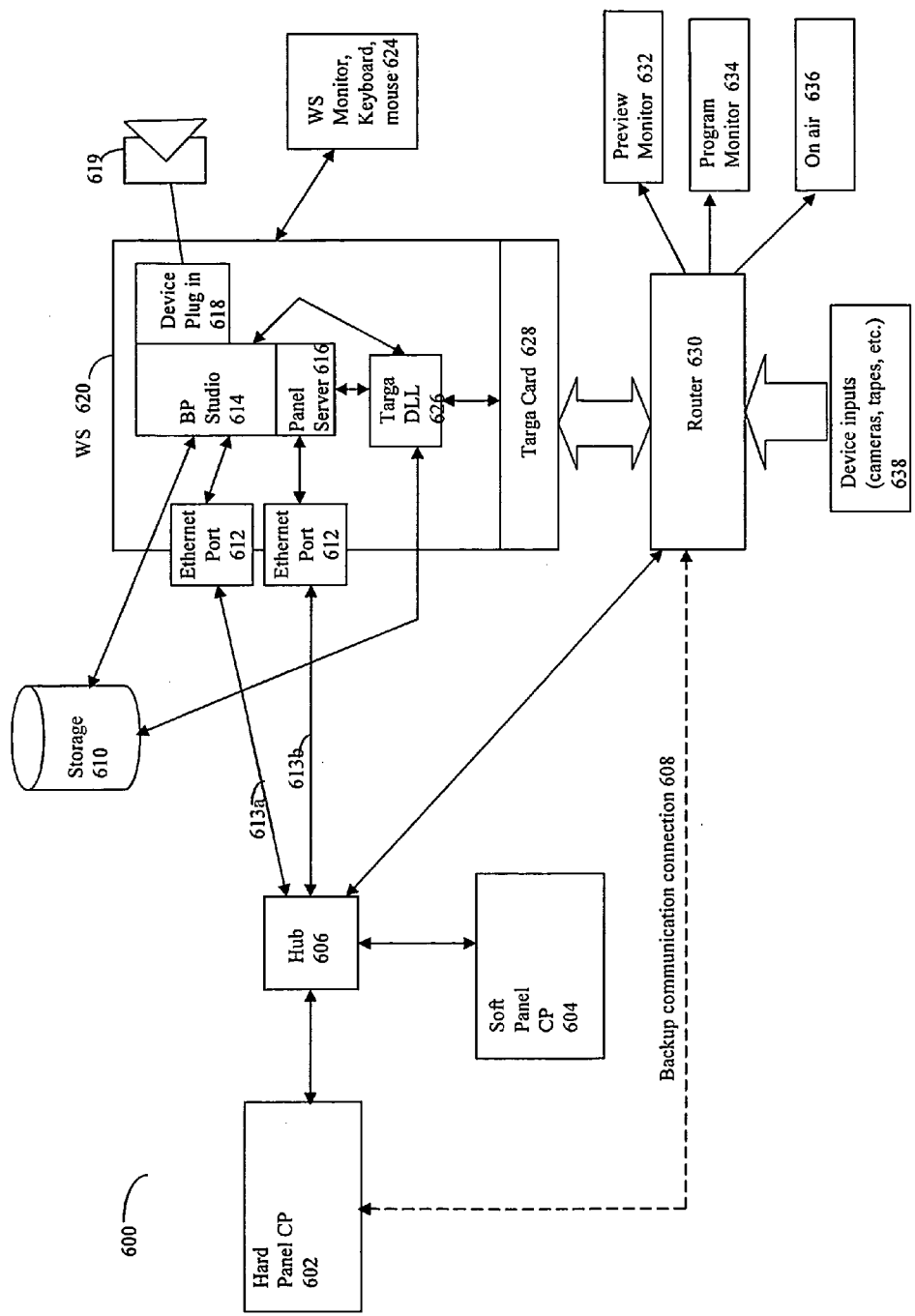
FIG. 15 is a more detailed example of components that may be included in an embodiment of a system of FIG. 1.

Referring now to FIG. 15, shown is an example 600 of components that may be included in a system used for performing a live broadcast. The example 600 includes more detail of each of the components control panel, workstation, router and devices described elsewhere herein. The example 600 includes a hard control panel 602 and a soft control panel 604 connected to a hub 606. The hub 606 is connected to the workstation 620 through an Ethernet port 612. The hub 606 is also connected to the router 630 for use in controlling various devices. In this example, the devices include the following output devices: previewer monitor 632, program monitor 634, and on-air output 636, and the input devices 638. The hard control panel 602 also has a backup communication connection 608 to the router 630 for controlling the devices in a live broadcast in the event that the workstation becomes unavailable during the broadcast. The use of the backup connection 608 provides an alternative means to control the devices used in the live broadcast.

The workstation 620 in this example 600 includes a BPStudio program 614, a panel server 616, a device plug-in 618, and a TARGA DLL 626. The workstation 620 has associated input and output devices 624 including, for example, a keyboard, mouse, and monitor that may be used in operation of the workstation 620. The panel server 616 communicates with the hard control panel and/or soft control panel using XML messages. The panel server 616 receives incoming XML messages and also transmits any outgoing XML messages exchanged with the control panels 602 and 604. In this embodiment, the hard control panel controls the operation of the show. The soft control panel 604 operates on a processor, such as included in a laptop, separate from the workstation 620. The BPStudio application 614 handles communications with the router 630 via the TARGA DLL 626 and TARGA Card 628. The TARGA DLL may include device interface routines for communicating with 628 and the router 630 in controlling the devices connected thereto. The device plug-in 618 may be used to communicate with the particular third party device 619 such as, for example, a device for controlling the pan and tilt of a camera, lighting, and the like. It should be noted that data transmissions may be sent between the workstation and the various devices connected to the router through the TARGA Card 628. Control commands to the router, as may be used in controlling which input sources are routed to which output sources, are sent through a second Ethernet port 612 to the hub 606 as indicated by 613a to the router 630. Different data stores, such as clip stores and the like, may be transmitted to the particular device on the router through the TARGA card 628.

The BPStudio application 614 performs the processing associated with controlling the show. At the beginning of a show, the application 614 reads the previously stored show definition data and communicates with the control panel(s). Data is sent to the control panels to initially set up the control panels for this particular show. The data may be communicated as one or more XML messages to define the control panels as described herein. The application 614 keeps track of the current configuration state of each control panel as well as other system-wide state information that affects the state of all control panels. Configuration state information of each control panel may include the particular control and associated state. For example, configuration state information for a control such as a knob in region 204 of FIGS. 5 and 6 may include a device identifier of the currently selected device associated with the controls, a knob identifier identifying the physical knob control on the control panel, and a numeric value indicating a setting of the knob such as an index associated with a content identifier. The application 614 also keeps track of other system-wide state information such as, for example, device state information with respect to the entire system. This device state information does not vary with each control panel. The device state information may indicate, for example, states about input and output devices of the system, such as which input source is currently transmitting data to what output source. The configuration state information and device state information for each control panel is managed by the application 614 during the show.

During the show, an operator may make selections from the hard control panel and/or soft control panel. These selections are communicated to the panel server 616 through 612 also in the form of XML messages identifying the particular control panel. The requested selection from a control panel may cause a change to state information for only the particular control panel. The requested selection may also cause a change to system-wide state information. In response to a message which affects only a single control panel's state information, only that control panel is updated. In response to a selection that changes the system-wide state information, all control panels are updated.

As an example of a message sent from a control panel which causes an update to only that control panel, consider the following. An XML message sent from the control panel to the workstation may identify the particular control and a new state as requested in accordance with a selection. The application 614 retrieves and updates the configuration state information of the respective control panel and communicates any new data back to the control panel. An operator on the control panel may make a new device selection in region 206, the application 614 returns in response the new state information to indicate the selected device key as active (e.g., a color change), and the new content display button data for buttons 222 in region 220.

The messages from a control panel may indicate a state change with respect to content to and/or from the devices connected to the router 630. This may be a system-wide state information change such as, for example, changing which content or input source is associated with the on-air output 636, program monitor 634, and/or previewer monitor 632. Such a request causes an update of the buttons on each control panel, for example, by changing appropriate button colorings to indicate the state change of on-air, preview, and the like. The application 614 controls these input and output sources by communicating with the router, device plug-ins, obtaining data from the data stores on storage device 610 (such as, for example, for clips, logos, and the like stored on the workstation's devices). In the event of a system-wide state change, the configuration data of all control panels may be updated, as maintained by BPStudio 614. Also, all control panels may have their displays updated in accordance with this system-wide change, such as selection of a new on-air or preview source, by the broadcasting of the control panel settings to all control panels from the workstation.

The foregoing describes operation of one configuration in which the hard control panel may be used to control the operation of the show over a primary Ethernet connection. In the event that the hard control panel 602 determines that the primary Ethernet connection and/or the workstation is otherwise unavailable, the backup connection 608 may be used to control operation of the devices connected to the router. Additional details of how an embodiment may determine that the workstation is off-line and re-establishing communications therewith when back on-line are described elsewhere herein.

It should be noted that, as described elsewhere herein, the workstation 620 may also be used in executing the pre-production software for generating a show definition. An embodiment may also include other software which provides for simulating the running or production of a show and other pre-production processing on another processor other than the workstation.

Figure 16:
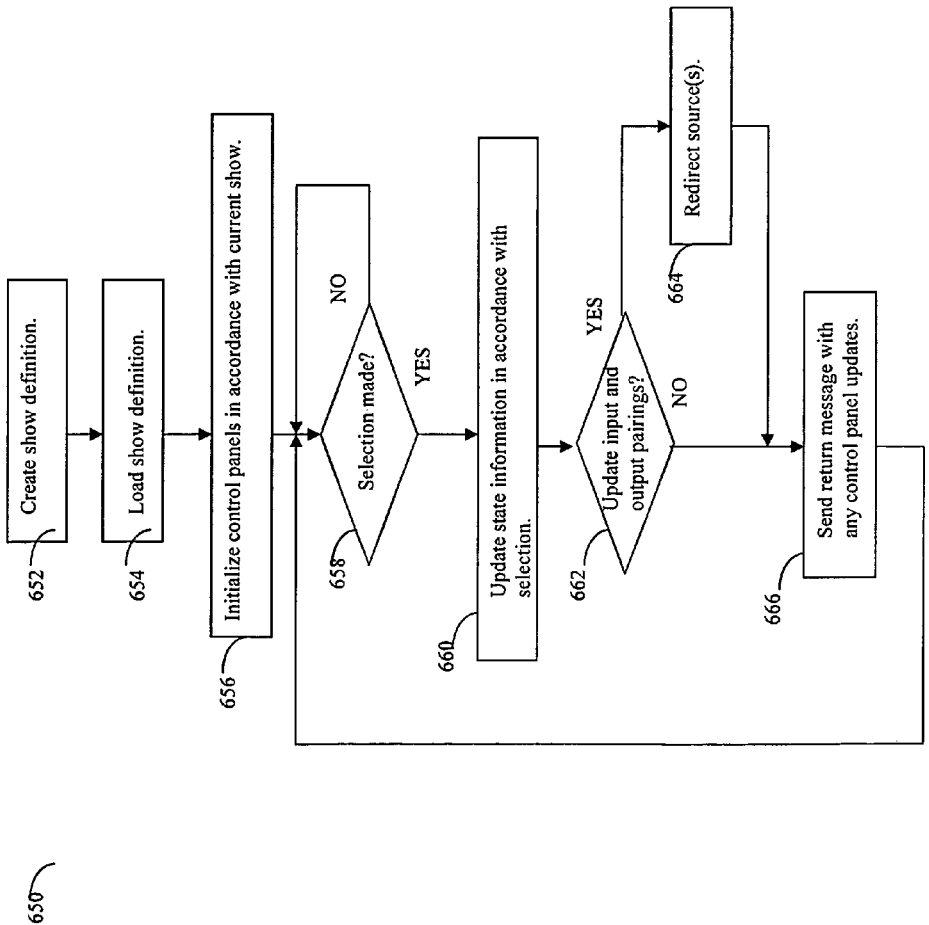
FIG. 16 is a flowchart of processing steps that may be performed using an embodiment of a system of FIG. 1.

Referring now to FIG. 16, shown is a flowchart 650 of processing steps that may be performed in one embodiment of a system 600. The steps of 650 summarize the general processing set forth above. At step 652, a show definition is created such as, for example, using the pre-production software. At some later point in time, the show definition may be used in a live broadcast. At step 654, the show definition is retrieved and loaded for use in the workstation, such as by application 614. At step 656, the one or more control panels are initialized in accordance with the current show definition. This may be performed by transmitting the appropriate messages to the control panel(s) from the workstation. At step 658, the workstation waits until it receives a message from one of the control panels indicating that a control panel selection has been made. In response, the workstation, at step 660, updates the appropriate state information for one or more control panels and/or system-wide state information. At step 662, a determination is made as to whether the selection affects the current input and output source pairings, such as the particular content currently on the air. If so, the source pairings may be adjusted such as, for example, by redirecting a different input source to the preview monitor or on-air monitor. This may be performed by sending the appropriate control signals to the router as described elsewhere herein. At step 666, the workstation sends the appropriate response message to the one or more control panels to update displays as needed in accordance with the previous selection determined at step 658. Control returns to step 658 where the workstation waits and processes the next control panel selection.

It should be noted that an embodiment as described herein may include multiple control panels. In the event that multiple control panels are included in an embodiment, certain portions of the control panel are always synchronized in accordance with selections made on one control panel that globally affect the state of the system and thus the other control panels. With reference to FIG. 5, the portions of the control panel that are always synchronized include, for example, the on-air source selection 252, preview source selection 256, and controls in the transition section 24, and 230. Additionally, an embodiment may include a mechanism providing for synchronization of remaining portions of all control panels that otherwise are not kept in lock step synchronization. This may be used, for example, when training an operator on a first control panel when a trainer is on another control panel. The synchronization option may be turned on/off during running of the actual show using a control option included in the workstation. The control panels are synchronized such that selection of a button on one causes the same selection of all controls to occur on another control panel.

The foregoing may be used in any one of more different configurations and applications. What will now be described are some examples of systems and applications that may use the components described herein.

Figure 17:
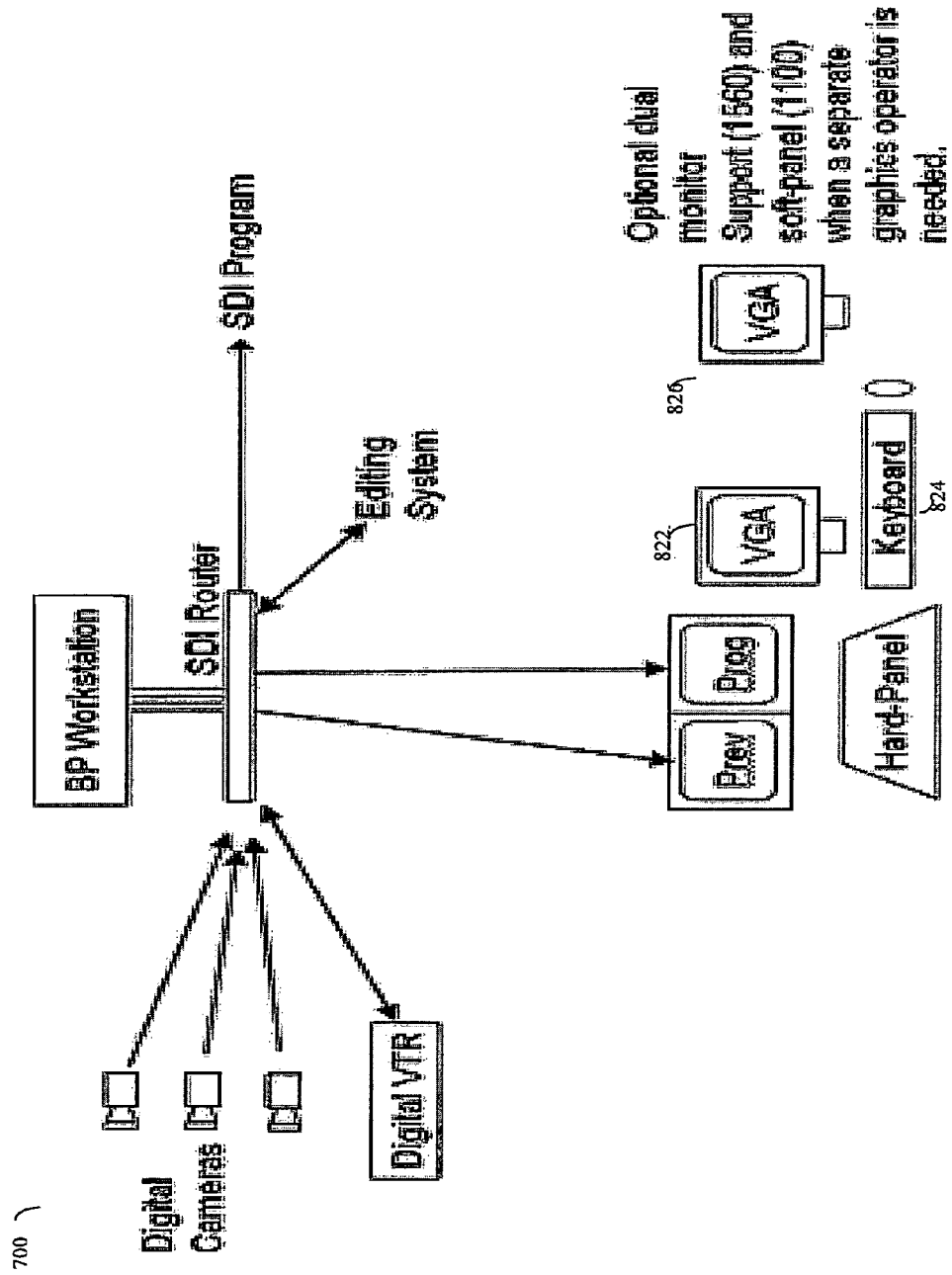
FIGS. 17-20 are examples of embodiments of the system described herein used in different applications.

Referring now to FIG. 17, shown is an example 700 of a system configuration. The system 700 may be a digital video studio including 3 cameras, a digital video tape recorder (VTR) and monitors. The router is connected to program and previewer monitors. With reference to this figure and others, not all connections are shown between all devices for the sake of simplicity. For example, the hard control panel is shown as not connected to anything. However, the hard control panel is actually connected to the workstation and router with the backup communication connection as described elsewhere herein. Similarly, the VGA monitor 822 and keyboard 824 are connected to the workstation. The VGA monitor 826 in this example includes a soft control panel and is connected to the workstation as described elsewhere herein.

In the example 700, each camera and the VTR plugs directly into the router. The router is also shown as being connected to an editing system for editing the different content sources. Shown is monitor 826 which in this example includes a soft control panel. A show may be produced with a single operator. However, a show may be more complex requiring a second operator that can sit at the soft control panel and manage one or more devices, such as graphics, on-air creation tasks, managing the title stores, still stores, logos and the like.

Figure 18:
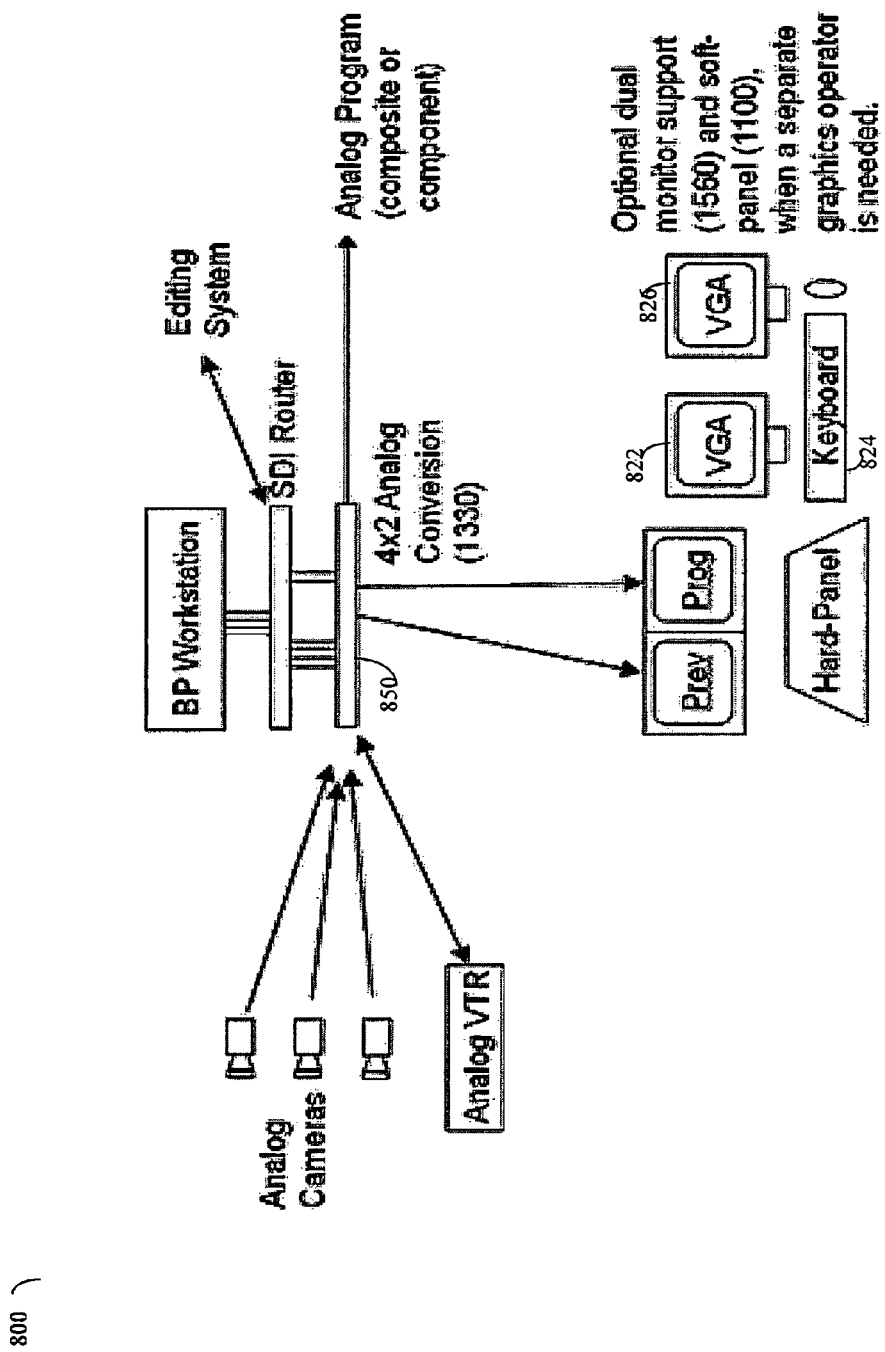

Referring now to FIG. 18, shown is an example 800 of another system configuration. In this example 800 with reference to the configuration of 700, there is an additional analog converter 850. The analog converter to perform A/D (analog to digital) and D/A (digital to analog) conversion as needed for the different components that may be included in the system for use with a digital router. This type of configuration may be used, for example, with older analog devices that may be used in a system.

Figure 19:
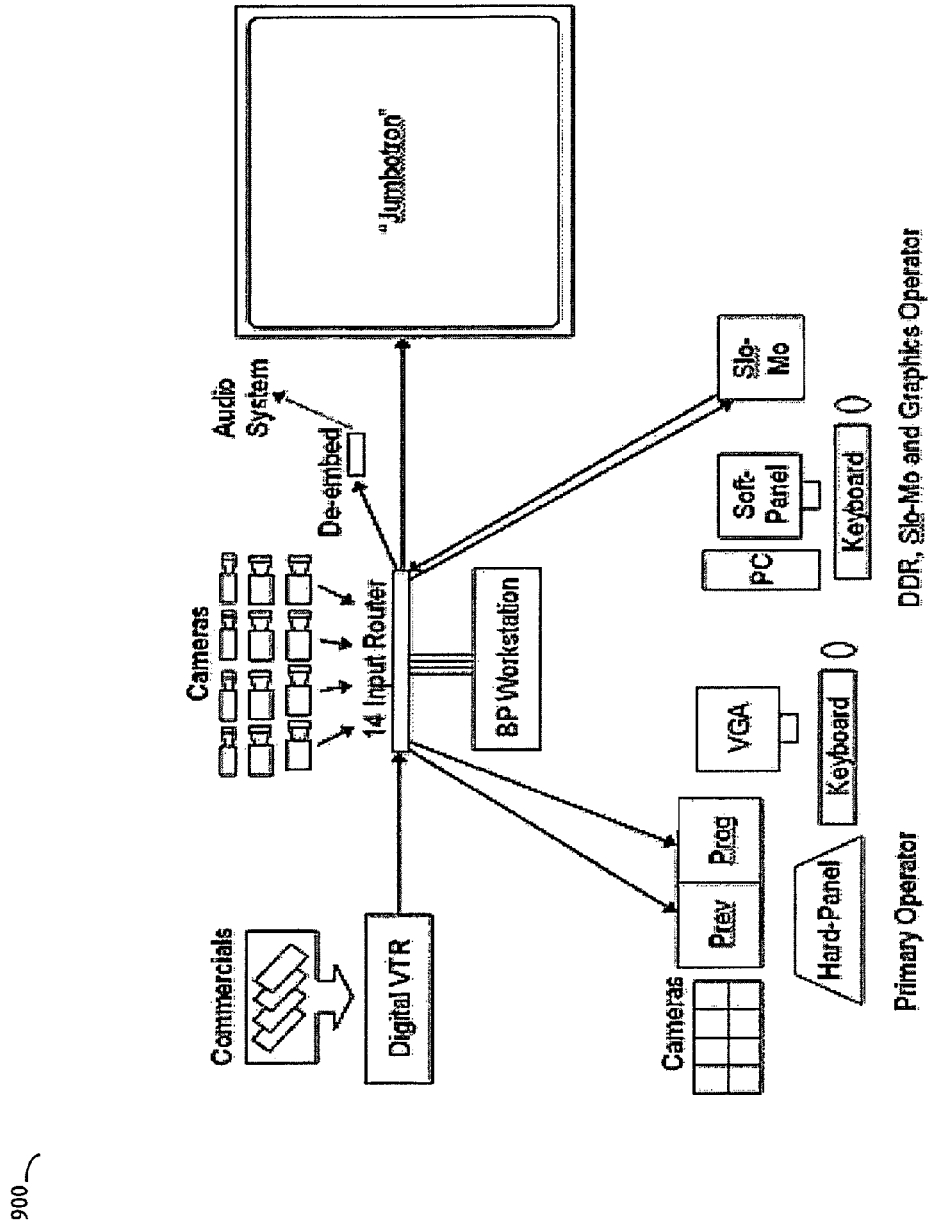

Referring now to FIG. 19, shown is an example 900 of another system configuration. In the example 900, the system may be used in connection with broadcasts such as, for example, with a jumbotron monitor for sporting events. The jumbotron monitor may be used to show game action to those in a stadium as well as instant replays, player shots, commercials during time outs, and the like. In this example 900, a larger 14 input router may be used for the many cameras. The system's hard control panel is used by the principle show operator. Two channels of still store are used, one for each team, as individual players are called up based on player numbers. An auxiliary camera output is sent to the slow motion (slo-mo) machine which is then fed back into the system. The hard control panel may then switch the slow motion to the jumbotron when desired. The slow-mo operator has a soft panel so that he may select the camera for slow motion input processing without disturbing the principle show operator. The slo-mo operator may also perform other functions, for example, such as control the digital recording and graphics. Commercials may be received on digital tape. Prior to the game, they are recorded onto the systems VTR along with embedded audio. The commercials may then be played out by when selected by the principle operator. A de-embedder may also be used to de-embed audio from a clip and send it to the stadium's audio system. The system's VTR may also be used to play sound effects, such as sounds played during content transitions, crowd motivating sounds, and the like.

Figure 20:
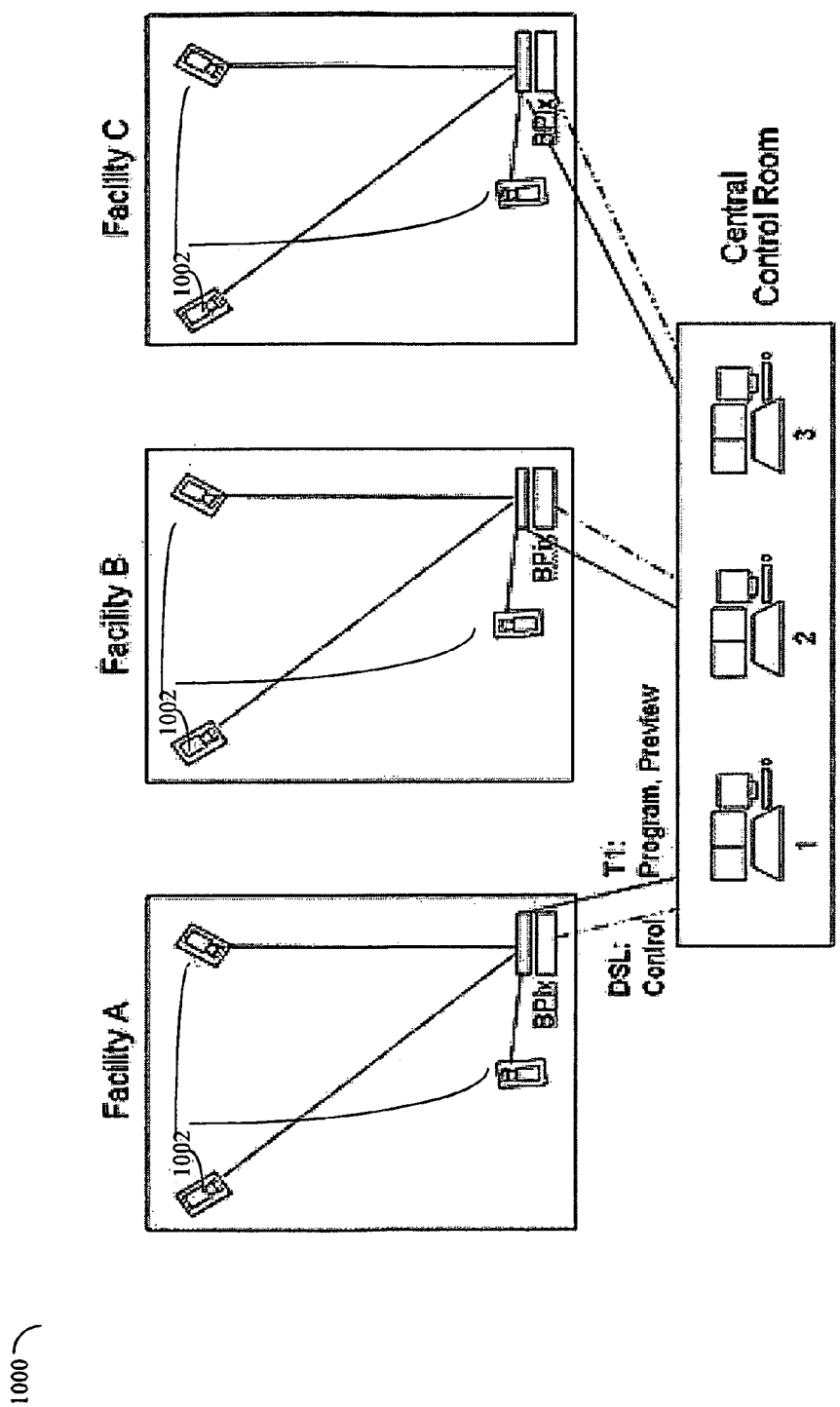

Referring now to FIG. 20, shown is an example 1000 of another system configuration. The example 1000 is a system that may be used in connection with 3 dispersed studios or facilities controlled from a single central control room. In this example 1000, each studio or facility includes a workstation and router. Control panel(s) and monitor(s) are located in the central control room. The control panels are connected to each studio by a DSL line. Each studio also has a dedicated T1 line to send video, for example, such as program and preview outputs. Each camera 1002 has remote control so the control room operators are able to remotely control each camera's position, focus, zoom, and the like. Use of the central control room in this embodiment may result in reduced staffing. The studios may be geographically dispersed across one major city or across the entire country. In this example, there may be hardware and/or software used to control the cameras and associated functions thereof.

The foregoing are just some example applications and configurations using the different techniques and components described herein.

It should be noted that the particular hardware and/or software described herein may be implemented using any one or more different techniques and/or components. For example, the pre-production software may be written in the C# (C-sharp) programming language and using Microsoft's .NET software tools and applications. The soft control panel may be a graphical user interface and may be implemented using Flash Player by Shock Wave running standalone or in a browser, such as Microsoft's Internet Explorer. Other embodiments may use other software to implement the techniques described herein.

It should also be noted that an embodiment may use other components in connection with fail-safe operation. Described herein is the use of multiple connections to control devices. Additionally, an embodiment may include, for example, redundant power supplies.

It should also be noted that an embodiment may combine functionality described herein illustrated in different components within a single component. For example, an embodiment may combine the functionality of the router 40 and workstation 30 in a single component. Additionally, functionality with the component may be implemented in hardware and/or software. For example, in the single component, some or all of the functionality associated with the router 40 may be implemented using software.

What will now be described are additional alternate embodiments and techniques that may be used therewith.

Figure 21:
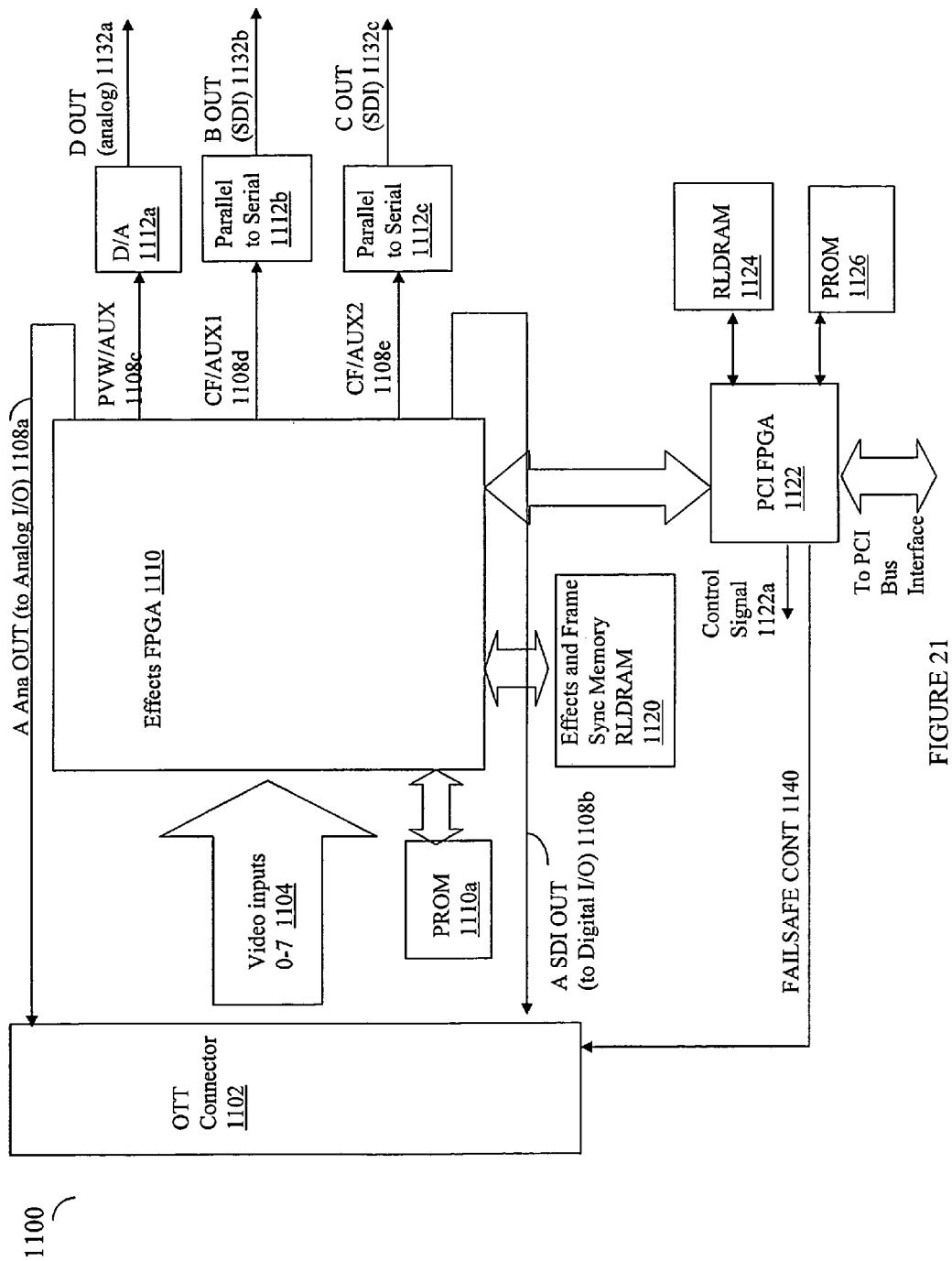
Figure 23:
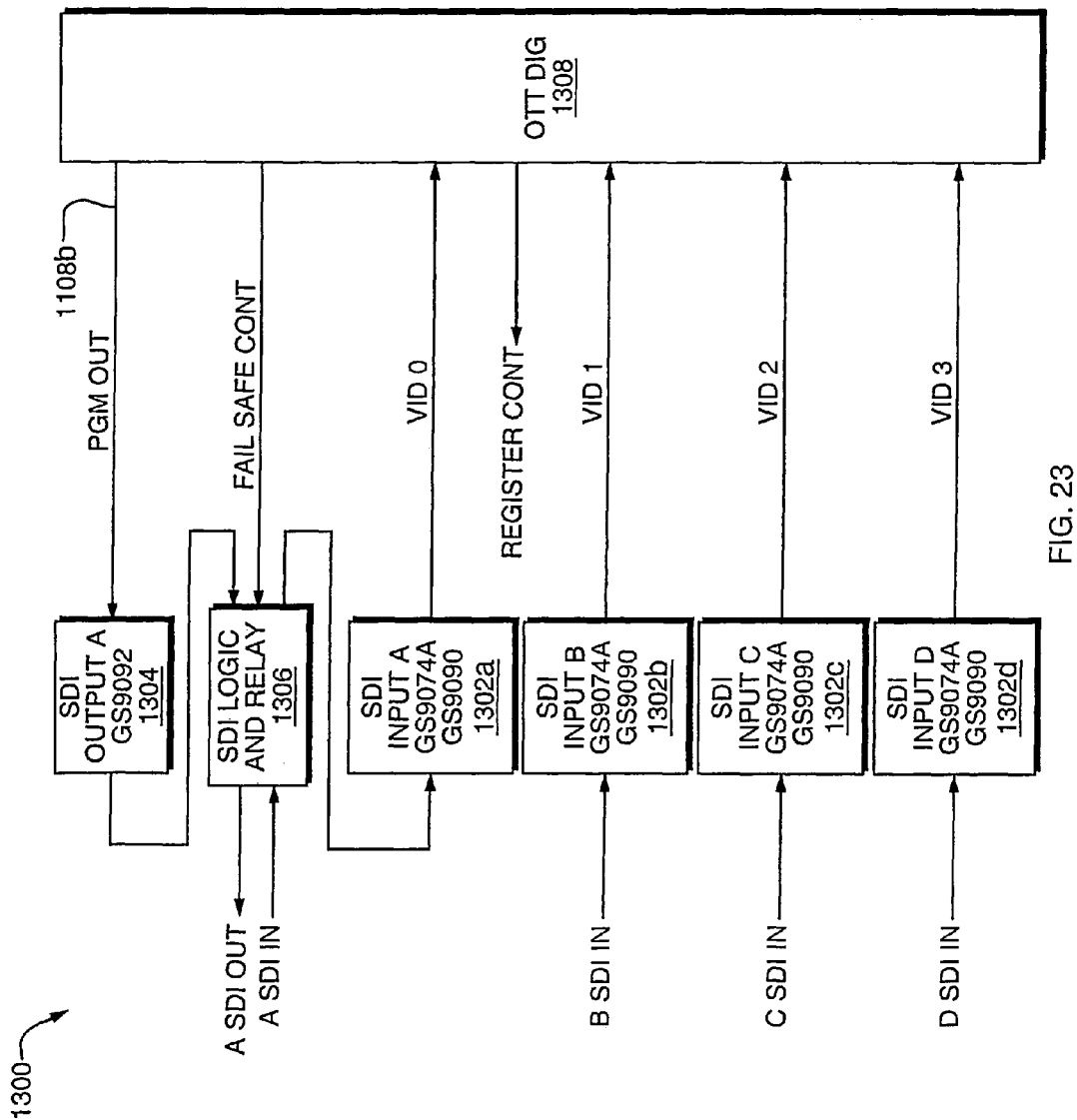
Figure 24:
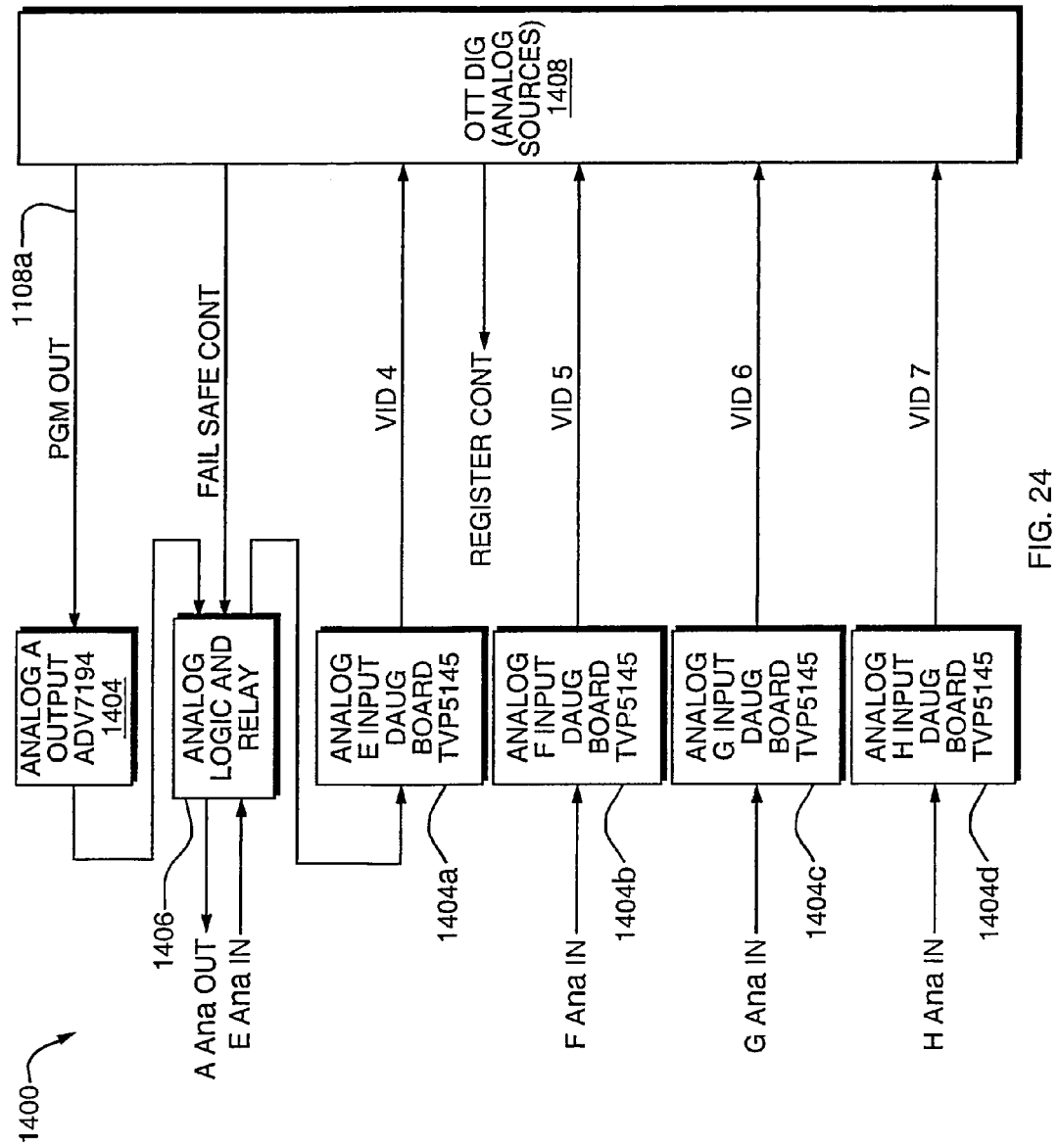
Figure 25:
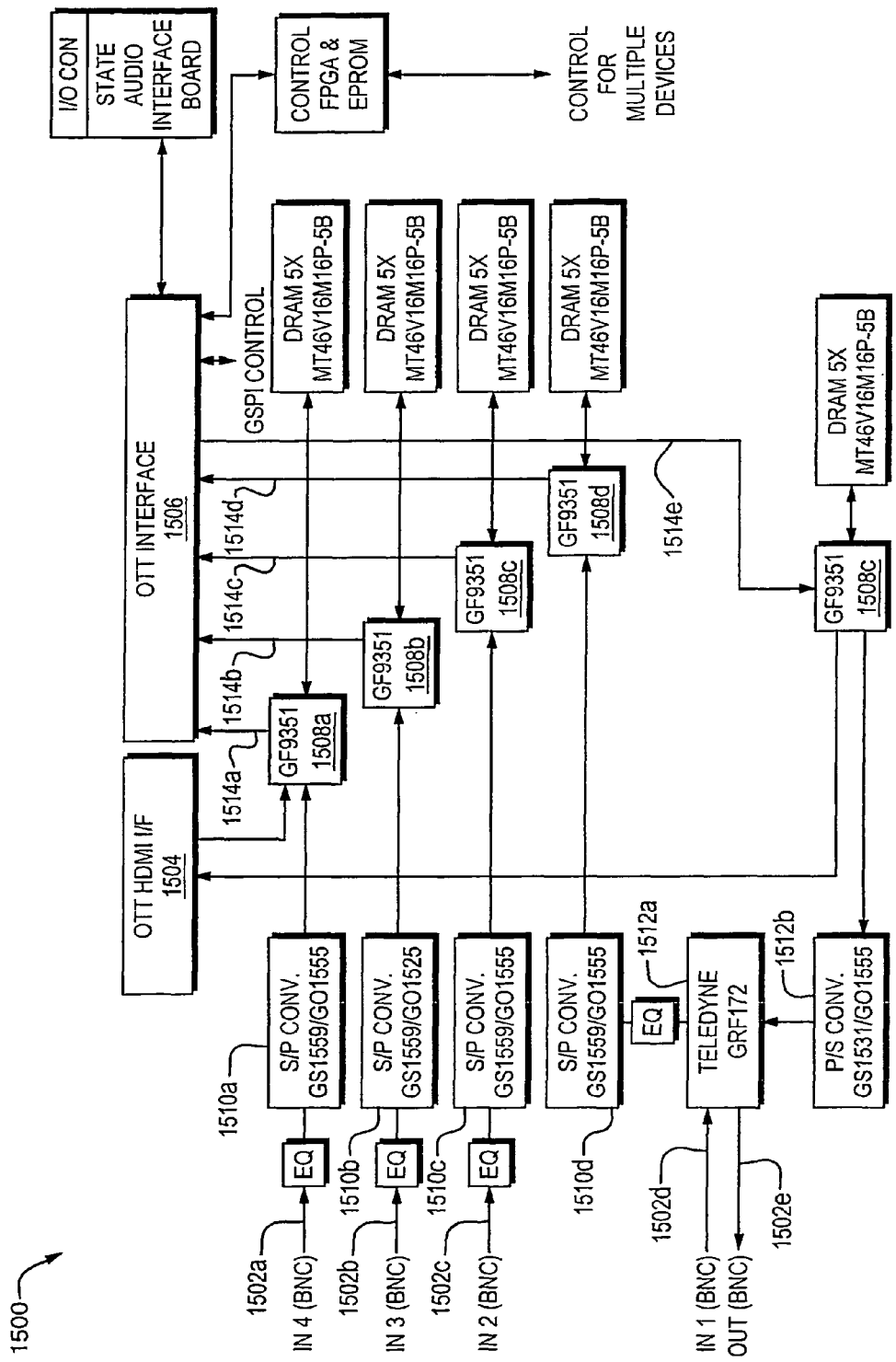

Referring to FIGS. 21-25, described are various printed circuit boards (PCBs) that may used in an embodiment with a computer system, such as the workstation 620 of FIG. 15. FIG. 21 is an embodiment of a main PCB for performing different transformations or operations to one or more inputs. FIG. 23 illustrates an example of a digital input board. FIG. 24 illustrates an example of an analog input board. FIG. 25 illustrates an example of a HD (High Definition) SD (Standard Definition) I/O Board. The inputs from up to two of the boards of FIGS. 23, 24, and/or 25 may be used to provide video input signals which are processed, alone or in conjunction with other inputs, by the main PCB of FIG. 21.

The PCBs may be software-controlled from software on the workstation 620 of FIG. 15 in a manner similar to controlling the Targa card using an interface to communicate therewith from the workstation. The PCBs (e.g., of FIGS. 21, 23, 24 and/or 25) used in an embodiment may each be a separate board that mounts into a PCI slot of a computer, such as computer system described in connection with FIG. 15.

Referring now to FIG. 21, shown is an example illustration of a main PCB that may be mounted in a PCI slot of a computer system, such as described in connection with the workstation 620 of FIG. 15. The example 1100 includes component 1102 which is a connector connecting signals between the main PCB and up to two other PCBs of FIGS. 23, 24, and/or 25 as may be included in an embodiment. The connector 1102 may be an over the top (OTT) connector block providing for connections of the various input and output signals of the main PCB and up to two other PCBs of FIGS. 23, 24, and/or 25 as may be included in an embodiment. Up to 8 video inputs 1104 may received by the main PCB 1100. The 8 video inputs may include two sets of four inputs. Each set of four inputs may come from one of the PCBs of FIG. 23, 24, or 25. The video signals 1104 are input to the FPGA 1110 for processing. As will be described in more detail in following paragraphs, the FPGA 1110 may be programmed to perform various transformation and processing operations characterized as digital video effects on the one or more input signals alone, or in combination with, selected other sources as described herein (e.g, clips, graphics, logos, and the like, as may be received from storage on the workstation or other computer system into with the main PCB is included for use). In this example, the FPGA 1110 generates 5 digital output signals: an output signal 1108a routed to the analog input board (e.g., FIG. 24), an output signal 1108b routed to the digital input board (e.g., FIG. 23), and signals 1108c-e. Signals 1108c-e may each correspond to a resulting output signal for a designated video output channel such as, for example, for programming, previewing, auxiliary, or a clean feed signal. Signals 1108a and 1108b in this example represent the program signal output. As described in more detail in following paragraphs, this signal is output to the analog I/O (signal 1108a) and digital I/O (signal 1108b) boards as a default failover signal.

Signal 1108c is a digital signal which is converted to an analog signal by D/A converter 1112a generating analog signal 1132a. Signals 1108d and 1108e are digital parallel signals which are converted to digital serial signals, respectively, by converters 1112b and 1112c generating signals 1132b and 1132c. Besides performing transformation and processing operations on one or more of the video inputs 1104, the FPGA 1110 may also perform processing on one or more other inputs received from the computer system over the PCI bus. Inputs that may be received over the PCI bus for processing by the effects FPGA 1110 may include, for example, clips (including video and optionally audio information), stills or single images such as logos, and graphics or animations that may stored on a data storage device of the computer system such as workstation 620. Inputs from the PCI bus (e.g., clips, logos, and other input sources from the computer system) may be received by the PCI FPGA 1122, stored temporarily in RAM 1124, and then communicated to the Effects FPGA 1110 for storage in the RAM 1120 when processing is performed by the FPGA 1110. The RAM 1120 may be characterized as memory local to the FPGA 1110 for use in connection with its various processing operations (e.g., such as when buffering data used during processing). The Effects FPGA 1110 may be programmed in accordance with information stored on PROM 1110a. The PCI FPGA 1122 may be programmed in accordance with information stored in the PROM 1126 to perform its operations in connection with the PCI bus. The RAM 1124 may be used as a local memory by the FPGA 1122 when performing its processing, buffering, and the like, for data communicated to/from the PCI bus. The FPGA 1122 may also generate one or more control signals 1122a for use when performing operations, such as communicating data to/from the PCI bus. The particular one or more control signals generated depend on the chips or other components included in a system. For example, there may be a particular control signal in accordance with an industry standard used by a particular component included in one of the PCBs of an embodiment.

It should be noted that components of the main PCB of FIG. 21 may also be used in connection with processing audio data as may be included, for example, in clips having audio and video data. In an embodiment which supports audio processing as well as video processing performed by components of the main PCB of FIG. 21, the audio data may be communicated to/from the PCI bus using the PCI FPGA 1122. Audio data received may be processed by the Effects FPGA 1110. In such an embodiment, it will be appreciated by those skilled in the art that a separate card or PCB may also be included for processing audio data and may be appropriately connected to the main PCB for processing the audio data.

An embodiment of the main PCB 1100 may also include a FAILSAFE CONT signal 1130 used to implement failsafe functionality. In an embodiment which includes the main PCB, the failsafe functionality of the main PCB may be used as an alternative to the failsafe functionality described elsewhere herein, for example, when the computer system is determined as unavailable. The failsafe functionality of the main PCB may automatically route default analog and digital inputs, respectively, to analog and digital output signals in the event of a failure (e.g., power failure, computer system failure, computer system unplugged, etc.). The main PCB may detect a failure as indicated by the FAILSAFE CONT signal 1130. The signal 1130 may be provided as an output of the main PCB to the OTT connector 1102 for use by other PCBs, for example, the digital and analog input boards to perform the foregoing default routing in the event of a failure. The PCI FPGA 1122 may output the signal 1130 when it detects a failure with the computer system. In one embodiment, the FPGA 1122 may determine a computer system failure or other error causing generation of signal 1130, for example, if the FPGA 1122 is not contacted by code executing on the computer system within a time period with a new set of control settings. The control settings are described elsewhere herein and used by the Effects FPGA 1110 in connection with performing the DVE and combiner operations described herein.

Figure 21A:
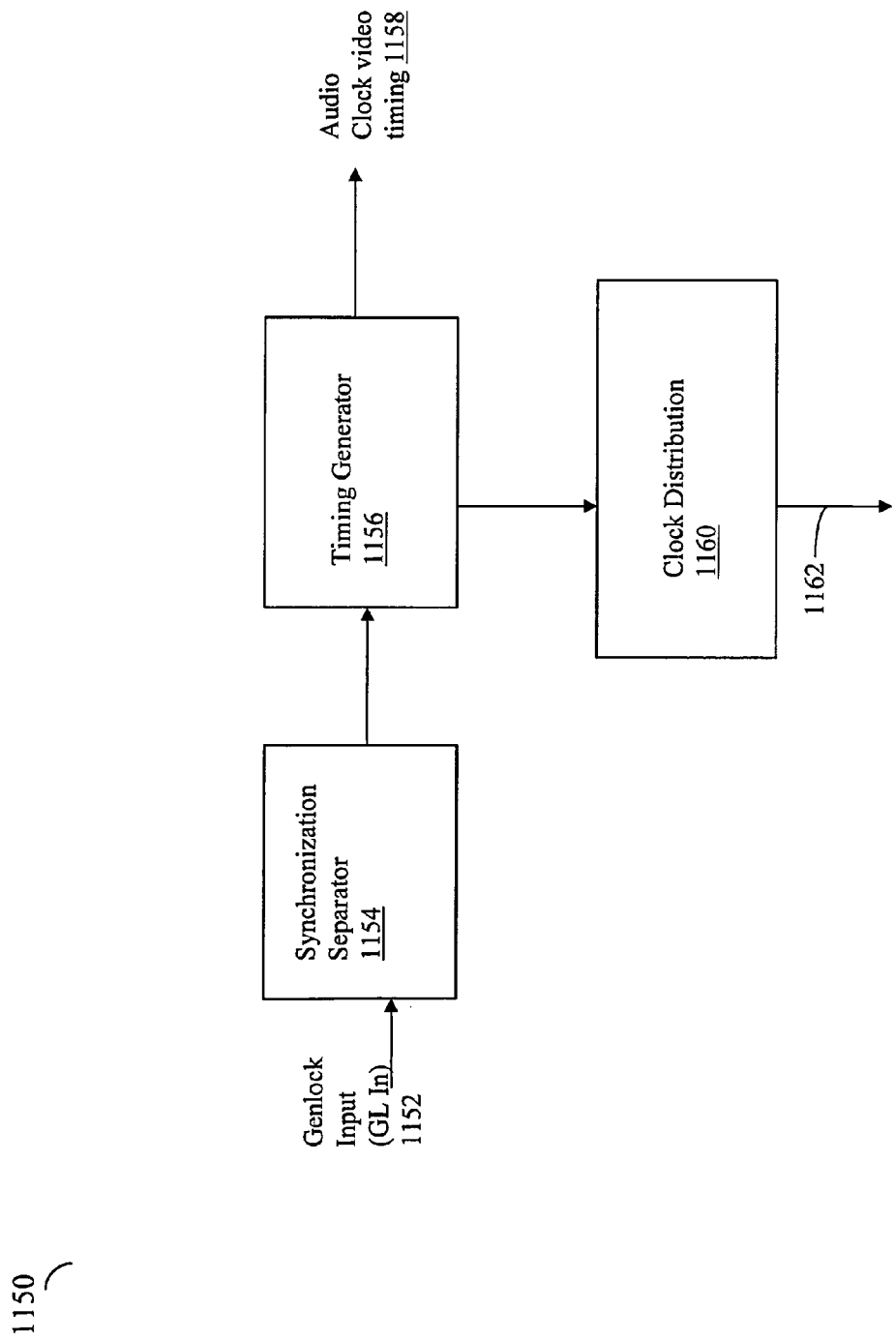

Referring now to FIG. 21A, shown is an example of synchronization signals and components that may also be included in an embodiment of the main PCB. As known in the art, a genlock (or generator lock) signal may be used in connection with synchronizing video sources. The genlock signal 1152 may be input to a synchronization separator 1154 to separate out the required synchronization data from signal 1152. The output of 1154 is input to the timing generator 1156. The component 1156 generates timing signal 1158 (e.g., audio clock video timing signal) and a second signal input to the clock distribution 1160. The component 1160 outputs signal 1162 used as a control signal for FPGAs and other components included in the boards of FIGS. 23, 24 and/or 25 of an embodiment. The signals 1158 and 1162 may be output to the OTT connector 1102 for use by appropriate components of the boards of FIGS. 23, 24, and/or 25 that may be included in an embodiment.

As described herein, video sources may be synchronized or unsynchronized. Synchronized sources, for example, may use a genlock signal. In connection with unsynchronized video sources, any one of a variety of different techniques known in the art may be used to synchronize signal received therefrom.

As will be described in more detail, the Effects FPGA 1110 may be programmed by loading configuration information to PROM 1110a located on the main PCB. The FPGA 1110 may read instructions from the PROM 1110a to configure the FPGA 1110. When it is desired to reprogram the Effects FPGA 1110, new configuration information may be loaded to PROM 1110a which may then be subsequently used to configure the FPHA 1110. This permits new features and functions to be added at a customer's site by loading new configuration data to the PROM 1110a used for reconfiguring the Effects FPGA 1110. The Effects FPGA 1110 and its usage in performing processing of the video inputs, alone or in combination with other inputs such as, for example, SD video from cameras, clips, still images and graphics, is described in more detail in following paragraphs.

Referring now to FIG. 23, shown is an example of a digital input board. The example 1300 includes 4 serial digital video input signals A SDI IN, B SDI IN, C SDI IN, and D SDI IN. Each of these input signals are converted to parallel video signals, respectively, by converters 1302a-1302d and output to the OTT connector 1308 for use, for example, by the main PCB of FIG. 21. It should be noted that the signal 1108b previously illustrated in FIG. 21 is a parallel digital signal which is converted to a serial output signal by converter 1304 and then routed to the logic and relay component 1306. The component 1306 may be used to provide an output in the event of an unexpected failure. The signal FAILSAFE CONT may be used to indicate whether there has been a failure, such as a power failure, computer system failure, and the like. If such a failure is indicated by the FAILSAFE CONT signal, the component 1306 may route the A SDI IN signal as the A SDI OUT signal to provide for a default digital output signal in the event of a failure. Otherwise, without such a failsafe provision, there may be no digital video signal output generated. "Register cont" represents a serial control bus for reading/writing registers of the components on the board, and is connected to signal 1122a on FIG. 21.

Referring now to FIG. 24, shown is an example of an analog input board. The example 1400 includes 4 analog video input signals E, F, G and H Ana IN. Each of these input signals are converted to digital signals, respectively, by converters 1404a-1404d and output to the OTT connector 1402 for use, for example, by the main PCB of FIG. 21. It should be noted that the signal 1108a previously illustrated in FIG. 21 is digital signal which is converted to an analog signal by converter 1404 and then routed to the logic and relay component 1406. The component 1406 may be used to provide an output in the event of an unexpected failure. The signal FAILSAFE CONT may be used to indicate whether there has been a failure, such as a failure the computer system and the like. If such a failure is indicated by the FAILSAFE CONT signal, the component 1406 may route the A Ana IN signal as the A Ana OUT signal to provide for a default analog output signal in the event of a failure. Otherwise, without such a failsafe provision, there may be no analog video signal output generated. "Register cont" represents a serial control bus for reading/writing registers of the components on the board, and is connected to signal 1122a on FIG. 21.

Referring now to FIG. 25, shown is an example block diagram of an HD SD I/O board. The example 1500 includes components that may be used to perform progressive processing of digital images which may be in progressive or interlaced format. As known in the art, SD NTSC (National Television Systems Committee) and PAL (Phase Alternating Line) video consists of images sent at approximately 30 or 25 frames per second, divided into 2 separate fields, sent at twice the frequency. These fields consist of alternating lines from the frames, and image data in this format is called interlaced. Data that is sent as successive lines is called progressive.

The example 1500 includes 4 input signals 1502a-1502d which may be either progressive or interlaced. Each of the 4 input signals 1502a-1502d may be converted to a parallel signal, respectively, by converters 1510a-1510d and then processed, respectively, by components 1508a-1508d to provide 480 p (480 progressive scan) signals 1514a-1514d which are twice the data rate of standard DTV (SDTV). Signals 1514a-1514d may then be provided to the OTT interface 1506 as inputs to the main PCB of FIG. 21. The DRAMs included in the example 1500 may be used in connection with buffering data upon which processing is performed by the components connected thereto.

The signals 1514a-d may be used as inputs to the main PCB of FIG. 21 so that interlaced sources are converted to progressive by the HD SD I/O board before being processed, such as scaled and combined, by the main PCB resulting in higher quality results when the images are scaled or positioned. The results of the processing may then be output by the main PCB as signal 1514e in an interlaced format. It should be noted that the main PCB may generate output signal 1514e sent to the HD SD I/O board which is interlaced. An embodiment of the main PCB may also generate an output signal to the HD SD I/O board which is progressive, such as 480p. The signal 1514e is then processed by component 1508e to scale the signal to a high definition (HD) format, such as 720p, and provide an input signal to the parallel to serial converter 1512b. The output of 1512b is input to component 1512a which switches on the input signal FAILSAFE CONT (not shown) and generates output signal 1502e. As described elsewhere herein, if the computer system, for example, experiences a failure, the FAILSAFE CONT signal may be used to switch a default output signal as output 1502e rather than 1512b. Also included in FIG. 25 are the following components: EQ which is a cable equalizer, GSPI Control (Gennum Serial Peripheral Interface) is a serial control bus for controlling all the chips on the board 1500, OTT 1504 connector is a connector to support additional input/output formats such as DVI or HDMI, 1508a-1508e are Image Processors for: A-D (analog to digital) HD to SD/ED conversion and e SD to HD conversion, 1512a is a (Teledyne GRF172) relay to implement Failsafe switching, "Control FPGA & EPROM" represents a control FPGA that is a programmable device to interface all the chips on the board 1500 to the main board of FIG. 21 and an EPROM storage for configuration of the programmable device (FPGA). Control signals from the main board come through the OTT board 1506 to store new programming in the EPROM for the FPGA and control the other chips on the board using a custom serial interface implemented in the FPGA.

It should be noted that in an embodiment may also include connections to other boards, such as an audio board as illustrated in FIG. 25.

The HD SD I/O board provides signals for use with the main PCB at higher resolutions. The main PCB has advantages in mixing HD video into a production. As known in the art, HD video comes in many formats, some progressive, and some interlaced. A traditional way to incorporate HD video in an SD video switcher would be to use an external converter to down-convert the video to SD interlaced video. Rather than do the foregoing, an embodiment may use the HD SD I/O board of FIG. 25 to provide 480p input signals to the main PCB of FIG. 21.

It should be noted that an embodiment of the main PCB of FIG. 21 may also perform internal processing using the Effects FPGA 1110 to improve the quality of an input source which is not progressive, such as, for example, when using an input source from a component other than the HD SD I/O board illustrated in FIG. 25. In other words, the main PCB may perform processing to convert an input source to the 480p format which is not already in such a format for processing within the main PCB. The main PCB may then perform processing in 480p which is double the data rate for interlaced SD video. This results in higher quality results when combining one or more other sources within the main PCB processing by the Effects FPGA 1110. The foregoing may be performed in conjunction with any video effect processing of the inputs as described in more detail herein.

With reference back to FIG. 15, in one embodiment, the main PCB and two of the three PCBs of FIGS. 23, 24, and 25 may be used in place of the Targa card 628 and the router component 630. In a second embodiment, the Targa card 628 may be replaced with the main PCB of FIG. 21 and the digital input board of FIG. 23. In this second embodiment, the router 630 may be used in combination with the foregoing two PCBs of FIGS. 21 and 23. In yet a third embodiment, another component called the Break-out-Box (BoB) (not shown) and the PCBs of FIGS. 21, 23 and 24 may be used in place of the Targa card 628 and router 630. In one aspect, this third embodiment may be characterized as an enhanced version of the first embodiment. The BoB, as described in more detail below, is a commercially available component from Broadcast Pix, Inc., of Burlington, Mass.

The BoB may be characterized as a multiple I/O video signal matrix switcher that interfaces several inputs and output formats including, for example, SDI, S-video, component analog, and composite video. Built in transcoders may be used to convert all input formats to a 10-bit digital processing architecture. The BoB may provide all output formats simultaneously. The BoB may be network controlled permitting communication with the main PCB of FIG. 21 through the use of a bus or other interconnection medium included in the computer system comprising the three PCBs described above. The BoB may also includes a fail safe control interface to switch video sources in the event of a computer system failure. The BoB may append and extract embedded digital video which respectively permits recording and/or playback of stereo audio. The BoB may include an effects keyer, a tally, and a GPI (general purpose interface) interface. The BoB may function as router having, for example, 8 inputs and other functionality including video format conversion and audio and tallying processing as just described. In connection with obtaining router functionality, an embodiment may use the BoB, a separate router component, or both the BoB and the router component depending on the number of inputs. For example, an embodiment may use the BoB with a router component if there are more than 8 inputs. In such instance, the router may be placed before (upstream from) the BoB. The BoB may be connected with video and control wires to the main PCB of FIG. 21 (depending on the components included in an embodiment). The BoB may also be connected to the hard panel for failsafe operation.

As described herein, the BoB incorporates functionality of the router along with additional functionality including, for example, signal conversion, audio embedding and de-embedding, tally processing and key layering. It will be appreciated by those skilled in the art that the functionality of the BoB may also be implemented using one or more commercially available components from one or more vendors rather than a single component, such as the commercially available BoB from Broadcast Pix, Inc.

FIG. 22 illustrates an example of an embodiment utilizing the PCBs of FIGS. 21, 23, and 24 with the connectors from each of the foregoing 3 PCBs of FIG. 21 (1202), FIG. 23 (1204) and FIG. 24 (1206) to a computer system, such as a personal computer (e.g., workstation 620 of FIG. 15) into which the three PCBs 1202, 1204, and 1206 are inserted for operation. Element 1202a represents the output signals 1132a-1132c of FIG. 21. Element 1202b represents the genlock input signal 1152 of FIG. 21A. Element 1204a represents the digital input signals A SDI IN, B SDI IN, C SDI IN and D SDI IN of FIG. 23. Element 1204b represents the digital output signal A SDI OUT of FIG. 23. Element 1206a represents the analog input signals E, F, G and H Ana IN of FIG. 24. Element 1206b represents the analog output signal A Ana OUT of FIG. 24.

It should be noted that, as described above, an embodiment may alternatively use the main PCB 1202 with the HD SD I/O board in combination with, for example, the analog input board 1206 or digital input board 1204 rather than with both 1206 and 1204.

It should be noted that any one of a variety of different commercially available or proprietary components may be used in connection with the techniques herein. For example, an embodiment may use FPGAs by Xilinx, and various components for video processing by one or more vendors such as Gennum Corporation, Texas Instruments, Intersil, as well as others.

What will now be described is an example illustrating use of techniques with a more traditional video architecture, such as may be implemented using the Targa card, in contrast to use of a single-pass or stage architecture, such as in an embodiment utilizing the main PCB.

Figure 26:
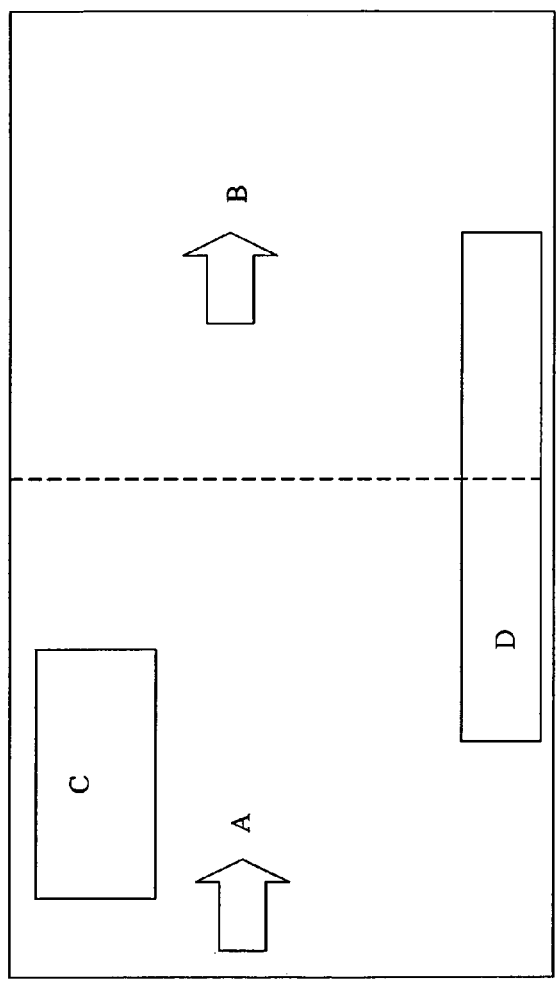
FIG. 26 is an example representation of video effects applied to inputs for a frame time.

Referring now to FIG. 26, shown is an example representation of a resulting video display. This example 1600 is for purposes of illustrating the use of techniques herein. The example 1600 includes a first input A which is transitioning onto the screen as B is transitioning off of the screen. In other words, there is a push effect of A pushing B. C may represent another input source, such as another video input, still or image, which is first scaled to fit into a box as indicated and then positioned within A. With each frame time, more of A is included in the resulting display with the amount of the display occupied by A increasing to the right as the amount occupied by B accordingly decreases. For each frame time, the position of C within A changes as more of A is pushed onto the screen. In this example, D may be characterized as a downstream key such as a logo or other graphic imposed on the resulting combination of A, B and C. The position of D within the screen does not change over time in this example.

Figure 27:
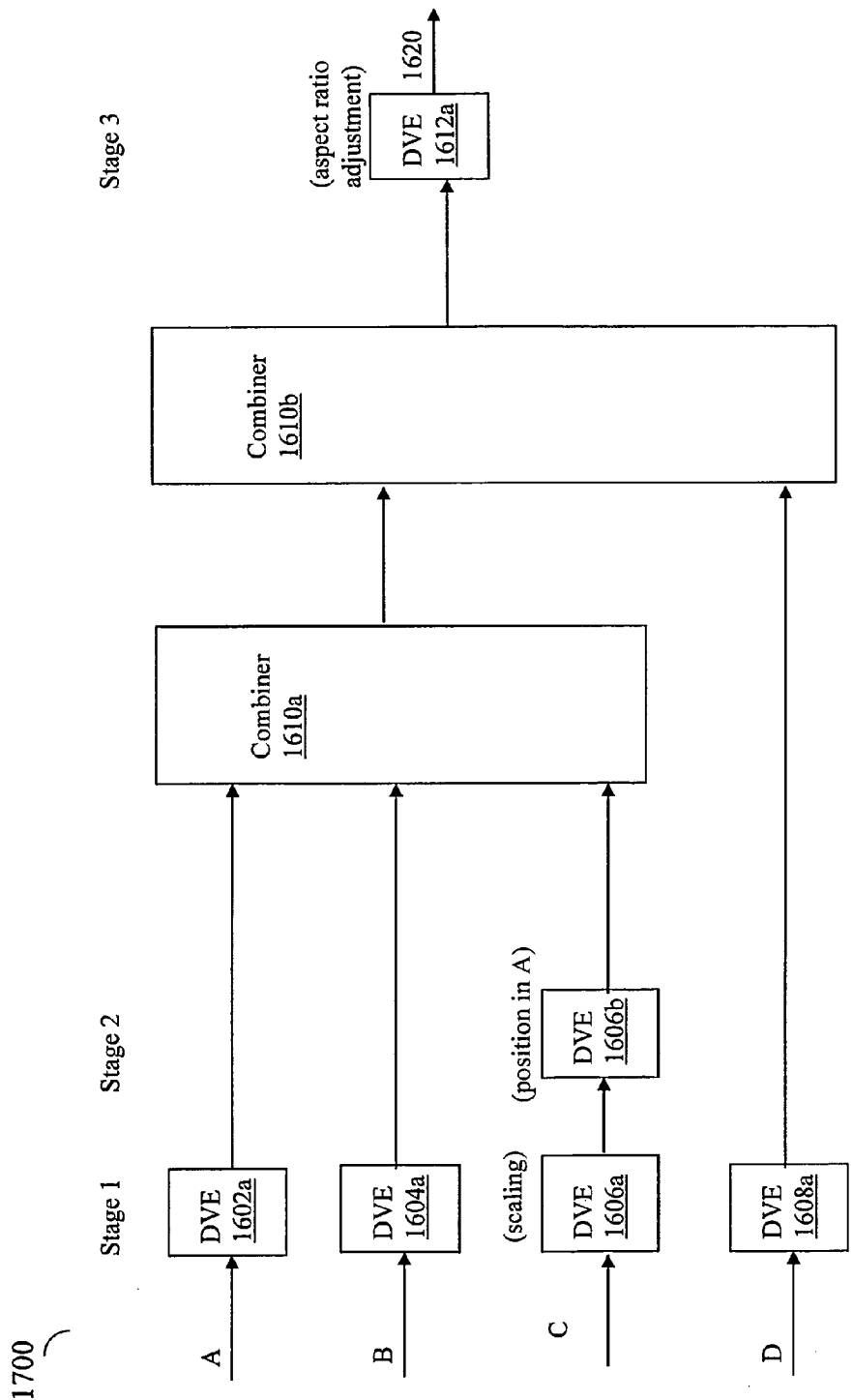
FIG. 27 is a representation of processing in accordance with a traditional architectural approach.
Figure 28:
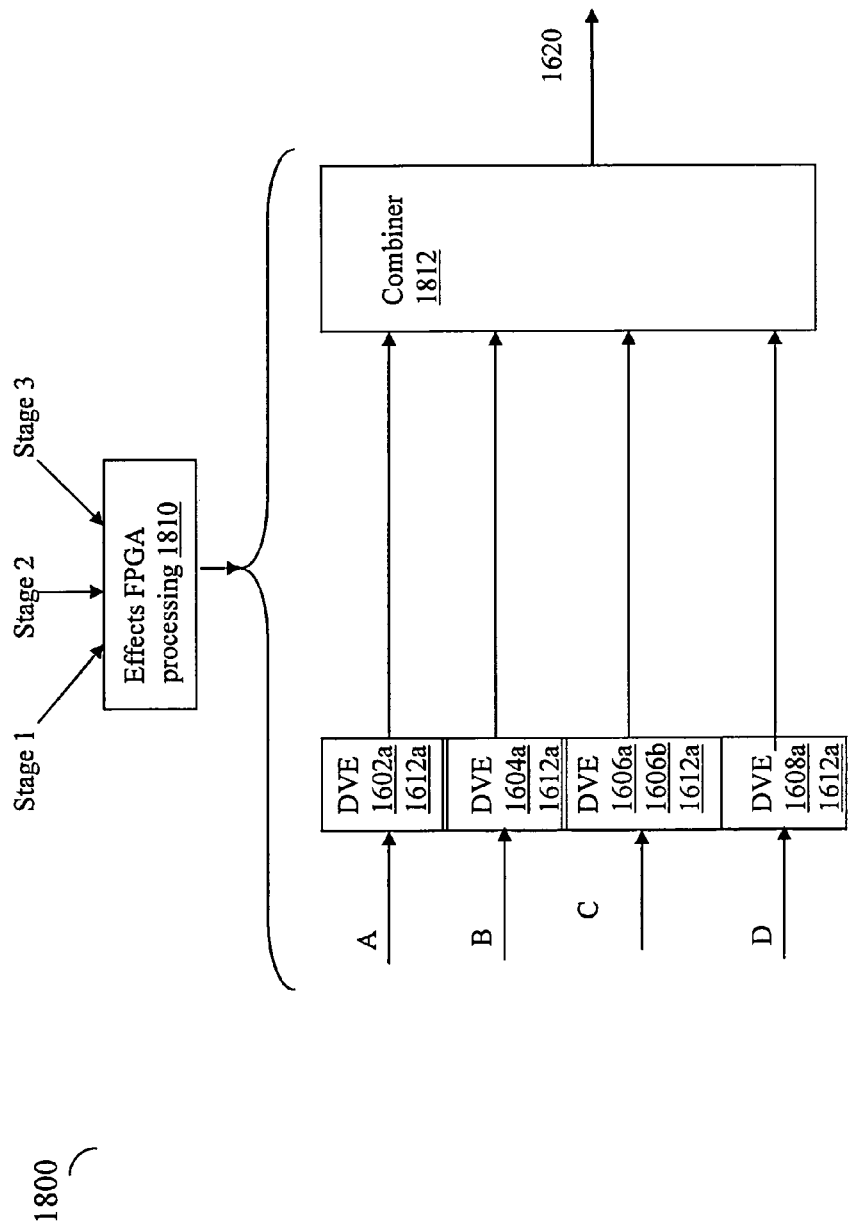
FIG. 28 is a representation of processing in accordance with an embodiment including the main PCB using the single frame time architecture.

As known in the art, a video effect or digital video effect (DVE) may refer to an operation or transformation to be performed on pixels of a frame that cannot be performed on pixels as received on a pixel by pixel basis. As represented in FIGS. 27 and 28 described in more detail below, a DVE may represent one or more logical processing operations, such as a transition or effect (e.g., scaling, positioning, mix and gradient effects, etc.) performed on an input. In an embodiment not using the main PCB of FIG. 21, each logically represented DVE may be implemented, for example, using a commercially available chip which performs positioning, scaling, and the like, on a frame of pixels. The chip may temporarily store data in a buffer for performing processing operations for the desired effect. Each DVE incurs delays to store and perform the operation on the frame of pixels. FIG. 27 illustrates an example of the stages with a more traditional video architecture in connection with an embodiment not using the main PCB to process a frame of each of the input sources A-D and generate a resulting output frame displayed as illustrated in FIG. 26. Each stage in the example representations herein refers to a time or frame delay introduced in connection with achieving the resulting output frame for display. The logical operation of combining one or more inputs may be represented as a combiner operating on each received pixel of data as received. As will be appreciated by those skilled in the art, the operations performed by the combiner do not introduce the additional frame time delay as in connection with the DVE processing. The combiner combines the inputs received, for example, one pixel at a time. In contrast, the operations for DVE processing operate on an entire frame of pixels that are buffered and further processed incurring the frame time delay. As known in the art, a frame time is the amount of time it takes to receive a complete frame of pixels.

Referring now to FIG. 27, shown is an example representation of the different stages that may be performed in connection with obtaining the resulting display of the example 1600. The example 1700 may represent the different stages as performed, for example, using the Targa card rather than the main PCB in connection with performing processing to achieve various video effects and display results of FIG. 26. In this representation, each stage may correspond to a single frame time for processing. As described above, introduction of a DVE introduces an additional frame time since the DVE performs processing on an entire frame of pixels. It should be noted that the example 1700 illustrates only processing of a single frame of data of each of the inputs A-D for purposes of illustration.

In the example 1700, the processing to perform and produce the resulting display of FIG. 26 for a single frame using the Targa card may take 3 frame times. In connection with the input A, at stage 1 DVE 1602a performs processing to have A occupy a portion of the display screen for the current time. At stage 1, DVE 1604a similarly performs processing on input B. In stage 1, input C is first scaled by DVE 1606a to fit within the box or rectangular portion of the screen. In stage 2, input C is then processed by DVE 1606b to appropriately position the scaled box including C within A. In stage 1, input D may be positioned within the appropriate portion of the screen or composite resulting frame. Note that the position of D in this example does not change over time since it is a logo or graphic imposed on the result of the combination of A, B and C. The combiner 1610a combines the results of A, B and C after C has been scaled and positioned. The combiner 1610b combines the result or output of combiner 1610a with the logo or graphic output D of 1608a. The output of combiner 1610b may then be processed in a third stage by DVE 1612a to perform aspect ratio adjustment processing, for example, to map to varying screen dimensions or sizes prior to generating the final combined output signal 1620.

FIG. 27 illustrates an example representation of performing processing on 4 inputs A-D in connection with existing approaches and architectures such as using the Targa card rather than the main PCB. What will now be described is a representation of the architectural approach utilized by an embodiment including the main PCB with the Effects FPGA 1110 of FIG. 21.

Referring now to FIG. 28, shown is an example representation of an approach to performing processing of the 4 inputs A-D using the main PCB with the Effects FPGA 1110 of FIG. 21. In the example 28, the Effects FPGA 1110 of the main PCB is configured to implement the architecture illustrated in FIG. 28. The Effects FPGA 1110, in combination with code executing on the computer system, perform operations to apply desired effects and transform one or more input sources and then combine the transformed inputs into a composite result in a single frame time. The architecture of FIG. 28 illustrates a single pass or single stage corresponding to processing performed in a single frame time. The Effects FPGA processing 1810 includes performing processing of the DVEs (e.g., 1602a, 1604a, 1606a, 1608a, 1606b, 1612a) of stages 1-3 and combining results therefrom denoted in FIG. 27. The Effects FPGA 1110 is configured to perform the processing steps of stages 1-3 or processing of all DVEs from stages 1-3 in combination in a single frame time. The Effects FPGA 1110 is also configured to combine the transformed inputs A-D (e.g., transformed inputs referring to DVE processing results of applying the effects to each of different input sources A-D) to generate the combined output signal 1620 in the same single frame time as the DVE processing.

In the example 1800, the input A is transformed using a set of operations equivalent to performing the processing by DVEs 1602a and 1612a. Input B is transformed using a set of operations equivalent to performing the processing by DVEs 1604a and 1612a. Input C is transformed using a set of operations equivalent to performing the processing by DVEs 1606a, 1606b, and 1612a. Input D is transformed using a set of operations equivalent to performing the processing by DVEs 1608a and 1612a. The Effects FPGA processing 1810 perform the foregoing DVE transformations in a single frame time and also combine the transformed inputs A-D as represented by the logical combiner 1812. In the embodiment described herein, the Effects FPGA 1110 may be configured to perform, in a single frame time, those operations representing the mathematical combination of all processing performed by the DVEs and combiners to generate the result signal 1620.

The foregoing illustrates only one particular set of processing operations that may be performed on one or more inputs in which each selected input source is processed separately and then combined. The processing performed by the Effects FPGA 1110 on each input source includes performing the one or more different video effects on each input source and then combining each transformed input. The foregoing, along with other transformations to each input source, may be implemented in one embodiment by configuring the Effects FPGA 1110 to perform processing of the different logical components, such as DVEs and combiners, that are described in more detail in following paragraphs and figures, such as FIG. 29. The foregoing components perform processing with respect to certain values that may be parameterized. The particular parameters may vary with the operations performed by the components as may be supported in an embodiment. Values for these parameters at each frame time may be determined using a first code portion executing on a personal computer, such as the workstation 620 of FIG. 15. The first code portion may be included in a library of routines on the computer. For each frame time, the first code portion may determine a set of these values, also referred to herein as control settings, to be used by the Effects FPGA to accomplish the one or more transformations in combination. Once the control settings for one or more frame times have been determined, the control settings may be downloaded over the PCI bus to the main PCB for use with the Effects FPGA included therein. The foregoing single pass architecture using the main PCB is described in more detail in following paragraphs.

As known in the art, the Effects FPGA 1110 may be configured using a hardware description language (HDL), such as VHDL or Verilog, or schematic design. If using an HDL, a design automation tool may be used to generate translate the HDL code and then place and route the components of the schematic to the actual FPGA architecture, such as by using an FPGA company's proprietary place-and-route software. A user may then validate the results, for example, via timing analysis, simulation and/or other verification techniques. Once the design and validation process is complete, a binary file may be generated using an FPGA manufacturer-specific or vendor-specific software. The information in the binary file may be stored, for example in the PROM 1110*a* and used to configure, or reconfigure, the Effects FPGA 1110. The binary file may represent a mapping to indicate how the gates within the Effects FPGA 1110 are connected to implement the components of a schematic design.

Figure 29:
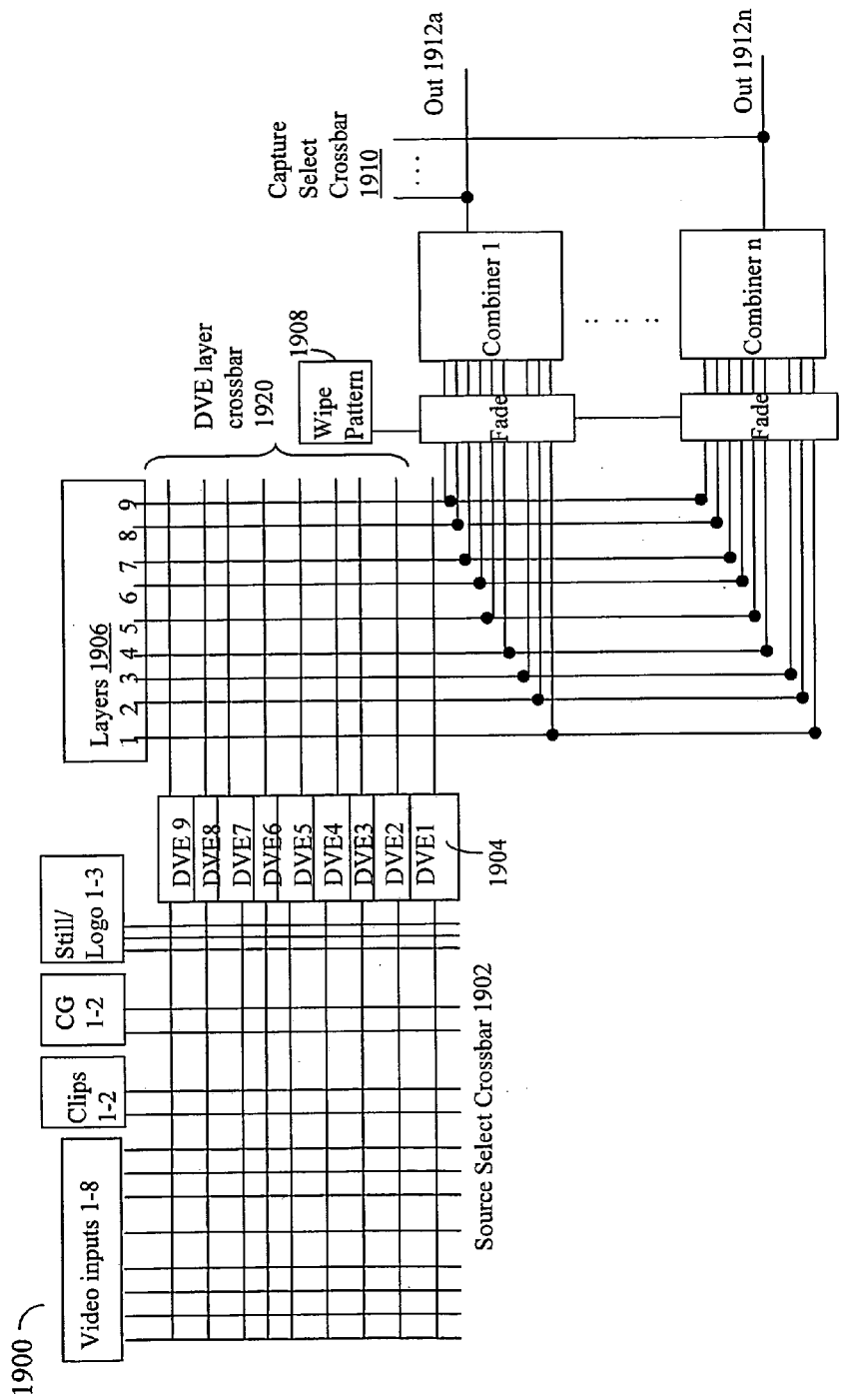
FIG. 29 is a logical representation of components and processing performed by the Effects FPGA of the main PCB in one frame time.

Referring now to FIG. 29, shown is an example of a logical representation of what may be performed by the Effects FPGA 1110, in combination with code executing on the computer system, during one frame time. The example 1900 includes a representation of operations, inputs, and the like, with respect to the FPGA 1110 of the main PCB of FIG. 21 as may be used in connection with performing techniques described herein. In this example, the source select crossbar 1902 represents the 9 sources that may be selected from any of the following 15 sources: inputs 1-8, clip sources 1-2, graphic sources (CG) 1-2, and still image or logo sources 1-3. Each one of the 15 input sources may be selected for use with any one of the 9 DVEs. Inputs 1-8 represent 8 inputs from 2 different cards or PCBs in which there are 4 inputs/card. The two cards or PCBs may be selected from the Digital Input Board, the Analog Input Board, and the HD SD I/O board. It should be noted that one or more of the inputs may utilize a chromakey. In one embodiment, a chromakey may be associated with video inputs 1-6 and Clips 1-2. As known in the art, chromakeying is the process of removing a color, or small color range, from one image to reveal another image behind it. The removed color becomes transparent. This technique may also be referred to as "color keying" such as, for example, in connection with a weather broadcaster in which the broadcaster appears to be standing in front of a large map when in the studio, the presenter is actual in front of a large blue or green background. The foregoing may be performed selectively on one or more of the inputs such as the video inputs and clips.

Each of the DVEs of 1904 represents the processing to accomplish the one or more image transformation operations including, for example, scaling and positioning operations on a selected input. Each of the DVEs 1 . . . 9 represents the operations as described in connection with the architecture of FIG. 28 to collectively perform the transformations of one of the nine selected input sources. The operations represented by each DVE that may be performed in an embodiment may include, for example, a selected aspect transformation, a transformation to box or crop the source into a box having particular dimensions and resolution, a transformation to make the source fly across a screen, and the like.

Each DVE collectively represents the one or more video effects, such as a transformation or other operation, that may be applied to a single source which, in this example, includes one of 9 possible selected sources. In one embodiment, the one or more desired effects performed to an input source are determined. Code executing on the computer system may mathematically combine the desired effects with respect to an input and determine a corresponding scaling and positioning operation reflecting the mathematical combination. The foregoing may be accomplished by having the code on the computer system mathematically combine the operations to be performed on an input to achieve the desired effects. The result of applying these operations to an input frame to achieve any desired effects is represented using one or more parameterized operations such as a parameterized scaling and positioning operation. For example, a frame from an input source may be processed to scale the frame to fit into a portion of a display and then position the scaled result to a particular location on the display in accordance with an effect. The processing performed on the input frame to determine the result of applying the foregoing effects may be expressed mathematically. The ending size and location of the frame in the display may be expressed using X and Y scaling factors to appropriately scale up/down the frame. Additionally, an X,Y position may indicate placement of the scaled frame with respect to the resulting frame for display. The code on the computer system may mathematically determine the foregoing X,Y coordinates and the X,Y scaling factors and communicate these parameter values, along with possibly other values in connection with the particular effects performed, as control settings to the Effects FPGA over the PCI bus of the computer system. A different set of control settings for each DVE may be determined by the code on the computer system for each frame time and communicated to the Effects FPGA of the main PCB. The DVEs of the Effects FPGA 1110 may be configured to perform the scaling and positioning of each selected input as well as other processing operations in accordance with the specified DVE control settings for each frame time. For example, the FPGA 1110 may be configured to perform processing steps of a particular scaling technique using the control settings as input parameters.

As another example, an input source may have three video effects applied thereto—auto aspect transformation, a transformation to squeeze the source into a box having particular dimensions and resolution, and a transformation to make the source fly across a screen. The code on the computer system may mathematically combine the three transformations which are applied to the source to determine a resulting scaling and positioning of the current frame. The scaling and positioning information for the current frame, along with possibly other data, are communicated to the FPGA 1110 as DVE control settings for the current frame time. The FPGA 1110 performs processing in accordance with the DVE control settings to reflect a combined application of the three transformations in a single frame time rather than applying three separate transformations in three frame times to the source. If a fourth transformation is desired to be performed, the code executing on the computer system determines the DVE control settings to also incorporate this fourth transformation such as, for example, zooming in on a particular area of the source, in addition to the other three.

Each DVE may be implemented by having the FPGA 1110 configured to perform processing to complete each of the one or more selected transformations to a source in accordance with DVE control settings communicated from the computer system. As will be described in more detail in following paragraphs, the FPGA 1110 may be configured in a variety of different ways to implement the components represented in the example 1900 of FIG. 9. In accordance with techniques herein, each of the components such as the DVEs and combiners, may receive control settings determined for each frame time by code executing on the computer system. Above, control settings for each DVE1 . . . 9 have been introduced. Similarly, control settings may also be specified for the combiners in connection with achieving the desired effects and generating a composite output of the one or more transformed input sources. Control settings for the DVEs and combiners are described in more detail in following paragraphs.

In connection with techniques herein, a logical layering approach may be taken where each of the 9 layers in 1906 represents the result of processing performed to accomplish the one or more video effects (as represented by a DVE) on a selected one of the 9 sources. The selected 9 sources are all available as inputs to the logical DVE processing associated with each layer. Additionally, the outputs of each of the 9 layers formed as a result of performing DVE processing are available as inputs to each combiner. In other words, each layer 1 . . . 9 of 1906 represents an element in the final composition that may be combined. For example, if one source is a camera feed, and a first output is desired in which the camera feed has a first transformation applied and a second output in which the same camera feed has a second different transformation applied, the same camera feed is selected as an input for two different DVEs in which each of the two DVEs performs one of the foregoing transformations. The output from each of the two DVEs functions as a different layer or input to the combiners.

It should be noted that an embodiment may include a different number of input sources and layers in accordance with the amount of memory, speed, and other parameters in a particular embodiment. If the amount of memory is increased or the speed of the components, such as the Effects FPGA 1110, is increased, more than 9 layers may be included in an embodiment. The example 1900 includes "n" combiners logically representing the number of outputs that may be produced by the effects FPGA 1110 in a single frame time. In one embodiment, 6 combiners may be represented as the number of outputs produced by the FPGA 1110 in a single frame time.

Each of the n combiners (1 . . . n) in this example takes 9 inputs which are affected by a fade level. The fade level may be used to control which input sources are combined and also affects how they are combined. The fade level may be a level of selection ranging from transparent to opaque. In connection with the example 1900, the transparent fade level may be represented by a value of zero and a fade level of opaque may be represented by a value of 100. The fade values can be controlled by a wipe pattern 1908 which is a frame sized array of values that affects or defines what the fade level is for each pixel of a frame of the source inputs. The wipe pattern may be used to control the composition of the sources as represented by the combiner output. A wipe pattern may be specified having a fade level for each of two source inputs, for example, so that the first source input is displayed in the first top half of a screen and a second source input is displayed in the second or bottom half of the screen by using the inverse of the wipe pattern. As will be described in more detail in following paragraphs, control settings may be determined by code on the computer system and communicated to the FPGA 1110 for each combiner. Combiner control settings specified for each frame time may include fade level settings applied to each input source.

The capture select crossbar 1910 may be used to select one of the combiner outputs for capture or recording, for example, to store the combiner output as a clip on a data storage device of the computer system. A control setting may also be specified for the capture selection indicating the selected combiner output being captured. Such a control setting may be communicated to the FPGA 1110 from code on the computer system in response to state information of the system indicating user selection of the combiner output. Control settings such as that for the capture select crossbar 1910 do not change per frame time. As such, these types of control settings may be characterized as non-synchronous control settings with respect to frame time and may be communicated when there is a change, for example, in response to a user selection or change in system state.

The DVE layer crossbar 1920 allows for selection of a particular one of the 9 DVE outputs to be mapped to a particular layer position for each combiner. In other words, one of the 9 DVE outputs 1904 may be mapped to a particular layer position. A single DVE output may be mapped to more than one layer in this embodiment. In this example, layer "m" is used as combiner input "m" for each of the "n" combiners. In the embodiment illustrated in FIG. 29, a same DVE output, such as the output of DVE 5, may be mapped to layer 1 for each of the "n" combiners. Additionally, a same DVE output may be mapped to two different layers. For example, the output of DVE 5 may be specified as layers 1 and 9 corresponding, respectively, to combiner inputs 1 and 9 for all "n" combiners. The mapping of one of the outputs of the 9 DVEs of 1904 for a layer "m" serving as combiner input "m" may be specified using control settings determined by code executing on the computer system and communicated to the main PCB over the PCI bus. These control settings may be communicated every frame time.

It should be noted that FIG. 29 illustrates an embodiment in which the mapping of each of the layers of 1906 to each combiner input is fixed and a particular DVE output may be mapped to a selected one or more of the layers. As described above, the mapping of DVE output to a layer may be specified using control settings. However, layer "m" serves as combiner input "m" for each of the "n" combiners. In an alternate embodiment, the mapping of DVE output "m" to layer "m" may be fixed and, rather than have a fixed mapping of layer "m" to combiner input "m" for each combiner, an embodiment may allow for a selected layer to be mapped individually to each combiner input, for each of the "n" combiners. For example, each of DVEs1-9 may, respectively, always map to layers 1-9. Additionally, a layer to combiner input mapping may be specified as follows: layer 1 to be used as combiner 1 input 1, layer 3 to be used as combiner 1 input 2, layer 3 to be used as combiner 2 input 1 and layer 1 to be used as combiner 2 input 3. In such an embodiment, the layer to combiner input mappings for each combiner may be specified as control settings determined by code executing on the computer system and communicated every frame time over the PCI bus as described above. In yet another variation, an embodiment may allow for mapping of DVE output to each layer, and mapping of a selected layer to each combiner input.

It should be noted that the exemplary embodiment represented in FIG. 29 includes 6 combiners. In such an embodiment, referring back to FIG. 21, the FPGA 1110 would include 3 additional output signals in addition to 1108*c*, 1108*d*, 1108*e*. Just as each of the signals 1108*c-e* may correspond to a selected usage in the system, such as program, preview, auxiliary, cleanfeed (e.g., program signal without having one or more layers applied thereto), and the like, each of the foregoing 3 additional signals may also correspond to a selected usage.

Referring now to FIG. 30, shown are example layer assignments, fade levels, and outputs that may be used in connection with an embodiment having three combiners each with an output. In other words, the example 2000 shows the foregoing in an embodiment utilizing the techniques herein as represented in FIG. 29 with 3 combiners and each of the "m" layers serves as combiner input "m" for each combiner. Each of the layers indicated in 2002 corresponds to a respective one of the layers 1906 which may be used in an embodiment in accordance with the assignment indicated in 2004. In other words, each layer assignment of columns 2002 is the layer number and the priority of the layer with, the highest numbered layers having the highest priority (e.g., top layer). 2004 is the function that each layer may be assigned in an embodiment. The function a layer is assigned as indicated by 2004 may be changed, for example, by settings downloaded from the computer system in response to a current state of the system. The significance of 2002 to 2004 mapping may be illustrated due to the priority of each layer and how the layers may be combined. For example, if layer 1 and 3 were interchanged and both layers have an associated fade level of 100% (e.g., opaque), only the highest numbered (e.g., highest priority) layer will be seen. Fade levels as indicated in column 2006 are described below.

Column 2006 indicates fade levels used by combiner 1 of FIG. 29 in generating its output. Columns 2008 and 2010 similarly indicate fade levels used, respectively, by combiners 2 and 3 to generate their respective outputs. For example, column 2006 indicates fade levels used by the combiner 1 that generates output 1 (out1). A value of 100 (maximum value) indicates an opaque setting. A blank in the column indicates a minimum value of 0 associated with a transparent layer. A value indicated as an "X" represents a variable fade setting, for example, in accordance with a system state. Fade level settings indicated by "X" may vary in accordance with system state values. For example, program foreground fade level may be directly controlled while performing a MIX effect by unlabeled control in FIG. 6 just above 274d. Key fade levels are controlled by 230 in FIG. 4. Aux levels and combiner/output assignments are controlled by other user settings. In this example, output 3 (out3) of column 2010 may alternately be used for an auxiliary output or a clean feed output. A: in 2010 indicates a fade level setting if out3 is used as an auxiliary output. C: indicates a fade level setting if out3 is used as a clean feed output. As known in the art, clean feed refers to an output that does not contain an element in the main program output, such as the program signal without the logo or channel identifier applied.

In one embodiment, out3 as represented in column 2010 may be used as an auxiliary output assigned to reflect the contents of a particular source. The auxiliary output may additionally include key layers superimposed on the selected source assigned as indicated in column 2004. Out3 may also reflect the contents of one of the other two outputs, out1 or out2. If out 3 corresponds to one of the other two outputs, out1 or out2, the settings in column 2010 may correspond to the appropriate settings indicated in column 2006 for out1 and 2008 for out2.

The values in columns 2006, 2008 and 2010 may be specified as control settings for the combiners communicated from the computer system to the main PCB for each frame time as described elsewhere herein.

Referring now to FIG. 30A, shown are example layer assignments, fade levels, and outputs that may be used in connection with an embodiment having six combiners each with an output. In other words, the example 2000 shows the foregoing in an embodiment utilizing the techniques herein as represented in FIG. 29 with 6 combiners rather than 3 as illustrated in FIG. 30. In the representation of FIG. 30A, fade levels for each combiner are indicated in columns 2056, 2058, 2060, 2062, 2064 and 2066. A designation of 0-100 in an entry indicates that the fade level is set in accordance with a system setting (e.g., similar to that as indicated by "X" in FIG. 30). In the example 2050, the program signal on out 1 is duplicated on out4, preview on out 2 is duplicated on out 6, Aux1 is on out3 (note chart in which only aux1 layer fade level is 100), and out5 is cleanfeed. As described above, the function a layer is assigned as indicated by 2054 may change.

Various figures, such as FIG. 21 and FIG. 29, illustrate one implementation of the architecture described in connection with FIG. 28. As described herein, FIG. 29 logically represents the results, such as 6 combiner outputs, generated during one frame time by the effects FPGA 1110. In other words, as represented in FIG. 29, the effects FPGA 1110, may be programmed to perform in a single frame time operations which represent a combination of all effects applied to generate the 9 combiner inputs as represented by layers 1-9 of 1906 and also combine the selected ones of these layers to generate 6 composite outputs of 6 combiners. The underlying configuration of the FPGA 1110 to generate the 6 combiner outputs may vary with embodiment in accordance with the speed of the FPGA 1110 and the relative pixel arrival rate as input to the FPGA 1110. For example, in one embodiment, the foregoing logical representation of FIG. 29 generating 6 combiner outputs may be implemented by using an Effects FPGA that operates at a rate which is 9 times faster than the rate at which pixels arrive or are input to the FPGA. In such an embodiment, at clock time 1, FPGA 1110 may operate on pixel for DVE1, at clock time 2, FPGA 1110 may operate on pixel2 for DVE2, and so on, for each of the 9 DVEs. Each clock time with respect to the FPGA represents the timing for the pixel arrival rate at the FPGA 1110. Thus, in such an embodiment, the Effects FPGA 1110 may be configured to have a single DVE component that actually operates by performing processing for a single pixel for each of the 9 DVEs sequentially in a single frame time. The embodiment may also configure the FPGA 1110 to have two combiners which each output 3 of the 6 combiner outputs/results in a single frame time when each combiner operates at 3 times the rate of the pixel arrival. In other words, a first combiner sequentially generates combiner 1 output, combiner 2 output and then combiner 3 output in a single frame time. The second combiner sequentially generates the outputs of combiners 4-6 in the same single frame time so that collectively, the two combiners as configured in the Effects FPGA are able to generate 6 combiner outputs. The foregoing is just one example of how the FPGA 1110 may be configured to generate a number of combiner outputs, 6 in this example, for a number of layers, 9 in this example.

It should be noted that in an embodiment, each combiner may always perform processing on its 9 inputs (e.g., each input being a mapped one of the 9 layers 1906) and then the combiner may multiply each of the 9 inputs by some value. If the combiner input is not actually needed to generate a combiner output, the Effects FPGA 1110 may be configured so that the combiner multiplies the combiner input by 0. Such values may be specified, for example, in connection with combiner control settings as the combiner fade level associated with a combiner input.

One of the advantages provided by the foregoing layering approach is that every one of selected 9 of the 15 inputs is available to each of the layers. In such an embodiment, a same input may be used in connection with multiple layers so that a single source may be individually and independently processed in each of the layers. An example illustrating the foregoing will now be described.

Figure 31:
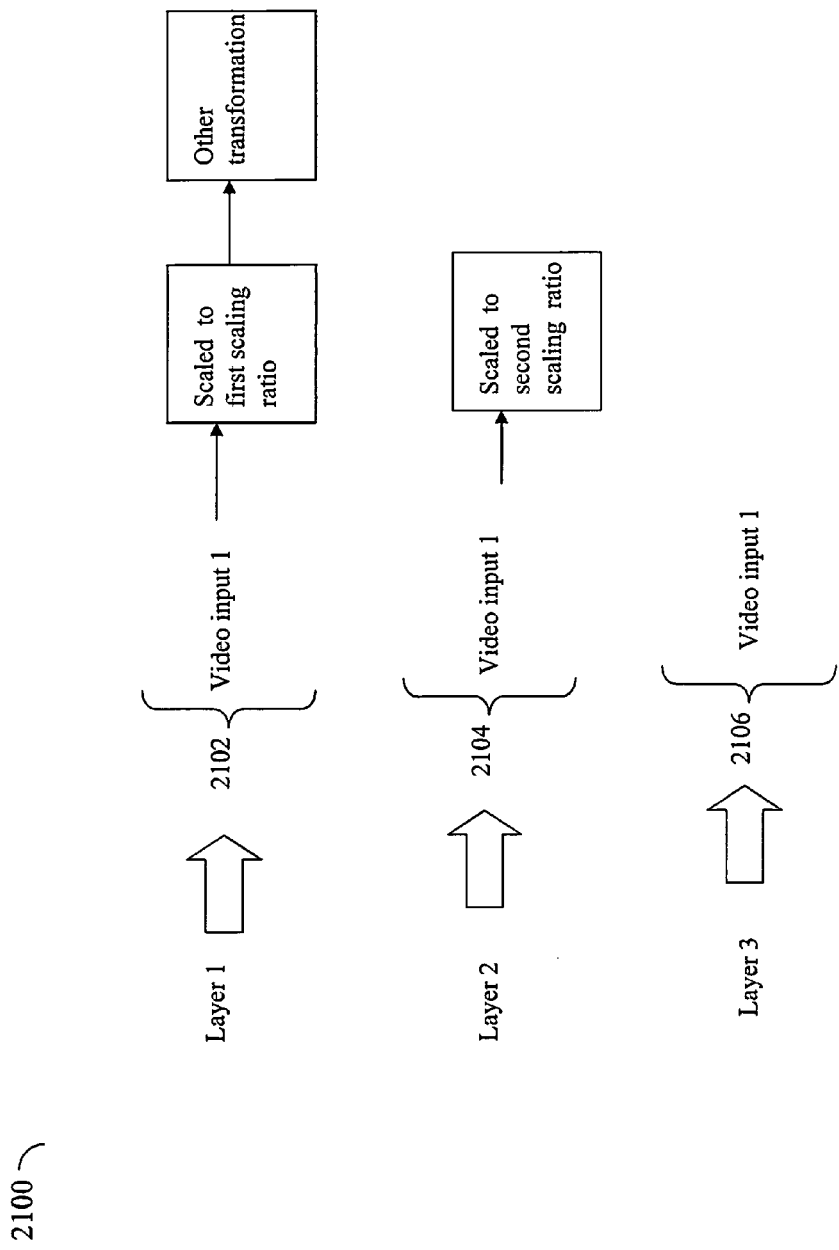
FIG. 31 is an illustrative example of a layering approach using the techniques herein.

Referring now to FIG. 31, shown is an example illustrating a single input source associated with 3 different layers. Each of the layers in the example 2100 is available as an input to each of the combiners. In 2100, layer 1 is the result of processing as represented by 2102 of video input 1 with two different video effects applied—a first effect in which the video input 1 is scaled to a first scaling ratio to which another transformation (e.g., transition effect, aspect ratio, and the like) is then applied. The processing performed in 2102 may be performed by one of the 9 DVEs whose output is mapped to layer 1. Layer 2 is the result of processing as represented by 2104 of video input 1 with a single video effect applied by scaling the video input 1 to a second scaling ratio different from the scaling ratio associated with layer 1 effect. The processing performed in 2104 may be performed by another one of the 9 DVEs whose output is mapped to layer 2. Layer 3 in this example is an unprocessed or raw video input 1. One of the 9 DVEs may perform no effects processing and the associated DVE output may be mapped to layer 3. Using the architecture described herein, each of the foregoing 3 layers may be used to perform different video effects, or no video effects, to a same selected input source. The resulting 3 layers are each available as an input to each of the combiners, such as the 6 combiners described in one embodiment.

As described herein, each of the layers (e.g., 1 . . . 9 of 1906) is available as an input to all combiners. Each such layer may represent a logical layering or application of zero or more operations on a selected input. The operations may collectively represent application of any desired video effects to the selected input selected via the source select crossbar 1902. As illustrated in FIG. 29 and described above in one embodiment, a selected DVE output may be mapped to a particular layer "b" serving as combiner input "b" for each of the "n" combiners. The combiner may process its inputs 1 . . . 9 in a specified ordering. The implied processing ordering of the combiner inputs may affect the combiner output. In other words, the combiner may combine the various layers in accordance with the mapping of the layers to layer orderings. As an example in connection with the embodiment described herein with 9 layers, each of the 9 layers 1 . . . 9 may be respectively mapped to combiner inputs 1 . . . 9 of a combiner. The combiner may combine its inputs so that input 1 is the bottom layer or first layer combined, and input 9 is the top or last layer combined. The top layer may be opaque. The combiner may generate a combiner output from the layers as represented below. Fade "n" refers to the fade level setting for layer "n"/combiner input "n".

temp1=(layer1*fade1)

temp2=layer2*fade2+(temp1*1−fade2)

temp3=layer3*fade3+(temp2*1−fade3) and so on so that combiner output=layer9*fade9+(temp8*1−fade9).

What will now be described is additional detail of how the Effects FPGA 1110 is used in combination with control settings to perform processing as described herein to apply video effects transforming each input source independently and then combine the transformed inputs to generate a composite resulting frame in a single frame time.

As described above control settings may be specified for each of the components logically represented in FIG. 29. Control settings may be of two different types. A first type is control settings specified for each frame time. A second type is control settings that are not specified each frame time. The second type may be characterized as non-synchronous in that they do not change with each frame time but may change in response to system state such as, for example, a user selection or setting. Both types of control settings may be determined by code executing on the computer system as described herein and communicated over the PCI bus for use by the Effects FPGA 1110.

With respect to an embodiment in accordance with FIG. 29, control settings may be specified for each DVE and each combiner at each frame time since the effects as applied to each source may change with each frame time.

Figure 32:
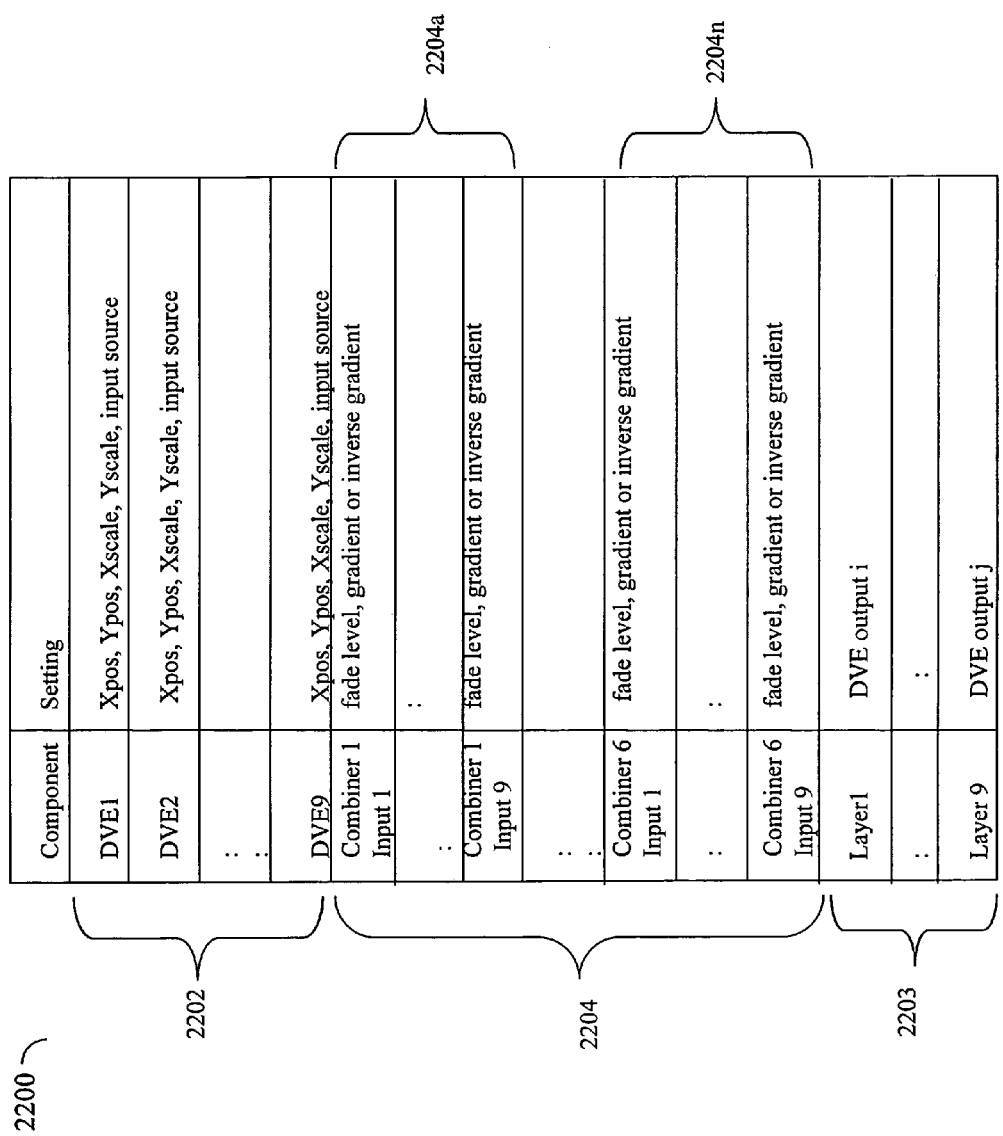
FIG. 32 is an example representation of control settings that may be specified each frame time.

Referring now to FIG. 32, shown is an example of control settings that may be specified in each frame time. An embodiment may utilize additional control settings for each component than as specified in the example 2200. Additional control settings that may be included in an embodiment are described elsewhere herein. It will be appreciated by those skilled in the art that the particular settings used may vary with the particular effects supported, algorithms used to implement different operations, and the like, with respect to each embodiment.

The example 2200 includes a first portion of control settings 2202 for each DVE and a second portion of control settings 2204 for each combiner. In 2202, each row specifies control settings for one of the DVEs and may include values for Xpos, Ypos, Xscale, Yscale, and input source. Input source indicates one of the 15 possible input sources selected for processing. In one embodiment, a numeric value may indicate a selected input source. Xpos and Ypos indicate a position at which the current frame of the input source is to be positioned as a result of applying any desired video effects. Xscale and Yscale specify scaling factors for the current frame of the input source so that the result of applying the scaling to the current frame is in accordance with applying the desired video effects. As will be described in following paragraphs, an embodiment may specify a matrix to represent in combination the position settings (Xpos Ypos) and the scaling factors (Xscale, Yscale). The particular way in which the scaling factors and/or position settings are represented may vary with the particular scaling technique for which the FPGA 1110 is configured.

Portion 2204 includes groupings of control settings 2204a-2204n, one such grouping for each combiner in an embodiment. In this example, there may be 6 combiners. Element 2204a represents the control settings that may be specified for combiner 1 with a row for each combiner input. For each combiner input, a fade level, and the gradient or inverse gradient may be specified. As described herein, output of DVEn is mapped by the DVE layer crossbar to a selected one or more layers. Each of the DVEs represents any video effects that may be applied to a specified input. The fade level for a combiner input may be 0 if a particular layer is not used by a combiner. The fade level may also vary with the particular operations to be performed on an input source. For example, FIGS. 30 and 30A specify fade level values that may be used as control settings in an embodiment for particular numbers of combiners.

Portion 2203 specifies the mapping of a particular DVE output to a selected layer.

The example 2200 indicates exemplary control settings that may be used in an embodiment in which a selected DVE output is mapped to one or more layers (see section 2203) and each layer "m" is used as combiner input "m" for each combiner. In an embodiment in which a selected layer number may be mapped or specified for each particular combiner input, portion 2204 may also include another setting, a layer number, for each combiner input in which the layer number indicates a selected one of the 9 layers which is mapped as the particular combiner input.

The control settings for each frame time may be determined in accordance with currently specified effects, if any, for each input. The code executing on the computer system may determine control settings for each frame time and communicate the settings to the main PCB over the PCI bus. The code executing on the computer system may determine more than one set of control settings at a point in time based on currently specified effects. In one embodiment, up to 8 sets of control settings that are used for 8 frame times may be buffered in the main PCB for use by the Effects FPGA. The buffered sets of control settings may be stored by the code executing on the computer system in a portion of RAM on the Effects FPGA as downloaded over the PCI bus.

Figure 33:
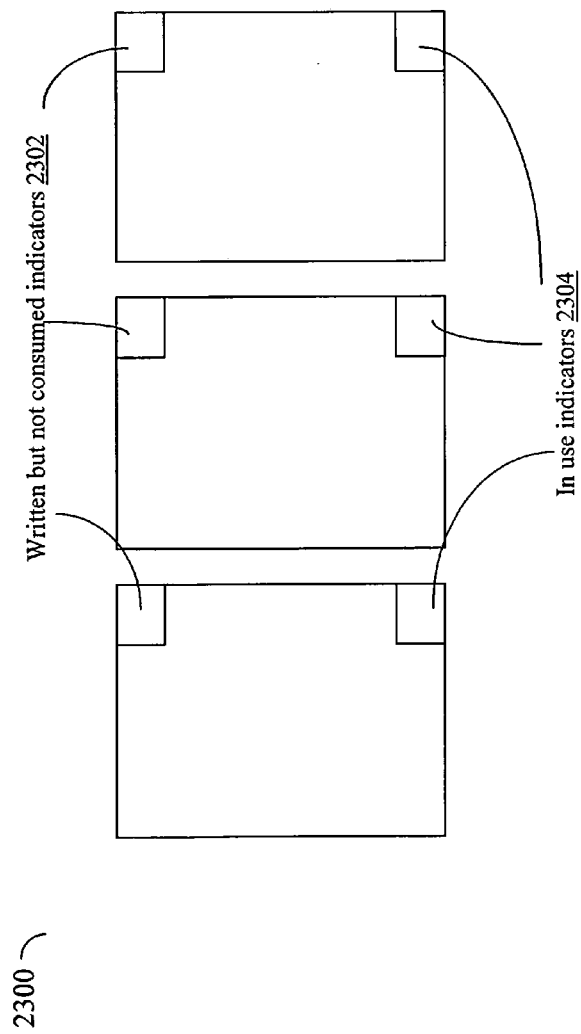
FIG. 33 is an example illustrating use of buffered sets of control settings.

Referring now to FIG. 33, shown is an example illustrating buffers of control settings that change with each frame time that may be used by the Effects FPGA. The example 2300 illustrates only 3 buffers but an embodiment may include a varying number of buffers, for example, 8 as described above. A new set of control settings may be stored in a buffer as an existing set of control settings in each buffer are consumed or used by the Effects FPGA. New settings may be stored in each buffer in a circular fashion, such as when pushed to the main PCB by the code executing on the computer system. For example, an embodiment may have 8 buffers 1-8. Instructions may be placed in buffer 1, 2, and so on, up to 8. The buffers may be consumed in the same ordering. An embodiment may have a different number of buffers and ordering than as described herein. The control settings may be buffered as described herein to tolerate a possible unresponsiveness of the computer system to the effects FPGA's notification that new settings/next set of settings are needed.

In one embodiment, processing may be performed on the computer system to try and maintain a maximum of 6 next buffers of information in addition to a current ($7^{th}$) set of control settings being used by the effects FPGA. The number of buffers maintained (e.g., 6 as just described) may vary with each embodiment as well as the number of physical buffers (e.g., 8 as just described). For example, an embodiment may try and maintain a maximum number of buffers other than 6 in accordance with the particulars of an embodiment.

Each buffer of control settings is associated with 2 indicators 2302 and 2304. Each time a buffer is loaded with new settings, the 2302 bit associated with the buffer is set=1. While the FPGA 1110 is using the control settings of a particular buffer, the buffers's 2304 bit is set=1 and 2302=0. When the FPGA 1110 starts using the settings of the buffer, the FPGA 1110 clears bit 2302 and then clears bit 2304 when done using a buffer. The FPGA 1110 may then accordingly notify the computer system by communicating with the library of routines thereon over the PCI bus to signal that additional settings are needed to replace those that have been consumed. Based on the foregoing, new settings may be loaded into a buffer when both bits 2302 and 2304 for the buffer=0. The FPGA 1110 may use new settings from a buffer having bit 2302=1 and then sets 2302=0 and 2304=1 while the control settings of the buffer are in use by the FPGA 1110. At any time, there is only a single set of settings in use by the FPGA 1110 so at most one of bits 2304 is set. FPGA 1110 clears 2304 (=0) when the associated buffer is no longer in use. The library routines executing on the computer system set appropriate one of the bits 2302 associated with a buffer when a new set of control settings is deposited in the buffer. The FPGA 1110 clears the bit 2302 associated a buffer once the FPGA 1110 starts using a set of control settings contained therein. If the FPGA 1110 consumes all buffered control settings and is waiting for a new set of control settings from the library on the computer system, the FPGA 1110 will continue to utilize the latest set of control settings until a new set is provided. The FPGA 1110 clears bit 2304 associated with a buffer when the FPGA 1110 is done using the buffer. However, bit 2304=1 for the duration of use of the associated buffer by the FPGA 1110.

In connection with applying a particular set of effects to an input source, the size and location of the input source may vary with each frame time. For example, when applying a transition effect to display an input source at varying positions across the screen over time, (e.g., move the input source across a screen), each frame time may result in the input source being in a different screen position. Different settings may be obtained for the DVE processing the input source at each frame time. As another example, consider a fade level in which, in 3 frame times, an input source is faded out. A first frame time may have settings associated with the input source at 100%. A second frame time may have settings associated with the input source at a 50% fade level. A third frame time may have settings associated with the input source at 0% fade level. With only a fade transition, a DVE performs no processing on the input source so the position and scaling settings are the same for each frame time assuming there are no additional effects being applied. The combiner control settings will be the same for each frame time except for the fade levels which fade over time (e,g, in 3 frames).

Figure 34:
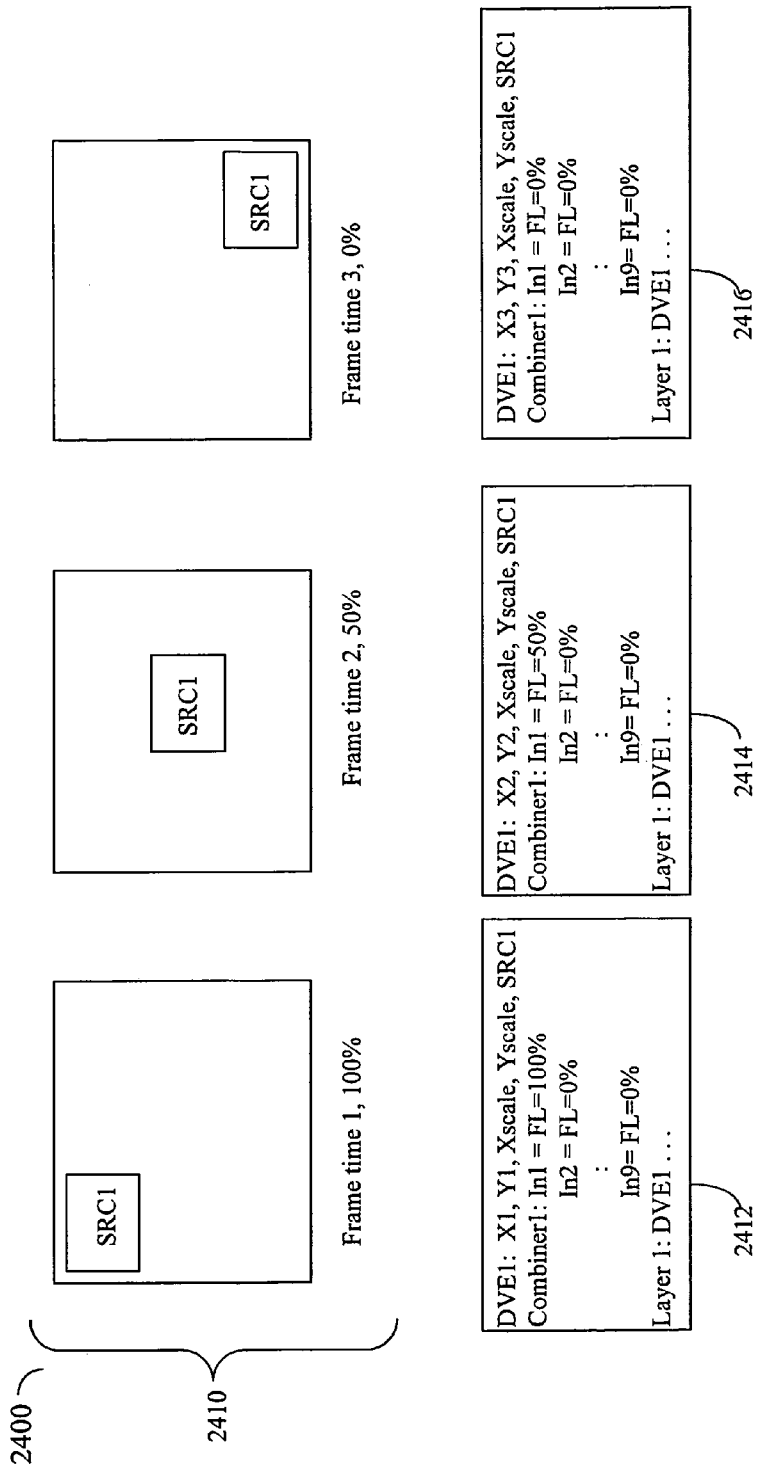
FIG. 34 is an example illustrating control settings and corresponding resulting frames for three consecutive frame times.

Referring now to FIG. 34, shown is a representation of settings that may be specified for 3 frame times of 2410 in connection with one illustrative example. In this example, the input source SRC1 may be scaled to fit in a designated box of the display screen. The box size is constant for each of the three frames. Over the course of 3 frame times, the fade level associated with the SRC1 displayed in the box changes decreasing over time to a complete fade out in the third and last frame time. Additionally, the box containing SRC1 moves to a different position in each frame as the associated fade level changes. Settings for each of the three frame times of 2410 are indicated below the corresponding frame time. At frame time 1, settings 2412 may be specified. In this example, only a single DVE1 is used to generate the composite result of the layer 1 which is mapped as combiner input 1 for each combiner in this exemplary embodiment. Fade level (FL) for input 1 (In1) is 100%. Fade levels for each of the other combiner inputs 2-9 may be set to 0%. At frame time 2, settings 2414 may be specified. In comparison to settings of 2412 for the first frame time, the only change in this example is with respect to the fade level of In1 of combiner 1 (e.g., FL=50%) and the X,Y coordinates of X2, Y2 reflecting the change in position of SRC1. At frame time 3, settings 2416 may be specified. In comparison to settings 2414, the FL of In1 of the combiner 1 is now 0% and the coordinates of the DVE1 output are now X3, Y3.

The foregoing is a simple example to illustrate the use of control settings as may be determined for each frame time by code executing on the computer system, such as workstation 620 of FIG. 15. The control settings may be downloaded over the PCI bus for use by the Effects FPGA 1110 and stored in RAM of the FPGA 1110 of FIG. 21. The code on the computer system may examine various bit settings of each buffer of control settings to determine when the control settings have been used by the FPGA 1110 so that the code executing on the computer may reuse the buffer by downloading a new set of control settings to the buffer.

The control settings may also be determined for each frame time in response to a state of the system such as, for example, user interactive inputs or selections such as in response to a user moving a joystick, button, knob or the like, affecting an input source. The user inputs or selections may be reflected as part of the state of the system used in connection with determining the control settings at a frame time. For example, moving a joystick may result in a corresponding position of a selected source on the display in a particular location. Examples of these interactive inputs are illustrated, for example, in area 204 of FIG. 6 of the control panel. The user may also use the control panel buttons, for example, to select or reassign a different input source for display (e.g., change what is designated as the on-air or preview source), may change designated effects, and the like, using the control panel options that may be included in an embodiment. A library of routines that communicates with the device drivers may obtain the user interactive inputs and other system state information to determine corresponding new control settings for the next frame times for each FPGA 1110 component, such as the DVEs and combiners. The library may then communicate with the appropriate device driver to communicate the control settings over the PCI bus to the main PCB for use by the Effects FPGA 1110.

The FPGA 1110 is configured to implement the components in accordance with FIG. 29 such as, for example, 9 layers each mapped to a DVE output, 6 combiner outputs, selection of 9 input sources from a possible 15, and the like. As described herein, the foregoing is accomplished using binary instructions loaded into PROM 1110*a* to accordingly configure the FPGA. 1110 If there is a change to the framework such as the components (e.g., number of layers change, the number of combiner outputs change), new instructions may be loaded into PROM 1110*a* to reconfigure the Effects FPGA 1110.

The FPGA 1110 may be configured to perform a same set of operations at each frame time using current control settings. For example, the FPGA 1110 is configured to perform a same set of operations for scaling each input source each frame time using control settings indicating current scaling factors. The current scaling factors specified for a DVE may be included in DVE control settings reflecting the one or more effects applied to an input source associated with the DVE. The particular operations performed by the FPGA 1110, and also as stored in the PROM 1110*a*, may vary with the scaling technique implemented in an embodiment. For example, an embodiment may implement image scaling using bilinear interpolation, or some other mathematical technique. As such, the FPGA 1110 may be configured to perform operations to achieve the scaling results in accordance with the selected scaling technique. The settings or values used for the scaling operation may be specified as control settings used as an input to the operations performed by the FPGA 1110. Similarly, the particular control settings specified for a frame time may vary based on the particular mathematical scaling technique utilized. If the particular technique, such as the scaling algorithm, utilized in an embodiment changes, a new set of binary may be generated and stored on PROM 1110*a* to accordingly reconfigure the FPGA 1110 to perform the new scaling algorithm. If the new scaling algorithm uses different inputs, different control settings may be specified for DVE control settings.

As described herein, control settings and other information may be specified which do not change with each frame time and may be referred to as non-synchronous information with respect to each frame time.

Figure 35:
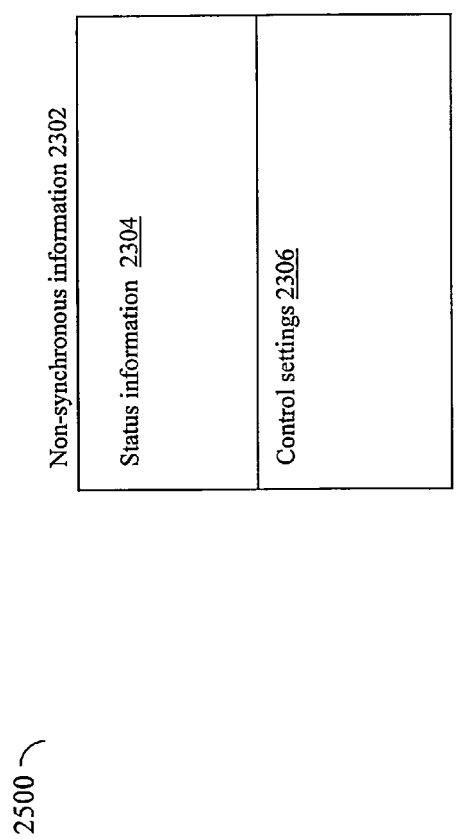
FIG. 35 is an example representation of non-synchronous information.

Referring now to FIG. 35, shown is an example representation of the non-synchronous information that may be included in an embodiment using the techniques herein. The non-synchronous information 2302 may include status values 2304 and control settings 2306. The non-synchronous status information 2304 may include values to reflect the current state of various aspects of the system as also described elsewhere herein. Data of 2302 may be stored in a portion of RAM accessible to the FPGA 1110, such as RAM 1120 of FIG. 21. The status information of 2304 may include information as to whether there is an actual live feed for a given input source such as for each of the 15 input sources as illustrated, for example, in FIG. 31. The status value may indicate, for example, whether there is an actual video input source detected by the hardware for each of inputs 1-8. Status information 2304 may be used to indicate information about the state of the Effects FPGA 1110 programming such as, for example, a version number associated with the configuration information on the PROM 1110*a*, different configuration options used in connection with configuring the FPGA such as the number of layers available, and the like. The control settings 2306 may indicate whether to prefilter the inputs before performing DVE processing of the input. The control setting may also indicate or select a particular filtering technique. Each of the available filtering techniques may result in a different portion of operations being performed by the Effects FPGA 1110. Control settings 2306 may also indicate which of the 15 source inputs are enabled for use. Settings 2306 may include a capture select crossbar selection (e.g., element 1910 of FIG. 29) indicating which combiner output, if any, is selected for recording on a data storage device of the computer system. The captured output may be communicated over the PCI bus to the computer system for storage.

As described herein, the particular control settings that change with each frame time and which are also included in the non-synchronous information 2302 that do not change with each frame time may vary with each embodiment. What will now be described are additional control settings for each frame time that may be included in an embodiment.

In an embodiment supporting different wipe effects, the combiner control settings may include a gradient that changes with each frame time.

The following DVE control settings that change each frame time may be specified in an embodiment:

1. input source attributes and input source number. The attributes may include, for example, dimensions of the source image/frame, still or live source indicator (e.g., binary or other value indicating still or live source), base address in RAM 1120 where the frame is buffered, and an indicator as to whether chromakey is applied or other alpha key information to be used to set the transparency of each pixel (otherwise the pixel may be treated as opaque). The still/live indicator may be used to differentiate the number of bits/component where, for example, stills have 8 bits/component and live sources have 10 bits/component. The attributes may also include a horizontal wrap indicator and/or vertical wrap indicator used to indicate what is done when, respectively, the output width is greater than the input width, and/or output height is greater than the input width. The indicator may indicate, for example, to pad with black, reuse the input source, and the like, in such instances where an output dimension is greater than an input dimension.

2. Xpos, Ypos, Xscale, Yscale as described elsewhere herein. In one embodiment, these foregoing settings may be combined and represented as a 3×3 matrix due to mathematical operations performed by the FPGA 1110 to implement the scaling and positioning operations for DVEs utilizing geometric transformation techniques known in the art. It should be noted that any algorithm may be utilized in connection with the techniques herein and the particular control settings used, as well as their form, may vary.

3. cropping parameters indicating how to perform any necessary cropping. The parameters may indicate, for example, what portions of image to crop, from the top, bottom, left and/or right.

4. precomputed values that may be used by the Effects FPGA 1110. The precomputed values may be determined in advance by the library routine on the computer system so that the FPGA 1110 does not have to compute these values. Rather, the FPGA 1110 may use the precomputed values in performing its processing. For example, one of the precomputed values may be the square root of a number computed based on the 3×3 matrix for performing the scaling and positioning technique as described above. As also described above, this is one of the control parameters that may vary with the particular techniques, such as the particular scaling and/or position algorithm, utilized in an embodiment as reflected in the configuration of the Effects FPGA 1110.

5. chroma key parameters.

6. gradient control parameters such as may be used when performing wipe effects.

7. border generation control parameters used to define a colored region to be displayed outside scaled down source (e.g., the border around the input source when included in the composite frame to be displayed).

As described herein, the control settings specified for each frame time may include DVE layer crossbar settings indicating which DVE output is used for each of the layers 1 ... 9 (e.g., as illustrated by 2203 of FIG. 32).

In connection with the system and techniques described herein, one possible input source may be clips stored on a data storage device of the computer system. Clips may be used to simulate a live video feed. Clips are communicated to the main PCB over the PCI bus from the data storage of the computer system. Portions of the clip are downloaded to the PCI FPGA 1122 and stored on the RAM 1124. The PCI FPGA 1122 is configured to supply the frames of the clip to the Effects FPGA 1110 for processing by the Effects FPGA 1110 as an input source. The PCI FPGA 1122 may supply new frames of the clip as consumed by the Effects FPGA 1110. The frames of the clip as supplied by PCI FPGA 1122 may be pushed to the RAM 1120 for use by the FPGA 1110. In one embodiment, the Effects FPGA 1110 may continue to process the last frame if a new frame is not supplied when the FPGA 1110 is ready to process a next new frame.

The PCI FPGA 1122 may also perform DMA read and/or write operations in connection with clips. The PCI FPGA 1122 may download frames for the clip from computer system memory to the RAM 1124. Similarly, when storing or capturing a combiner output as a clip for storage on a device of the computer system (e.g., using the capture store crossbar 1910 of FIG. 29), the PCI FPGA 1122 may perform a DMA to store clip data from the RAM 1124 to a particular location in system memory of the computer system. From the system memory, the clip data is subsequently stored on a storage device of the computer system.

As described herein, inputs to the main PCB as used by the Effects FPGA 1110 may be in 480i or 480p format. If the input is 480i, the input may be converted to 480p for use by the Effects FPGA 1110. This conversion may be performed when a frame is stored in the RAM 1120 for processing by the FPGA 1110. This conversion may be performed by the FPGA 1110 as part of DVE processing performed on the input source (e.g., as an effect by one of the DVEs). The conversion from 480i to 480p may be performed using techniques known in the art. Described elsewhere herein are techniques that may be used in connection with such deinterlacing or conversion although any of those know in the art such as, for example, interpolation, line doubling, and the like. The conversion may be performed for video inputs and clips.

An embodiment using the techniques herein may handle processing for both synchronous and asynchronous sources. It will be appreciated that one or more synchronous sources may be synchronized, for example, using the genlock signal described elsewhere herein. An asynchronous source does not utilize such techniques. What will now be described is how a system may handle processing in an embodiment including both synchronous and asynchronous sources to perform synchronization and deinterlacing of such sources.

As described above, the DVE operations operate on a complete frame. As such, data from an interlaced input source is deinterlaced for use with the techniques herein when performing DVE operations. As known in the art, a field of pixels may be defined as having either even (e.g., even rows of pixels included therein) or odd (e.g., odd rows of pixels included therein) polarity. In connection with terminology used herein, one new field of data may be received by the components of 1100 of FIG. 21 every frame time, such as every 60$^{th}$ of a second, corresponding to the effects FPGA processing or operating rate to process and output one frame of data. The deinterlacing techniques described in following paragraphs may be used to form a complete frame every frame time, such as every 60$^{th}$ of a second, for use in connection with DVE processing by the effects FPGA 1110. With reference to FIG. 27, the Effects FPGA 1110 may be configured to perform the deinterlacing techniques herein prior to performing DVE processing for each input.

Figure 36:
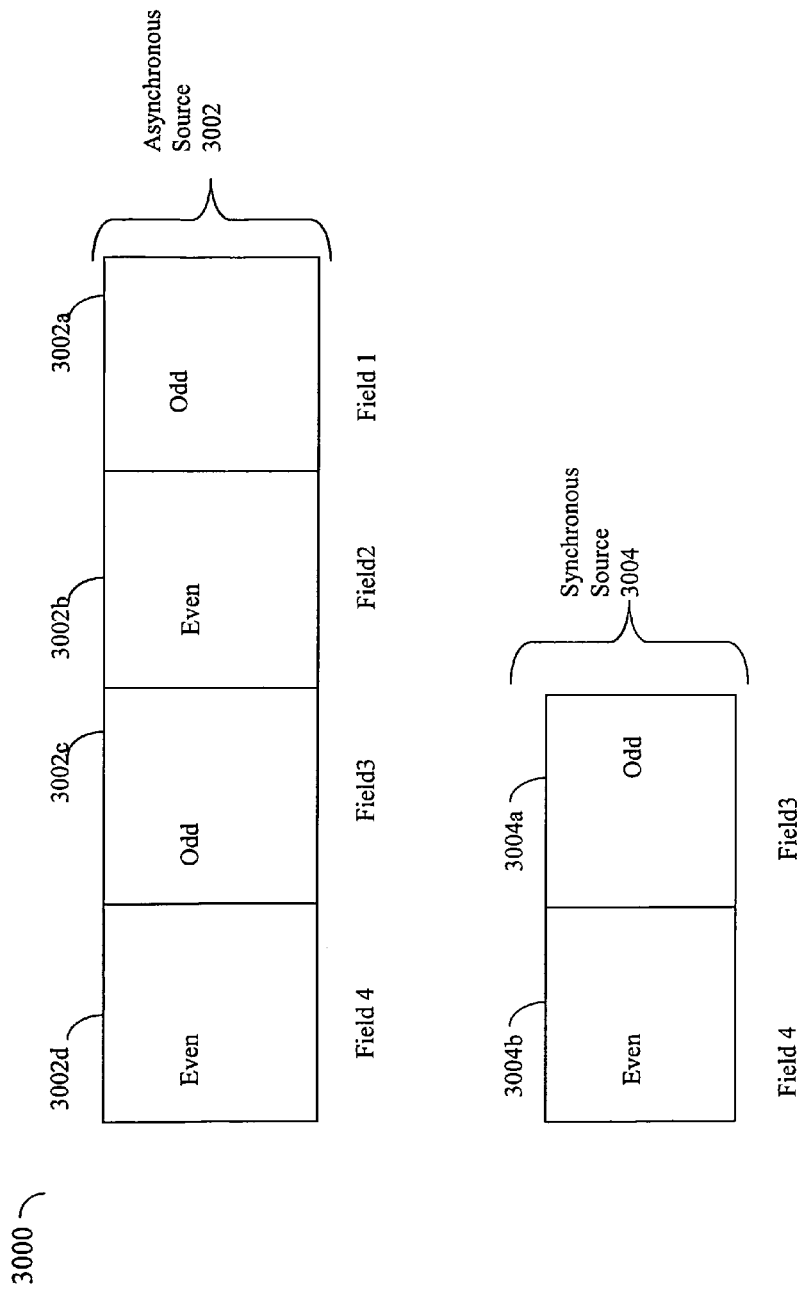
FIGS. 36-38 illustrate deinterlacing techniques.

Referring now to FIG. 36, shown is a representation 3000 illustrating data received by the Effects FPGA 1100 from an asynchronous source 3004 and a synchronous source 3002. In the example illustrated in FIG. 36, data may be received from an input source in interlaced format as described above every 60$^{th}$ of a second. Deinterlacing may be performed on an input source by buffering received data and then performing the deinterlacing using the buffered data. The deinterlacing techniques output a frame every frame time, or 60$^{th}$ of a second in this example. In 3000, a field "n" represents a field of data received at frame time "n". Data from the synchronous source 3004 may be buffered for two fields of data 3004a and 3004b each having a different polarity with 3004b representing the last completed field of data received. In this example, data from the asynchronous source 3002 may be buffered for either 3 fields (e.g., fields 2, 3, and 4) or 4 fields (e.g., fields 1, 2, 3 and 4) depending on which technique is used to form the even and odd fields use for deinterlacing. Two different techniques for use in connection with asynchronous sources are described in following paragraphs.

At frame time 4, all of the data of field 4 3004b of the synchronous source has been received. However, the asynchronous source may be out of phase, experience drifting, and the like, with respect to the synchronous source 3002 so that not all of 3002d, field 4 for the asynchronous source, has been received. Deinterlacing may be performed for the synchronous source 3004 using the data of 3004a and 3004b as will be described in following paragraphs. However, prior to deinterlacing data for the asynchronous source 3002, an embodiment needs to determine which even and odd fields of data are to be used. An embodiment may use a first technique in which data of fields 1 and 2 are used for deinterlacing. With this first technique, deinterlacing is performed using the most recently completed field of the same polarity as the currently incomplete field (e.g., use field 2 having even polarity since incomplete field 4 has even polarity) and the field that occurred prior to this field and also having the opposite polarity thereof (e.g., use field 1 which is prior to field 2). Also with this first technique, data from fields 1-4 are buffered. Alternatively, an embodiment may use a second technique in which data of fields 2 and 3 are used. With this second technique, deinterlacing is performed using the most recently completed field of the same polarity as the currently incomplete field (e.g., use field 2 having even polarity since incomplete field 4 has even polarity) and the field that occurred thereafter and also having the opposite polarity thereof (e.g., use field 3 which is after field 2). Also with this second technique, data from fields 2-4 are buffered.

Figure 37:
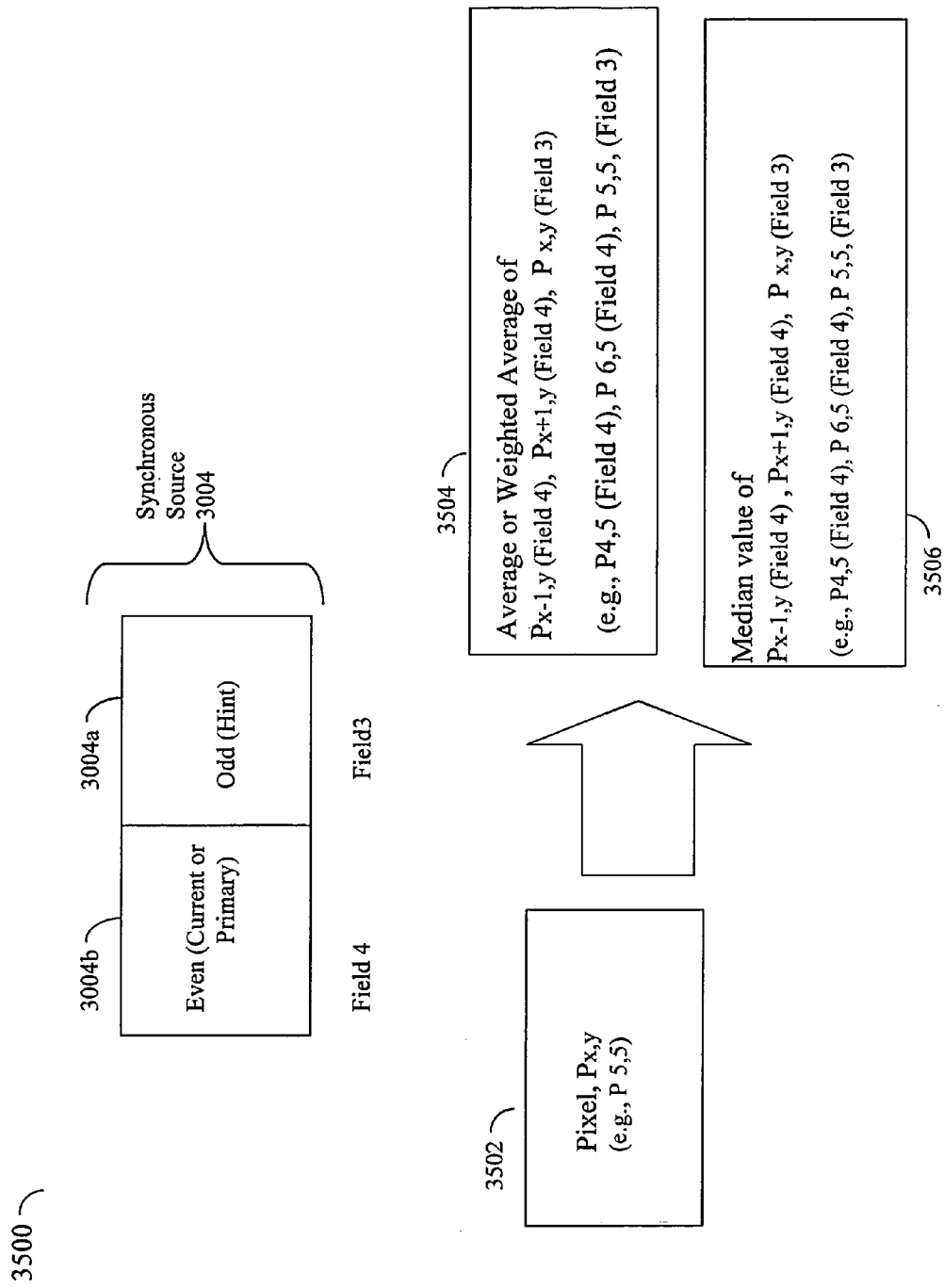

Referring now to FIG. 37, shown is an example illustrating a deinterlacing technique that may be used in connection with a synchronous source. In the example 3500, deinterlacing may be performed using field 3 3004*a* having odd polarity and using field 4 3004*b* having an even polarity. In this example, the master clock or timing is associated with frame time 4 so that field 4 is the latest and current field of data. Deinterlacing with the example 3500 is trying to determine a field of odd polarity for use with the current even field of data. In other words, techniques may be used to construct a field of data having opposite polarity for use with the current field of data (e.g., field 4). One technique may use the data from the previous field, field 3 having odd polarity, to construct the odd rows of pixels for use with field 4 to form a complete frame. The techniques herein use the data from frame 3 (3004*a*) a as a "hint" in connection with constructing the odd rows of pixels for use with field 4 (3004*b*) to form the complete frame. If there is no motion for the sources (e.g., the image at frame time 3 is the same as for frame time 4), the frame may be formed as a composite of field 3 and field 4. If there is motion, an alternate technique may be used to determine the missing rows having the opposite polarity of the current field.

Using a first technique, an average or weighted average of pixels included in the current field, field 4, and the previous "hint" field (e.g., field 3) may be used. Each pixel, Px,y 3502, of odd or missing polarity for the composite frame may be determined as represented in 3504 using the pixels in the current or primary field in the row above and below the position x,y, and the pixel in the hint field having coordinates x,y. The three pixels used to determine a pixel, Px,y, in a row of the missing polarity may be more formally represented as:

Px−1,y (Field 4—current or primary field)
Px+1,y (Field 4—current or primary field) and
P x,y (Field 3—hint field)

An embodiment may take an average of these three pixels or a weighted average of these 3 pixels. The particular weights may vary with embodiment. An embodiment may select a weight of 0 to be used, for example, in connection with the pixel P x,y (Field 3) so that only the two pixels from field 4 are used to determine the odd row pixels using the even row pixels above and below.

Rather than the foregoing first technique of 3504, an embodiment may use the technique of 3506 where a median of the foregoing three pixels may be used to determine the missing odd rows of pixels for the current field 4.

The foregoing describes techniques that may be used to deinterlace a synchronous source.

Figure 38:
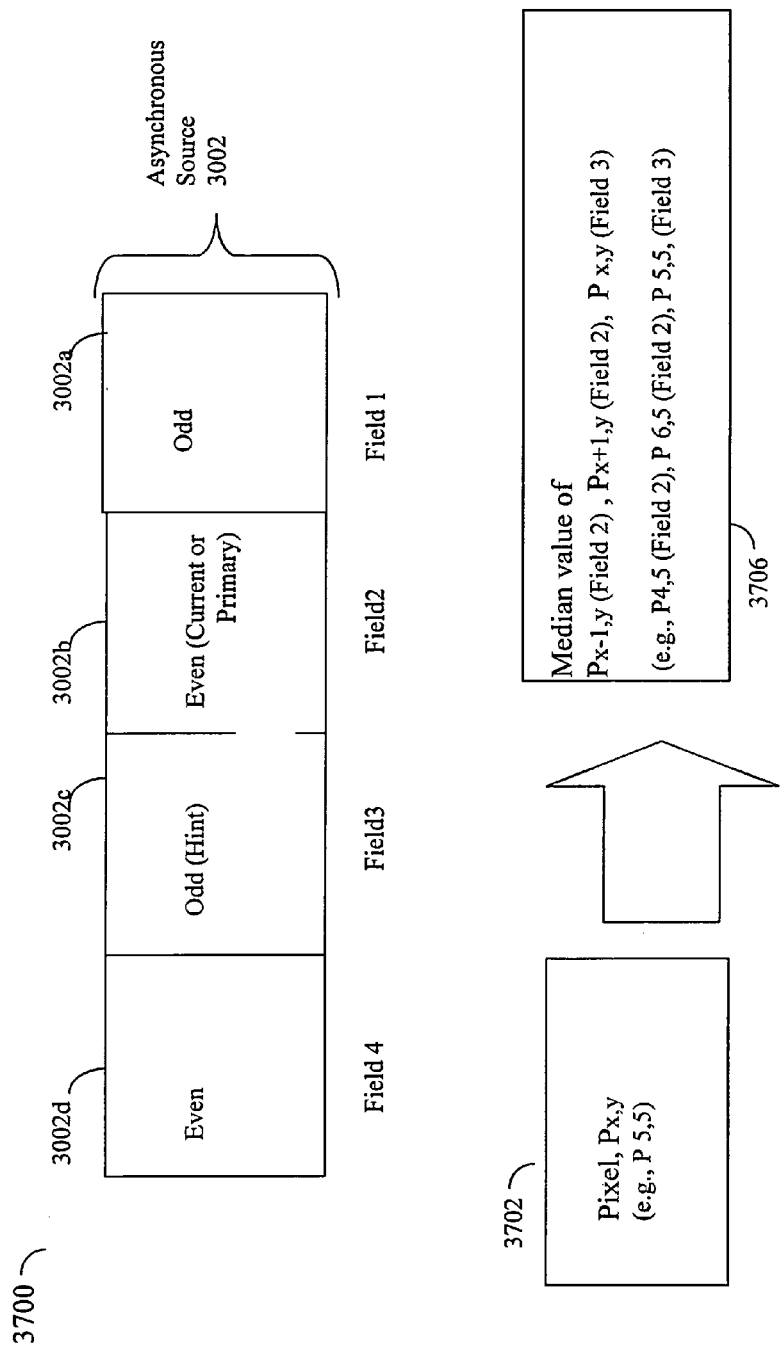

Referring now to FIG. 38, show is an example illustrated a technique that may be used to deinterlace an asynchronous source, such as 3002. In the example 3700, the median of three pixel values may be used to determine each missing pixel in the odd rows. In this example 3700, the current frame time=4 and the current incomplete field is field 4. As described above, an embodiment may select fields 2 and 3, or fields 1 and 2 for use in forming the composite frame. The example 3700 illustrates the case where fields 2 and 3 are selected. Field 2, the most recently completed field of the same polarity as the currently incomplete field, is used as the current or primary field. Field 3, the field that occurs thereafter and also having the opposite polarity thereof, is used as the "hint" to determine or construct the missing odd rows of pixels for use with current or primary field 2 having the even rows of pixels. In an embodiment selecting fields 1 and 2, rather than fields 2 and 3, field 1 may be used as the "hint".

In connection with this example 3700 using fields 2 and 3, the median value of the following three pixel values may be used to determine a pixel, Px,y, in a row of the missing polarity:

Px−1,y (Field 2—current or primary field)
Px+1,y (Field 2—current or primary field) and
P x,y (Field 3—hint field)

In connection with the median technique used for both the synchronous and asynchronous sources, a current or primary field of pixels having a first polarity is selected and the median value technique is used to fill in the missing rows of pixels of opposite polarity. The median value technique may use pixels from the current or primary field and the hint field as described above.

In connection with the foregoing deinterlacing techniques for both synchronous and asynchronous sources, there are times when a pixel of the three pixel values used for determining the median, average or weighted average may be undefined. For example, with reference back to FIG. 28 for an asynchronous source with a 1-based X,Y pixel coordinate system, consider determining a pixel value for 1,1 using the median technique which takes the median of: 0,1 (field 2); 2,1 (field 2) and 1,1 (field 3). There is no pixel 0,1 so an embodiment may utilize any one of a variety of techniques to provide such pixel values. For example, an embodiment may use a pixel value corresponding to displaying a "black" pixel. An embodiment may mirror the existing image about the outmost edge and utilize an existing pixel from another corresponding image location. It will be appreciated by those skilled in the art that these, as well as other techniques, may be used to provide such pixel values.

It will be appreciated by those skilled in the art that although the deinterlacing techniques described herein are illustrated for exemplary purposes in determining missing rows of odd polarity, the same techniques may be used for determining missing rows of even polarity.

It should be noted that although particular deinterlacing techniques have been described herein, an embodiment may also utilize others.

Described herein is an embodiment in which the computer system combines the DVE processing operations for all DVE stages for each input as illustrated, for example, in FIG. 28 and accordingly generates control settings each frame time representing such combination. Rather than have the computer system perform processing to mathematically combine all DVE operations for each input source and output a single set of DVE control settings, the code executing on the computer system may alternatively output a set of DVE control parameters for each DVE stage for each input source (e.g., a set of control settings or parameters for each of 1606*a*, 1606*b* and 1612*a* for input C of FIG. 28) and the Effects FPGA 1110 may mathematically combine and apply the DVE operations for all of the stages to a given input. For example, with reference to FIG. 28, the code executing on the computer system may determine three sets of DVE control settings corresponding to each of 1606*a*, 1606*b* and 1612*a*. The three sets are passed over the PCI bus to the effects FPGA 1110 which is configured to mathematically combine the DVE processing operations for the three sets of DVE control settings and apply the combination of the DVE operations to the input C. In such an embodiment, the computer system may not perform any combining of the DVE processing operations and the Effects FPGA may perform processing to mathematical combine the DVE processing operations. In yet another variation, an embodiment may have the code on the computer system mathematically combine a designated portion of DVE processing operations and have the Effects FPGA mathematically combine any remaining DVE processing operations so that the combining of DVE operations is partitioned between the computer system and the Effects FPGA.

Although code executing on a computer system has been described herein as performing processing to generate control settings, obtaining state information, and the like, which may be communicated to the Effects FPGA 1110, it will be appreciated by those skilled in the art that one or more other FPGAs and/or processors included in a system may perform processing of the computer system as described herein.

The foregoing describes a flexible and efficient architecture for use in connection with video processing. Such techniques may be used in connection with a live production system using a computer, such as a commercially available personal computer, using the main PCB and optionally other PCBs as described herein. The architecture provides for applying desired video effects in combination to each of one or more inputs and then combining the transformed one or more inputs in a single frame time. In one embodiment, code executing on the computer system may mathematically combine the processing operations to be performed on each input source. The foregoing combining varies with respect to the effects applied, if any, to each input source. The particular code executed on the computer system and the mathematical operations combined vary with the effects performed to each input source. The code on the computer system may determine, for example, scaling factors and final position coordinates of the input source within a frame for applying in combination the desired effects to the input source. The scaling factors and position coordinates, as well as possibly other and/or different parameters that may be determined, may be communicated to the Effects FPGA as DVE and/or combiner control settings each frame time. The Effects FPGA may be configured to performing scaling and positioning processing of the input source, as well other operations, to reflect the application of the desired effects on the input source. The Effects FPGA may also be configured to generate a composite result of the one or more transformed input sources included in the composite resulting frame. The Effects FPGA of the main PCB may be configured to perform processing in accordance with any one or more different scaling and positioning techniques using the scaling factors and position coordinates specified. Using the techniques herein, the mathematical combination of the effects applied to an input source may be reflected in parameterized operations such as, for example, parameterized scaling and positioning, mix effect and wipe effect operations. The code on the computer system determines the scaling factors and position of the input source, the fade levels for a particular mix effect (e.g., fade levels may be specified for the combiner), a gradient for use with a particular wipe effect, and the like, with all effects applied. The Effects FPGA is configured to scale and position the input source in accordance with the scaling factors and position settings, as well as other settings, determined by the code on the computer system or other processor for use by the Effects FPGA. The Effects FPGA may be reconfigured to utilize a new scaling technique or generate a different number of combiner outputs, reflect design changes, such as a different number of layers, combiners, source inputs, and the like. The code executing on the computer system may accordingly determine additional or different control settings for each frame time in accordance with how the Effects FPGA is configured. Some examples are described herein and may relate to different parameters used by a particular scaling technique for which the Effects FPGA is configured. Other control settings, such for the DVE for each frame time, may relate to other processing performed on an input such as, for example, whether an input source is to be optionally prefiltered, which filtering technique to use, and the like.

Described herein are control settings that may be specified each frame time for processing a next frame of each of the selected one or more input sources. Code executing on the computer may determine a number of buffered control settings in which one set of control settings are utilized for one frame time. The number of sets of control settings buffered may vary with the amount of buffer space allocated for use on the main PCB by the Effects FPGA.

What will now be described are techniques that may be performed in an embodiment for automatic aspect ratio transformation processing as a digital video effect using aspect ratio management. The automatic aspect ratio transformation processing may be performed in an embodiment utilizing the single pass architecture described herein as well as with other architectures, such as that illustrated in FIG. 15, for providing digital video effects. For purposes of example and illustration, reference may be made herein to figures describing the single pass architecture.

As described herein, automatic aspect ratio transformation processing may be performed when processing an input source having a different aspect ratio than that of an output. The foregoing may also be performed in connection with multiple input sources in which the aspect ratios of the input sources may differ from one another as well as from the output. The techniques herein may be used to combine the foregoing multiple input sources having different aspect ratios to produce the output. As known in the art, the aspect ratio of an image is its width divided by its height and relates to the picture or presentation. In connection with the techniques herein, aspect ratio refers to what may also be referred to as picture aspect ratio. Picture aspect ratio defines the height and width proportion of the image in a manner which is independent of the resolution or pixel dimensions. Picture aspect ratio, as used in connection with the techniques herein, is distinct from pixel aspect ratio. Pixel aspect ratio defines the horizontal and vertical size proportion of each pixel comprising the image. For a given pixel aspect ratio, the image proportion changes according to the number of horizontal and vertical pixels. In contrast to picture aspect ratio, pixel aspect ratio is resolution-dependent. In following paragraphs, reference to "aspect ratio" refers to picture aspect ratio. Examples of such aspect ratios are 4:3 and 16:9 as well as others. In following paragraphs, reference may be made to particular aspect ratios for purposes of illustration. However, the techniques herein should be construed as limited to these particular aspect ratios and may be more generally used with any aspect ratio.

Aspect ratio management allows a user to specify values and options that are described in more detail below. A system, such as one described herein using the single pass architecture, may then use those values and options as needed in subsequent processing to automatically transform or convert an image frame from an input source having a first aspect ratio to a resulting or output image frame for use with an output source have a second aspect ratio that differs from the first aspect ratio. The techniques herein allow a user to specify the options as part of setup or configuration of the system. Subsequently, processing may utilize the user specifications as needed when the foregoing aspect ratios of the input and output differ. The foregoing allows for the automatic aspect ratio transformation processing to be performed without requiring further user interaction or specification once the user specifies such values for the input sources. As will be described in more detail in an embodiment using the single pass architecture, the techniques herein may be used with control parameters determined by code executing on a computer system. The control parameters may then be communicated to the main PCB for use by the Effects FPGA in performing the processing to transform frames from the input source having the first aspect ratio to frames having a second different aspect ratio in accordance with the aspect ratio of the output.

Referring to FIG. 39, shown is an example illustrating the information that may be used in an embodiment in connection with performing the automatic aspect ratio transformation processing described herein. In the example 3800, an embodiment may allow a user to specify selections or options for each input source. In one embodiment as illustrated with reference to FIG. 29 described above, there may be 15 available input sources and entry may be included in the table of 3800 for each such input source. Input sources may include, for example, one or more video inputs, clips, CG or graphic stores, and logo or still inputs. For each input source, the example 3800 includes 3 items of information that may be specified by a user: input or source aspect ratio, aspect ratio treatment and justification. The input or source aspect ratio may be used to specify the aspect ratio of the associated input source. In one embodiment, the input aspect ratio, as may be defined by a user for the corresponding input source, may used when the input source is anything other than an HD input source. If the input source is an HD source, the system may use a default of 16:9. If the input source is a CG, a still, or an SD video input or and SD clip, the input aspect ratio may be used in defining the aspect ratio for frames from that input source. The aspect ratio treatment may specify how to treat or transform frames from the input source when performing the aspect ratio conversion or transformation to that of the output. In other words, the aspect ratio treatment describes how the input source is processed or modified when transforming a frame from the input aspect ratio to the output aspect ratio. Examples of aspect ratio treatments that may be included in an embodiment are box and crop. These, as well as other possible aspect ratio treatments, are described in more detail below. A justification option may also be specified for each input source. The justification option affects how an image frame is positioned with respect to the output frame and may affect what portions of the input source frames are discarded if there is any cropping or elimination of portions of the input frame.

It should be noted that a system may also define default options or selections for use with one or more input sources for use with the techniques herein. In other words, a predefined set of selections or configurations may be used within a system in addition to, or in place of, those that may be defined by the user. The values used with automatic aspect ratio transformation processing as described herein may be defined in a variety of different ways such as those just described as well as others that may vary with embodiment.

It should also be noted that if the aspect ratio of an input source is the same as the aspect ratio of the output, transforming or converting between aspect ratios is not necessary and is thus not performed. In connection with the techniques herein, the foregoing determination is automatically performed as part of the automatic aspect ratio transformation processing. If there is a difference in aspect ratios for the input and output, automatic aspect ratio transformation processing also provides for utilizing the foregoing information so that the code executing on the computer system may determine the proper control parameters to send to the Effects FPGA. In one embodiment, the determination as to whether the input and output aspect ratios are the same or different (e.g., aspect ratio conversion is needed) may be performed by code executing on CPU of a computer system, such as that of the workstation described in connection with other figures herein. The code may accordingly determine the appropriate control parameters to send to the Effects FPGA based on this determination. If no aspect ratio conversion is needed as determined by comparing the input and output aspect ratios, the control parameters reflect this so that no aspect ratio conversion is performed by the Effects PFGA. If aspect ratio conversion is needed as determined comparing the input and output aspect ratios, the control parameters also reflect this so that aspect ratio conversion is performed. The foregoing is described in more detail in following paragraphs.

In one embodiment, the user may specify the information for each input source as illustrated in FIG. 39 using dialogue boxes (e.g. as with wizards), menu selections, and the like, with a user interface. The user selections for each input source may be stored in a file on the computer system, such as one or more XML files or other forms. In an embodiment, components of a system may be able to detect the input or source aspect ratio associated with an input source. For example, the system may automatically detect an HD source and use an aspect ratio of 16:9. Otherwise, the user specified/defined input or source aspect ratio may be used. With respect to a video source, for example with reference to the HD SD I/O Board as illustrated in FIG. 25, a GF9351 chip providing an input signal (e.g., e.g., elements 1508a-1508d) may indicate whether an input source is an HD or SD source. For clips, CGs and stills, each input source may have many different files stored on the computer system associated therewith. An input or source aspect ratio may be specified for each file individually. A Clip file is recorded or stored video which can be HD or SD. When the clip is recorded, attribute information about the stored video may be recorded. The attribute information may indicate whether the clip is recorded from an HD or SD source. Files associated with the CG and still sources may not have stored attribute information for the files. As such, the user specified values illustrated in the example 3800 for the CG and still sources may be used. In the event that a user does not specify values for a particular source, a system default set of values as indicated in FIG. 39 may be used.

Aspect ratios that may be associated with an input and output may include the well known 4:3 and 16:9 aspect ratios that may be associated with video. These particular aspect ratios may be referred to in connection with following figures for purposes of illustration of the techniques herein. As will be appreciated by those skilled in the art, different aspect ratios may also be used in an embodiment.

Figure 40:
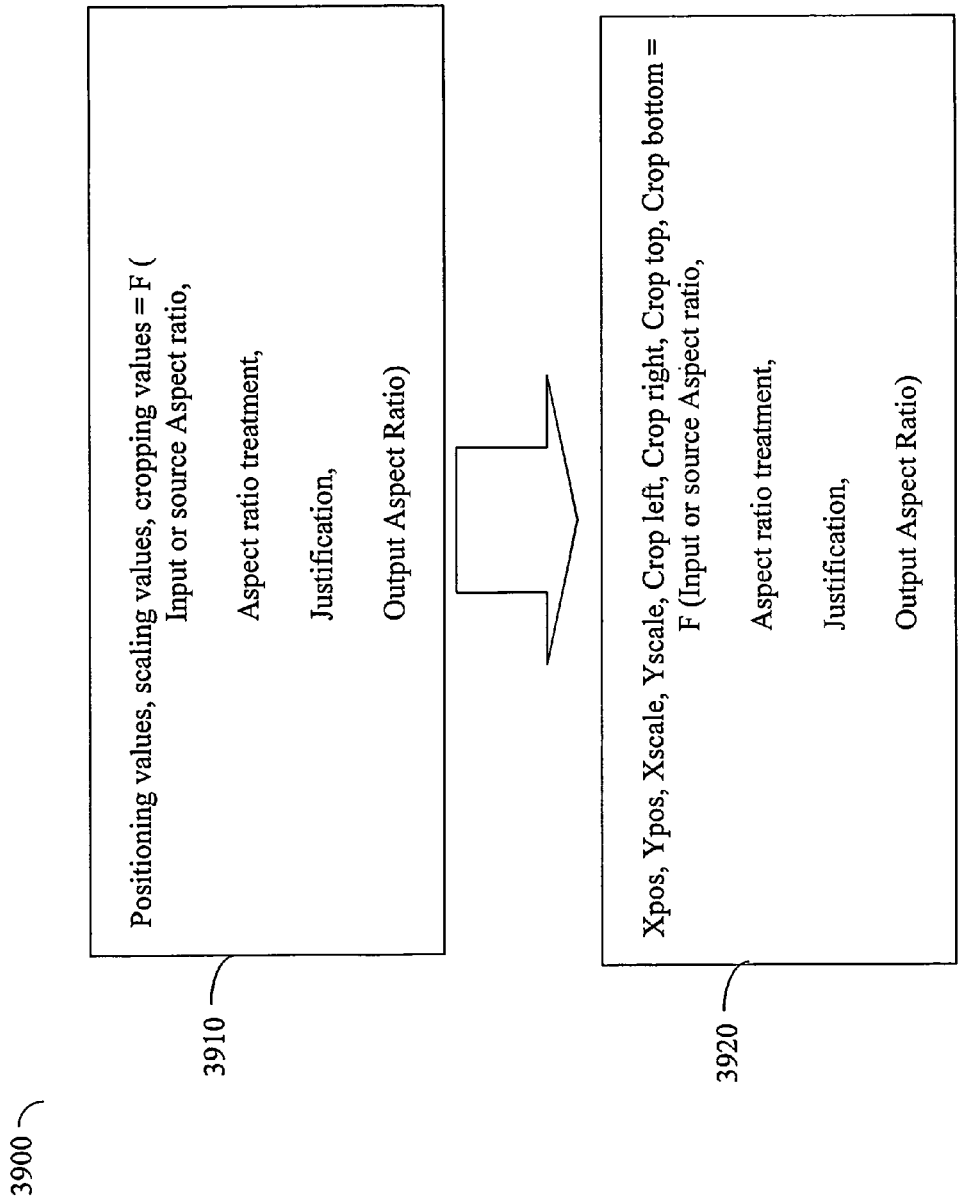
FIG. 40 is an example illustrating the control parameters that may be generated based on characteristics or attributes of an input source for use in connection with automatic aspect ratio transformation processing.

Referring to FIG. 40, shown is an example 3900 representing the control parameters that may be determined in an embodiment using the aspect ratio of the output (e.g., output aspect ratio) and the foregoing information for an input source, as illustrated in FIG. 39. With respect to an input source, element 3910 illustrates the determination of the control parameters for positioning, scaling and cropping as a function of the input or source aspect ratio, the aspect ratio treatment, justification and output ratio. The control parameters may be values transmitted to the Effects FPGA so that the Effects FPGA performs processing to transform the frames of the input source with the input aspect ratio to frames of the output having the output aspect ratio. Element 3920 illustrates an example of particular control parameters that may be used in an embodiment. In one embodiment, the control parameters may include positioning values—Xpos and Ypos, scaling values—Xscale and Yscale, and cropping values—crop right, crop left, crop top, crop bottom. The parameters Xpos, Ypos, Xscale and Yscale may be as described elsewhere herein. The code on the computer system may determine X and Y positioning values (Xpos, Ypos) representing a coordinate position indicating where the input frame is to be positioned in the output frame. In one embodiment, the foregoing positioning values may specified with respect to a coordinate system with (0,0) corresponding to the upper left corner of the output frame. An example is described in following paragraphs. The code on the computer system may also determine X and Y scaling factors (Xscale, Yscale) which are values indicating how to scale the input source frames in connection with transforming an image from the input or source aspect ratio to the output aspect ratio. The cropping values (crop right, crop left, crop top, crop bottom) may indicate how many rows and/or columns of pixels are removed from each edge of the image.

In one embodiment using the single pass architecture described herein, the code on the computer system may determine the values Xpos, Ypos, Xscale, Yscale, Crop left, Crop right, Crop top, Crop bottom each frame time for a given input source having an aspect ratio that differs from the output aspect ratio. The control parameters are then transmitted to the main PCB for use by the Effects FPGA as described herein so that the Effects FPGA can perform the necessary processing to transform a frame from the input source. With reference to FIGS. 28 and 29, the control parameters of 3920 may be used to control processing of the DVE performing the scaling, positioning and/or cropping to effect the transformation of the image having the input aspect ratio to an image having the output aspect ratio.

It should be noted that the output aspect ratio may be determined in a variety of different ways in an embodiment. The output aspect ratio may be defined via configuration options or settings using software, automatically detected by interrogating the output device for its characteristics, and the like, as may vary with output device and embodiment.

It should be noted that an embodiment may also determine the positioning and scaling values without the cropping values, and include the positioning and scaling values as control parameters while omitting the cropping values. The embodiment may select to omit the cropping values in accordance with whether such values are needed for the particular implementation and functionality provided. For example, in an embodiment in which aspect ratio conversion is the only effect provided, or the only effect for which control parameters are being determined, the cropping parameters may be omitted. An embodiment may provide the cropping parameters, for example, when determining control parameters reflecting the result of aspect ratio conversion processing in combination with one or more other video effects. The cropping values may be used, for example, by the Effects FPGA or other component utilizing the control parameters to ensure that appropriate pixel information is removed as a result of scaling performed for an image.

Figure 41:
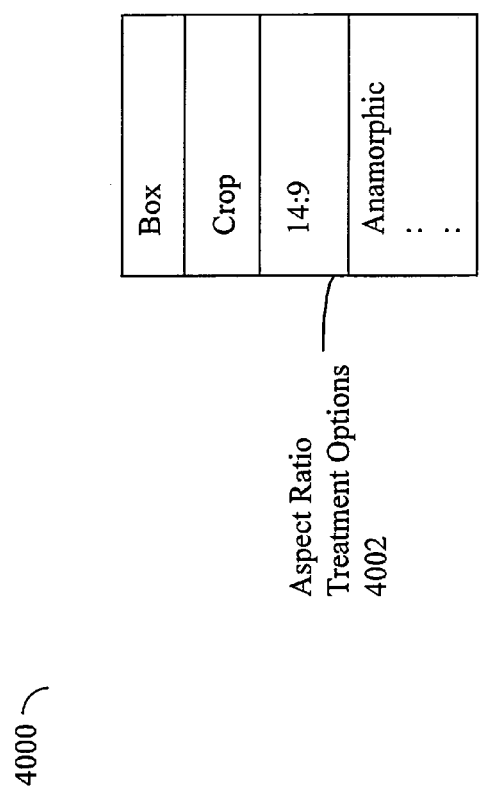
FIG. 41 is an example illustrating aspect ratio treatments that may be included in an embodiment.

Referring to FIG. 41, shown is an example illustrating the different aspect ratio treatment options that may be included in an embodiment for use with the techniques herein. The example 4000 illustrates information that may be displayed in a menu when a user is configuring or setting up a system or otherwise specifying values for an input source. The aspect ratio treatment options 4002 may include box, crop, 14:9, and anamorphic. An embodiment may also include other aspect ratio treatment options than as illustrated herein. The foregoing are known in the art as ways of treating or processing an image and affect how frames of the input source are transformed when the aspect ratios of the input source and output differ. The box option places the image in a box, and where the image does not fill the output frame, black bars are used to fill the frame. When performing automatic aspect ratio transformation processing for converting a 4:3 aspect ratio to a 16:9 aspect ratio, boxing results in what is known as a pillar box with black bars on the sides. When transforming from a 4:3 aspect ratio to a 16:9 aspect ratio, boxing results in what is known as a letter boxing with black bars on the top and bottom. The crop option provides for scaling and cropping sides of the image. As with the box option, whether the top and bottom or left and right sides are cropped varies with whether automatic aspect ratio transformation processing is performing a 4:3 to a 16:9 transformation, or a 16:9 to 4:3 transformation. The 14:9 aspect ratio treatment option specifies a 14:9 aspect ratio which may be characterized as a compromise aspect ratio used to create an acceptable picture on both 4:3 and 16:9 televisions. In connection with a 16:9 input source aspect ratio and a 4:3 output aspect ratio, the sides of the input image are cropped to 14:9 and narrow black bars are added to the top and bottom when displayed in the 4:3 format of the output. In connection with a 4:3 input source ratio and a 16:9 output aspect ratio, the top and bottom of the input frame are cropped to 14:9, and then black bars are added to either side. The 14:9 aspect treatment option may be thought of as an intermediate aspect ratio used in connection with transforming the input source from the input aspect ratio to the output aspect ratio. When performing a 4:3 to 16:9 aspect ratio transformation, the anamorphic treatment option may be characterized as stretching an image horizontally. When performing a 16:9 to 4:3 aspect ratio transformation, the anamorphic treatment option may be characterized as horizontally squeezing the 16:9 image into a 4:3 display. With anamorphic, no image information is discarded or cropped. This is in contrast to the other aspect ratio treatment options illustrated in FIG. 41 which result in the loss or discarding of some portion of the input image as part of the aspect ratio conversion or transformation processing. The aspect ratio treatment options generally affect the scaling, positioning and/or cropping of the input image when placed in the output frame.

Figure 42:
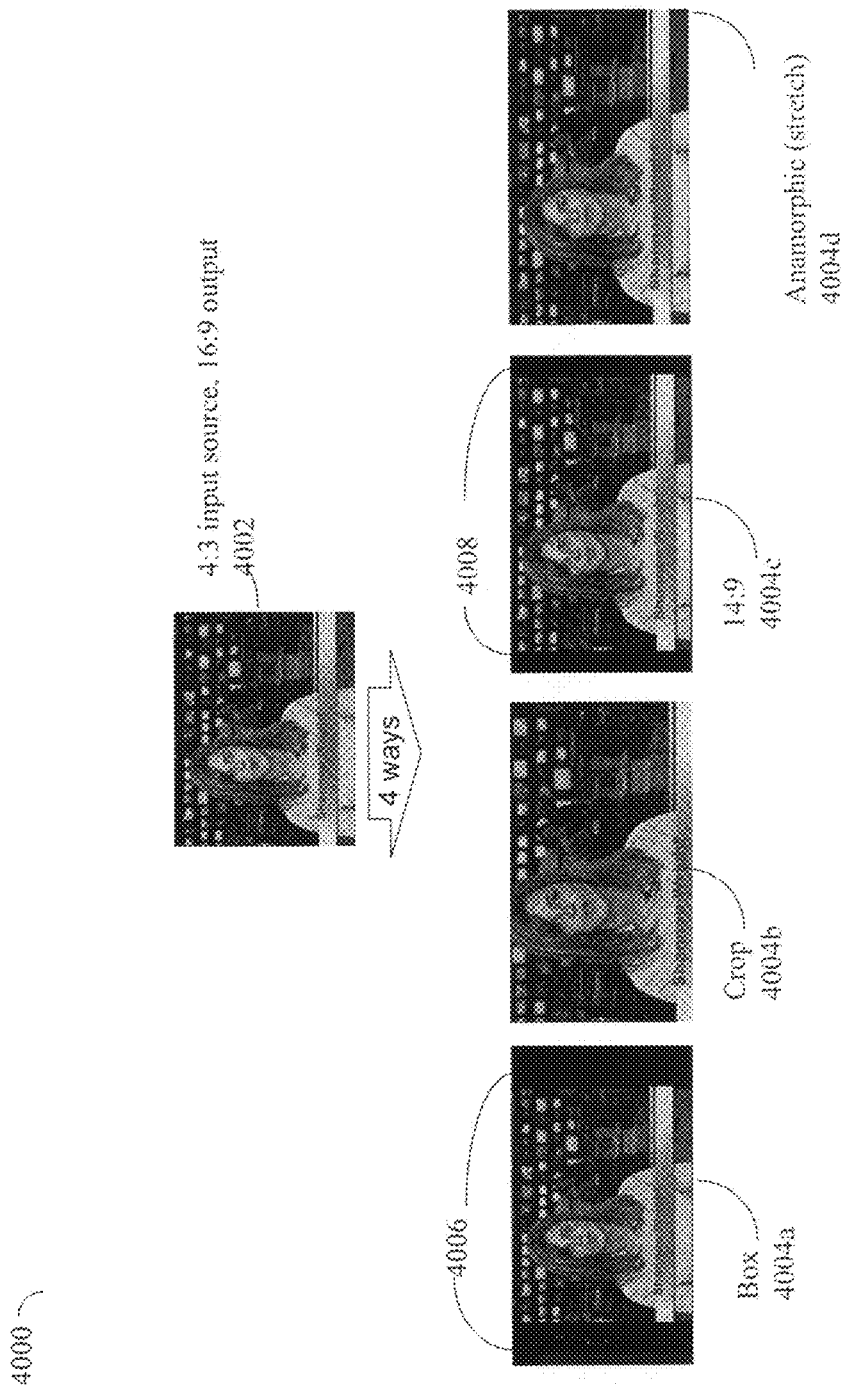
FIG. 42 is an example illustrating application of different aspect ratio treatments in an embodiment using the techniques herein.

Referring to FIG. 42, shown is an example illustrating the particular aspect ratio treatments of FIG. 41 when applied in connection with automatic aspect ratio transformation processing with a 4:3 input source and a 16:9 output. The example 4000 includes the 4:3 input source 4002 and illustrates the affect of applying each of the different aspect ratio treatment options of FIG. 41 when the output aspect ratio is 16:9. Element 4004*a* illustrates application of the box treatment option with black bars 4006 of the pillar boxing. Element 4004*b* illustrates application of the crop treatment option with top and bottom portions of the image cropped. Element 4004*c* illustrates application of the 14:9 treatment option with cropping of portions from the top and bottom and black bars 4008 on the left and right sides. Element 4004d illustrates application of the anamorphic treatment option.

Figure 43:
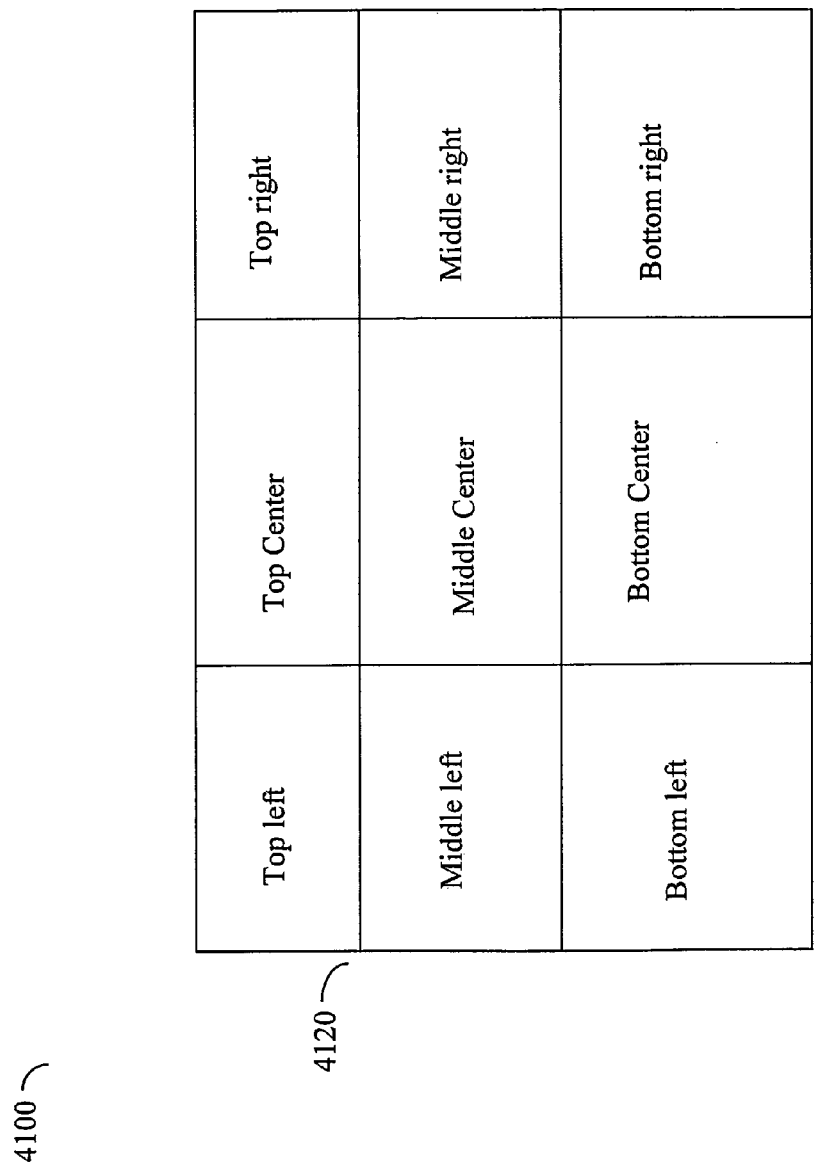
FIG. 43 is an example of the justification options that may be included in an embodiment using the techniques herein.

Referring to FIG. 43, shown is an example illustrating justification options that may be included in an embodiment. The example 4100 includes 9 possible justification options that may be specified. The example 4100 includes 9 justification options from which a selection may be made and associated with an input source: top left, top center, top right, middle left, middle center, middle right, bottom left, bottom center, and bottom right. In connection with the options of 4100, a user may determine a portion of the image 4120 associated with a particular justification option as illustrated. The user may determine which image portion contains important information that a user may not want eliminated or removed as part of the automatic aspect ratio transformation processing. The selected justification option affects the position of the image in the output frame and, thus, affects which portions of the image are removed in accordance with the selected aspect ratio treatment. It should be noted that the justification option has no affect in connection with the anamorphic aspect ratio treatment since no portion of the input image is removed or discarded. The effect of the justification option as may be included in an embodiment will now be illustrated.

It should be noted that the justification options described above may perform justification with respect to edges or sides of the image. Those described above may also be characterized as preset or predefined in the system. As a variation, an embodiment using the techniques herein may also provide justification options which are user-selected or specified. For example, an embodiment may allow a user to specify a justification by having the user indicate a vertical and/or horizontal position with a joystick or other input device. As a further example, an embodiment may include as a justification option "pan and scan", which is known in the art, where an image is cropped to focus on the most important aspects of the image. The technique is called "pan-and-scan" because the video operator can "pan" or move across the image so that the portions which are cropped may vary from frame to frame to focus on the action as it varies from frame to frame.

Figure 44:
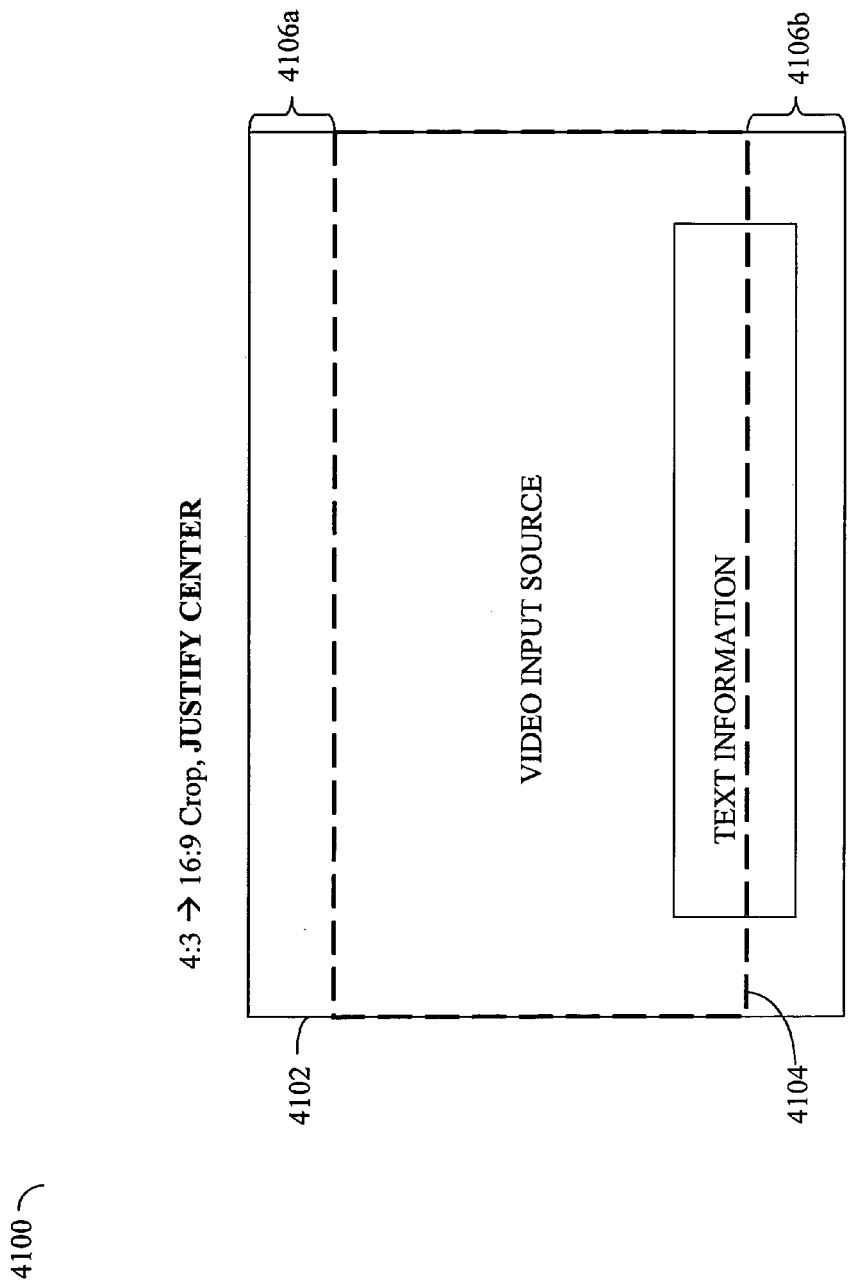
FIGS. 44-45 are examples illustrating application of different justification options in an embodiment using the techniques herein.

Referring to FIG. 44, shown is an example illustrates the effect of the justification option in connection with automatic aspect ratio transformation processing. In the example 4100, the input aspect ratio is 4:3, the output aspect ratio is 16:9, the aspect ratio treatment is crop, and the justification option is one of justify top center, middle center, or bottom center. The outer rectangular region designated by 4102 corresponds to the input image, such as illustrated by 4002 of FIG. 42, positioned with respect to the output frame region 4104 indicated by the dashed rectangle. Elements 4106a and 4106b correspond, respectively, to the top and bottoms cropped portions of the 4:3 input image when displayed in an output have a 16:9 aspect ratio. As illustrated, a portion of the TEXT INFORMATION included in the input image is removed as a result of the cropping. This may be undesirable if the TEXT INFORMATION is considered important so that cropping results in loss of such information when displayed on the output device. The foregoing illustrates the effect when the justification option is one of the foregoing center justification options causing the portions cropped to be from both the top and bottom of the input image. In this case, the input image is centered horizontally with respect to the output frame.

Figure 45:
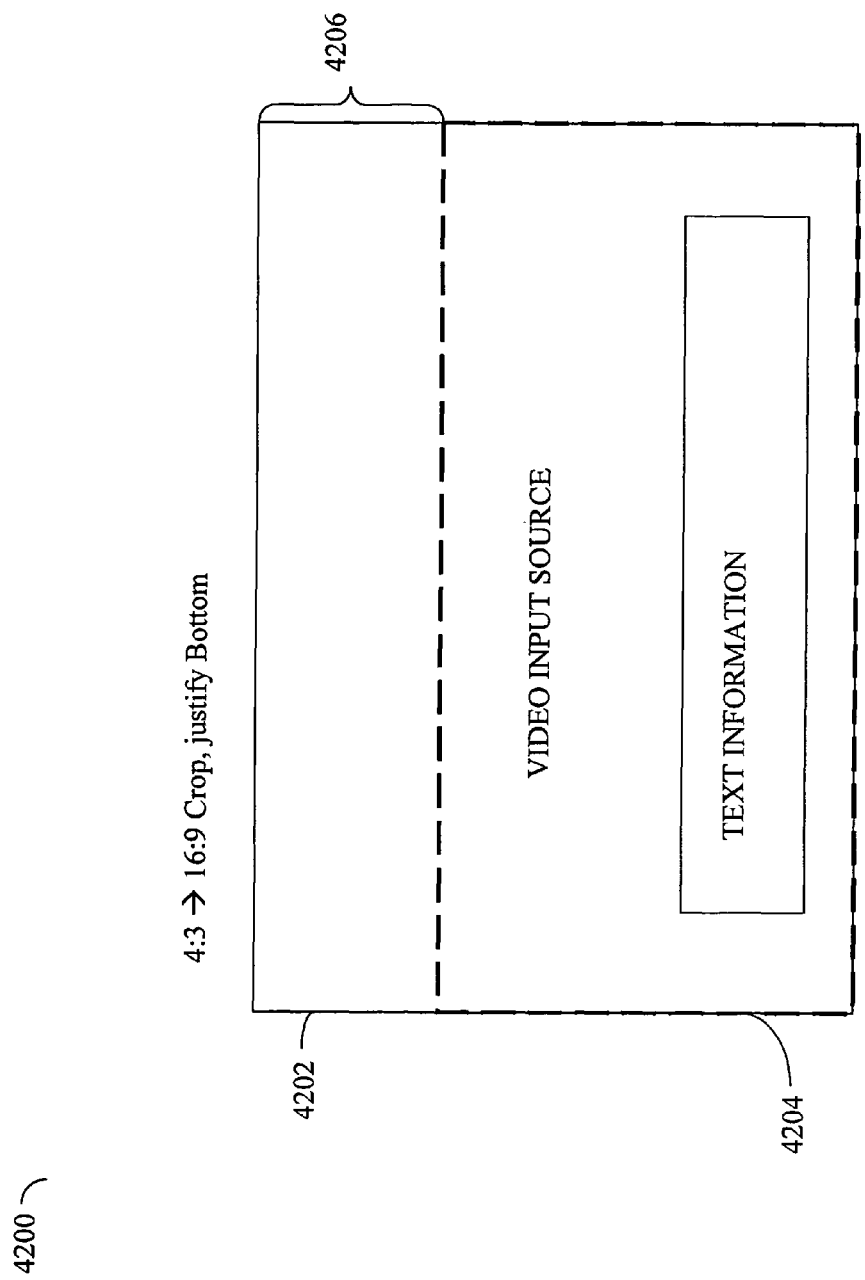

If the TEXT INFORMATION is important and a user does not want to have portions thereof removed when performing automatic aspect ratio transformation processing, the user may select a bottom justification option (e.g., bottom right, bottom center, or bottom left) resulting in the positioning of the image in the output frame as illustrated in FIG. 45. In the example 4200 of FIG. 45, element 4202 represents the input image positioned with respect to the output frame 4204 so that the portion 4206 of the image is cropped. Setting the justification option as one of the possible bottom justification options results in cropping only the top portion and no portion at the bottom of the input image is discarded. The area of the cropped portion 4206 corresponds to the total area as represented by 4106a and 4106b from FIG. 44. Similarly, setting the justification option as one of: top left, top center, or top right will cause the cropping to be performed only to the bottom portion of the input image so that area 4206 is removed from the bottom of the input image (e.g. determined from the bottom edge of the input image. The different justification options for left, right and middle will affect where the input image is positioned in the output frame when performing a cropping operation with an aspect ratio transformation from 16:9 to 4:3.

Figure 46:
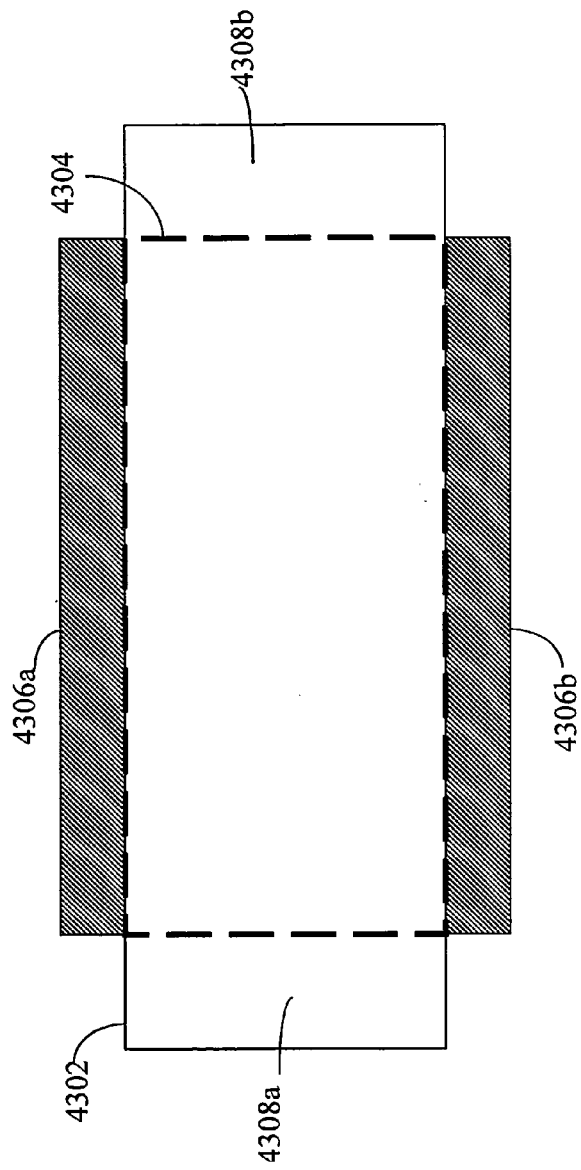
FIG. 46 is an example illustrating application of the 14:9 aspect ratio treatment in an embodiment using the techniques herein.

Referring to FIG. 46, shown is an example illustrating the 14:9 aspect ratio treatment option. The example 4300 illustrates application of the 14:9 aspect ratio treatment option with an input aspect ratio of 16:9, an output aspect ratio of 4:3, and a center justification option (e.g., one of left center, middle center or right center). Element 4302 represents the input image positioned with respect to the output frame. The area of the output frame corresponds to the combined areas of 4304, 4306a and 4306b with 4306a and 4306b corresponding to black bars included in the output display. Elements 4308a and 4308b correspond to the cropped left and right side portions of the input image. Specification of a left justification option will cause the cropping of the right side of the input image by an amount equal to the areas represented by 4308a and 4308b. Specification of a right justification option will cause the cropping of the left side of the input image by an amount equal to the areas represented by 4308a and 4308b.

It should be noted that specifying a justification option in connection with the box aspect ratio treatment affects where the black bars are positioned in the output frame. For example with reference to FIG. 42, element 4004a illustrates application of one of the center justification options. Alternatively selecting one of the left justification options causes the image to be displayed starting at the leftmost side of the output frame and the areas represented by 4006 being positioned from the rightmost side of the output frame. Alternatively selecting one of the right justification options causes the image to be displayed starting at the rightmost side and the areas represented by 4006 being positioned from the leftmost side of the output frame.

Figure 47:
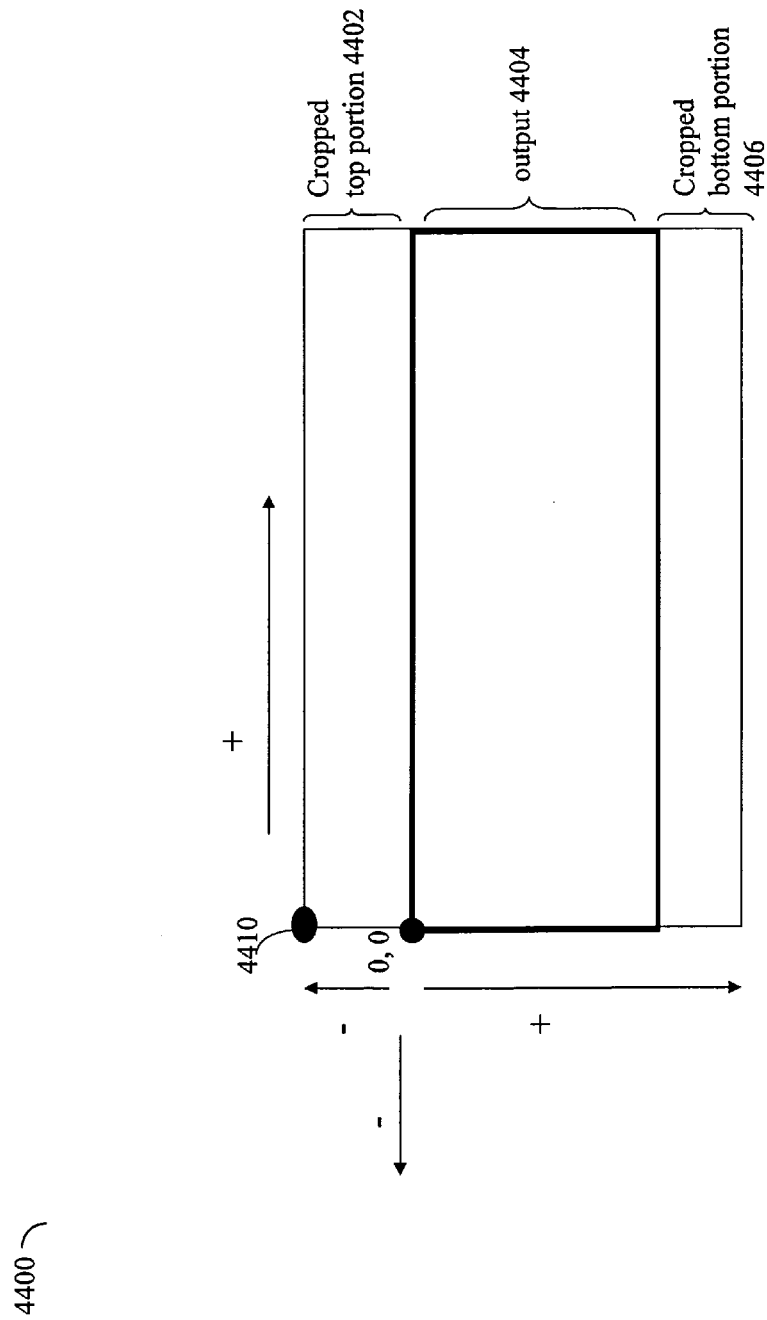
FIGS. 47-48 are examples illustrating determination of position in accordance with the techniques herein.

Referring to FIG. 47, shown is an example illustrating a coordinate system that may be used in an embodiment to express positioning of the input image with respect to an output frame. The example 4400 may illustrate mapping of coordinates used when positioning the image in the output frame as previously described in connection with FIG. 44. Coordinate (0,0) may correspond to the upper left most position in the output frame. When shifting the position of the input image in the output frame, the vertical and horizontal coordinates may be accordingly adjusted as indicated by the arrows in the example 4400. As illustrated, positioning the image at a starting location 4410 with a 0 horizontal or x-coordinate and a negative vertical or y-coordinate results in a top portion of the image 4402 being cropped, the portion 4404 of the image being included in the output frame, and a bottom portion 4406 of the image being cropped.

Figure 48:
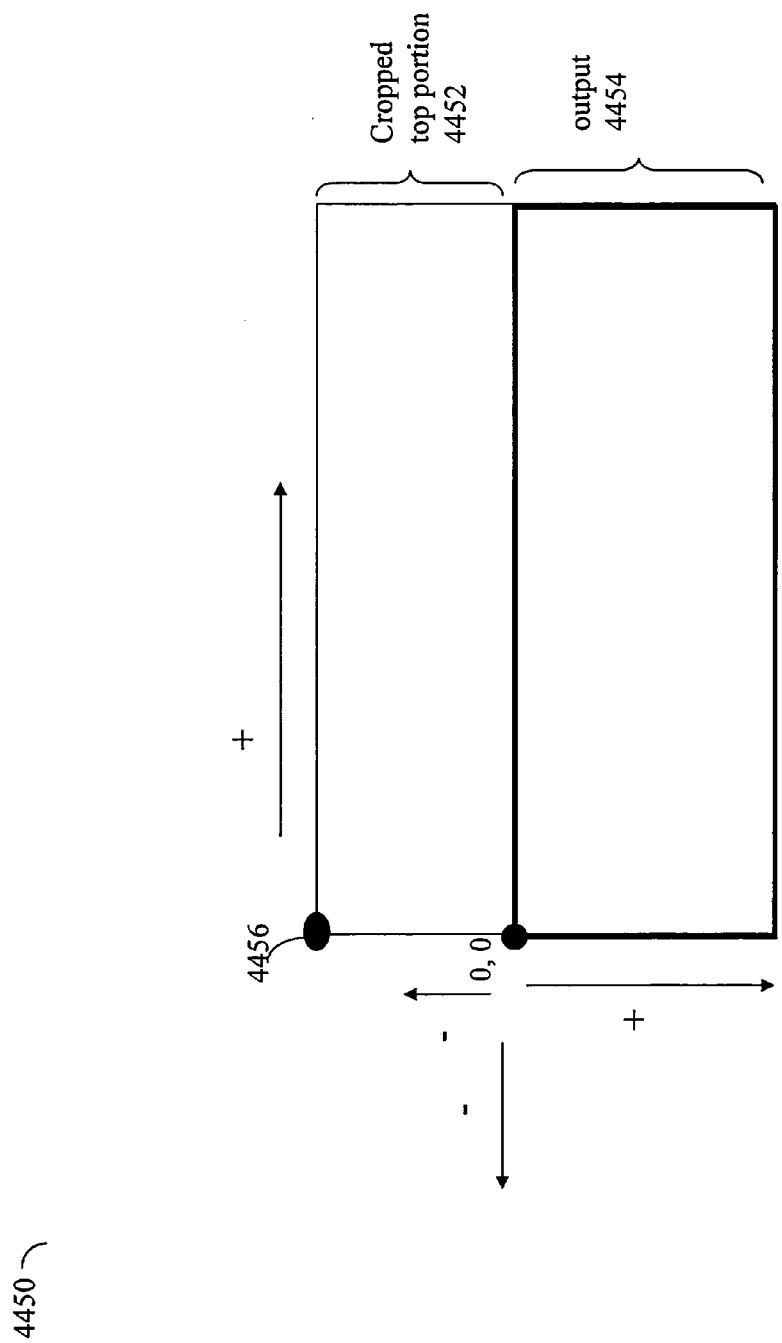

As an alternative, specifying one of the possible bottom justification options results in the image being positioned with respect to the output frame as illustrated in FIG. 48 with the associated positioning coordinates of 4456. It should be noted that point 4456=(x, y), where x, the horizontal coordinate, is 0, and y, the vertical coordinate, is a larger negative number than that associated with the vertical coordinate of point 4410 of FIG. 47. The example 4450 of FIG. 48 illustrates how a coordinate system may be used to indicate the positioning of the input image in the output frame, for example, of FIG. 45.

It should be noted that the foregoing is only one coordinate system that may be used to express the location or positioning of the input image in the output frame. Variations to the foregoing will be readily apparent to those skilled in the art (e.g., varying the location in the output frame associated with (0,0), varying the direction associated with increasing/decreasing coordinate values, and the like).

What will now be described is an example of a code snippet representing processing that may be performed on the computer system in connection with calculating values for scaling, positioning, and cropping a source image at an aspect ratio of 4:3 or 16:9 to transform it to the opposite aspect ratio of 16:9 or 4:3. In this example, the input image and target output image are of the same pixel dimensions, and only displayed at different aspect ratios. It will be appreciated by those skilled in the art that the technique may be applied for use with input and output images having different pixel dimensions.

In accordance with what is described above, the input values to the code snipped set forth below are the SourceAspect (source aspect ratio) of the image—4×3 or 16×9, the desired AspectTreament (aspect ratio treatment) to apply, the Justification to use in the transformation, and the image Height and Width in pixels. The AspectTreament input is one of the following values: Anamorphic, Box, 14×9, or Crop. The Justify input is one of the following values corresponding to the center and 8 corners of the image: TopLeft, TopCenter, TopRight, MiddleLeft, MiddleCenter, MiddleRight, BottomLeft, BottomCenter, BottomRight.

The output values included in the code portion below are the horizontal and vertical scaling, positioning, and cropping values to be used by the code or device performing the image transformation. It is assumed that areas unfilled by the source image after the transformations are applied will be filled with black pixels in the output image although an embodiment may use other fill options. In one embodiment as described herein, the output values may be used as the control parameters communicated to the Main PCB and the Effects FPGA for use therein in performing the processing to effect the transformation. As described herein, the code portion (as may be executed by code on a central processor of a computer system) may determine the control parameters to express the aspect ratio transformation in terms of scaling and positioning operations. In this example, scaling is expressed as a value used to increase or decrease the size of the image. For example, to create no scaling value of 1.0 would be used, to double the image size 2.0 would be used, and halve the image 0.5 would be used. Values are output in the variables HorizontalScaling and VerticalScaling. Positioning is an offset to move the image in pixels either vertically or horizontally. A value of 0 reflects no movement, a negative value move the image to the left, and a positive value moves it to the right. Computed values are output in variables HorizontalPosition and VerticalPosition. Cropping values are computed for each edge of the image—Top, Bottom, Left, and Right. Values indicate the number or rows of pixels to be removed from the image relative to the side specified. For example, a right crop value of 10 would remove the last 10 pixels from all lines of the image. Computed values are output as CropLeft, CropRight, CropTop, and CropBottom.

```
HorizontalScale = 1.0;
VerticalScale = 1.0;
HorizontalOffset = 0;
HorizontalOffset = 0;
HorizontalCrop = 0;
VerticalCrop = 0;
// source is 4x3, but output is 16x9
if (SourceAspect == 4x3)
{
    switch (AspectTreatment)
    {
    case Anamorphic:
        break;
    case Box: // pillar box
        HorizontalScale = 12.0/16.0;
        HorizontalOffset = Width*(1.0- HorizontalScale)/2.0;
        break;
    case 14x9:
        HorizontalScale = 14.0/16.0;
        VerticalScale = 16.0/14.0;
        HorizontalOffset = Width*(1.0- HorizontalScale)/2.0;
        VerticalOffset = Height*(1.0- VerticalScale)/2.0;
        VerticalCrop = Height/16;
        break;
    case Crop:
        VerticalScale = 16.0/12.0;
        VerticalCrop = Height/8;
        VerticalOffset = Height*(1.0- VerticalScale)/2.0;
        break;
    }
}
// source is 16x9, but output is 4x3
else if (SourceAspect == 16x9)
{
switch (AspectTreatment)
    {
    case Anamorphic:
        break;
    case Box: // letter box
        VerticalScale = 12.0/16.0;
        VerticalOffset = Height*(1.0- VerticalScale)/2.0;
        break;
    case 14x9:
        HorizontalScale = 14.0/12.0;
        VerticalScale = 12.0/14.0;
        HorizontalOffset = Width*(1.0- HorizontalScale)/2.0;
        VerticalOffset = Height*(1.0- VerticalScale)/2.0;
        HorizontalCrop = Width/14;
        break;
    case Crop:
        HorizontalScale = 16.0/12.0;
        HorizontalOffset = Width*(1.0- HorizontalScale)/2.0;
        HorizontalCrop = Width/8;
        break;
    }
}
CropLeft = HorizontalCrop;
CropRight = HorizontalCrop;
CropTop = VerticalCrop;
CropBottom = VerticalCrop;
switch (Justify)
{
case TopLeft:
case MiddleLeft:
case BottomLeft:
    CropLeft = 0;
    CropRight = 2 * HorizontalCrop;
    HorizontalPosition = -HorizontalOffset;
    break;
case TopCenter:
case MiddleCenter:
case BottomCenter:
    HorizontalPosition = 0;
    break;
case VM_AJ_TopRight:
case VM_AJ_MiddleRight:
```

```
        case VM_AJ_BottomRight:
            CropLeft = 2 * HorizontalCrop;
            CropRight = 0;
            HorizontalPosition = HorizontalOffset;
            break;
    }
    switch (Justify)
    {
    case VM_AJ_TopLeft:
    case VM_AJ_TopCenter:
    case VM_AJ_TopRight:
        CropTop = 0;
        CropBottom = 2 * VerticalCrop;
        VerticalPosition = -VerticalOffset;
        break;
    case VM_AJ_MiddleLeft:
    case VM_AJ_MiddleCenter:
    case VM_AJ_MiddleRight:
        VerticalPosition = 0;
        break;
    case VM_AJ_BottomLeft:
    case VM_AJ_BottomCenter:
    case VM_AJ_BottomRight:
        CropTop = 2 * VerticalCrop;
        CropBottom = 0;
        VerticalPosition = VerticalOffset;
        break;
    }
```

The foregoing technique of automatic aspect ratio transformation processing may performed alone, or in combination with, other digital video effects. If aspect ratio transformation is performed in combination with one or more other effects, the code on the computer system as described above and elsewhere herein determines control parameters representing the combination thereof. For purposes of illustration and example, the foregoing code snippet is an illustration of processing performed when determining control parameters for only the automatic aspect ratio transformation processing. The code may also include setting the control parameters accordingly if the input and output aspect ratios are the same so that the Effects FPGA does not transform or convert the input image to a different aspect ratio.

Figure 49:
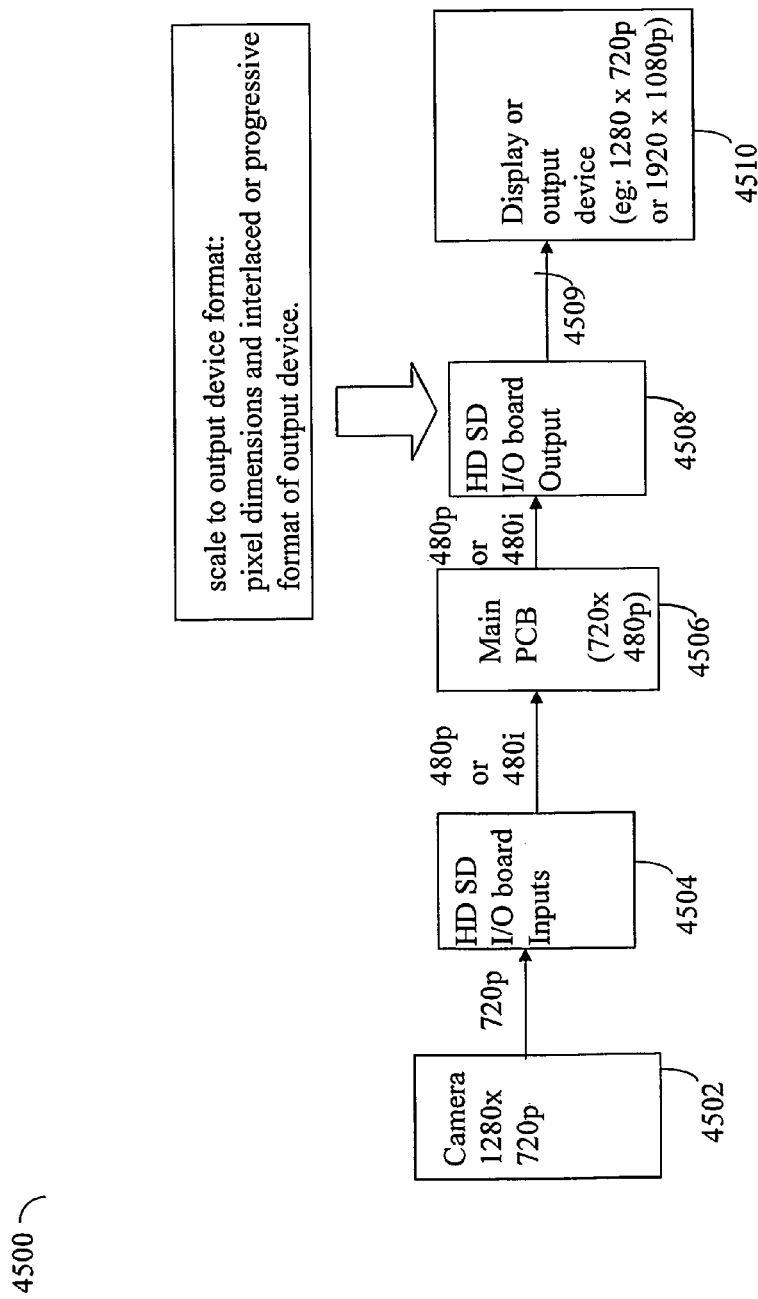
FIG. 49 is an example illustrating components that may be used in an embodiment to convert to output device format.

Referring to FIG. 49, shown is an example illustrating another technique that may be performed in an embodiment in connection with components described herein. The example 4500 illustrates components described elsewhere herein. The example 4500 includes as an example input source a camera 4502 producing images that are 1280×720p transmitted to the HD SD I/O board 4504 as an input. Element 4502 may represent one of the possible video input sources. The HD SD I/O board as previously illustrated in FIG. 25 may be represented as element 4504. As described herein, the HD SD I/O board 4504 sends input signals to the Main PCB 4506 as either 480p or 480i. The Main PCB of FIG. 21 may be represented as element 4506 and performs processing in 720× 480p. The Main PCB 4506 generates a signal in either 480i or 480p which is sent to the HD SD I/O board 4508. It should be noted that elements 4504 and 4508 represent the same physical component but are included as in 4500 to input and output signals determined at various points in time. Element 4508 generates and output signal 4509 which is sent to the display or output device 4510. In this example, the device 4510 may operate using pixel dimensions of 1280×720p or 1920×1080p. If the device 4510 receives an image for processing which does not have the pixel dimensions matching that of the device, the device 4510 scales the received image to pixel dimensions corresponding to those used by the device. For example, if the signal sent from the Main PCB 4506 to the HD SD I/O board 4508 is 480p, the component 4508 may output an image on 4509 which is 480p. In turn, the device 4510 scales the image to the pixel dimensions used by 4510 incurring additional time delay prior to displaying or broadcasting the output.

Rather than output a signal on 4509 that is 480p, an embodiment may have the HD SD I/O board 4508 perform scaling of the output to match the pixel dimensions of the output device 4510. With reference to FIG. 25, an embodiment may have the chip represented by element 1508e perform such scaling so that the image of the output matches the pixel dimensions of the output device 4510.

Figure 50A:
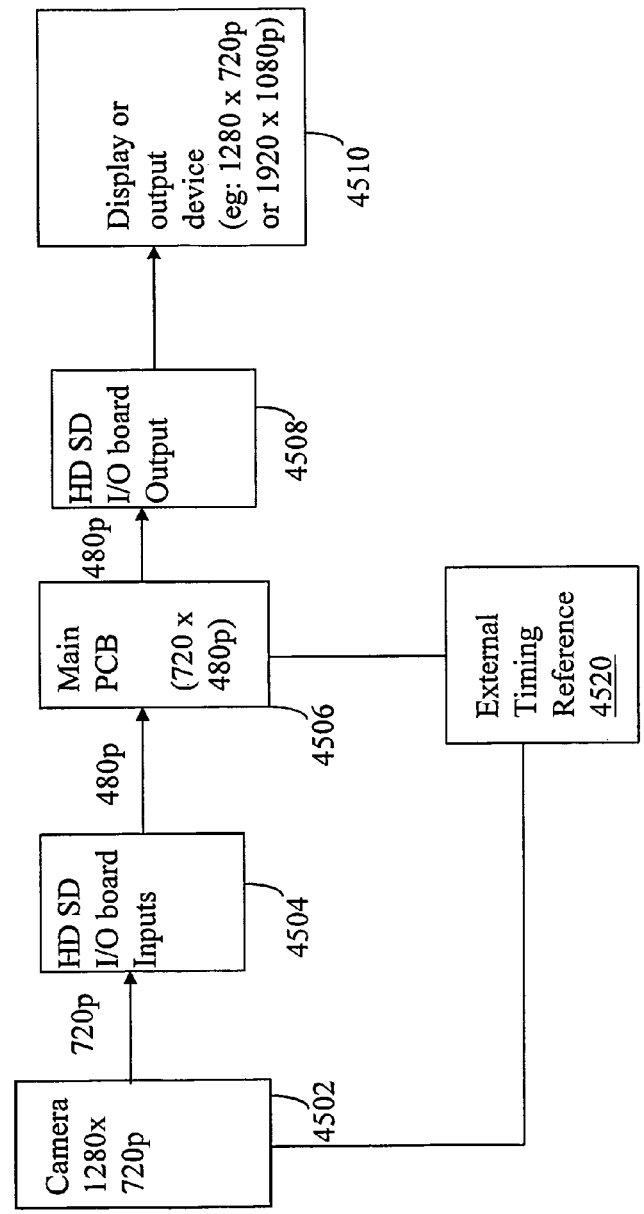
FIG. 50A is an example illustrating components that may be used in an embodiment in connection with operating in low latency mode.

Referring to FIG. 50A, shown is an example illustrating components that may be used in an embodiment operating in a low latency mode. The components of FIG. 50A correspond to those as illustrated in connection with FIG. 49 transmitting signals between 4504, 4506 and 4508 which are 480p. Also, the example 4600 includes an external timing reference 4520 connected to the Main PCB 4506 and the input 4502. To operate in low latency mode, the chips included on the HD SD I/O board represented by elements 1508a-1508e are set to operate in 480p low latency mode. As known in the art, setting the foregoing components to operate in low latency mode causes the chips to output results asynchronously so that the chips generated output signals when done rather than on a frame time boundary. Elements 4802 and 4806 are connected to an external timing source 4506 to delay or shift the internal timing by a specified time delay. In one embodiment, the time delay may be 4.6 ms and is selected in accordance with an amount of time it takes for 4504 to convert an image from the input source 4502 (e.g., 720p) to 480p as used by the main PCB 4506. If an input source has different pixel dimensions and/or operates in interlaced rather than progressive, the time delay may be accordingly adjusted to reflect the amount of time for this conversion to 480p. Introducing the time delay of 4.6 ms causes the Main PCB 4506 to process HD SD I/O inputs (e.g., from elements 1508a-1508d of FIG. 25) at intervals of a frame time+4.6 ms.

As noted herein, the main PCB 4506 performs processing thereon in 480p mode so that any input to 4506 which is 480i is converted to 480p prior to further processing by 4506. Thus, transmitting signals between 4504, 4506 and 4508 which are 480p reduces delays incurred by any conversion needed so that component 4506 can operate in its native 480p format.

Figure 50B:
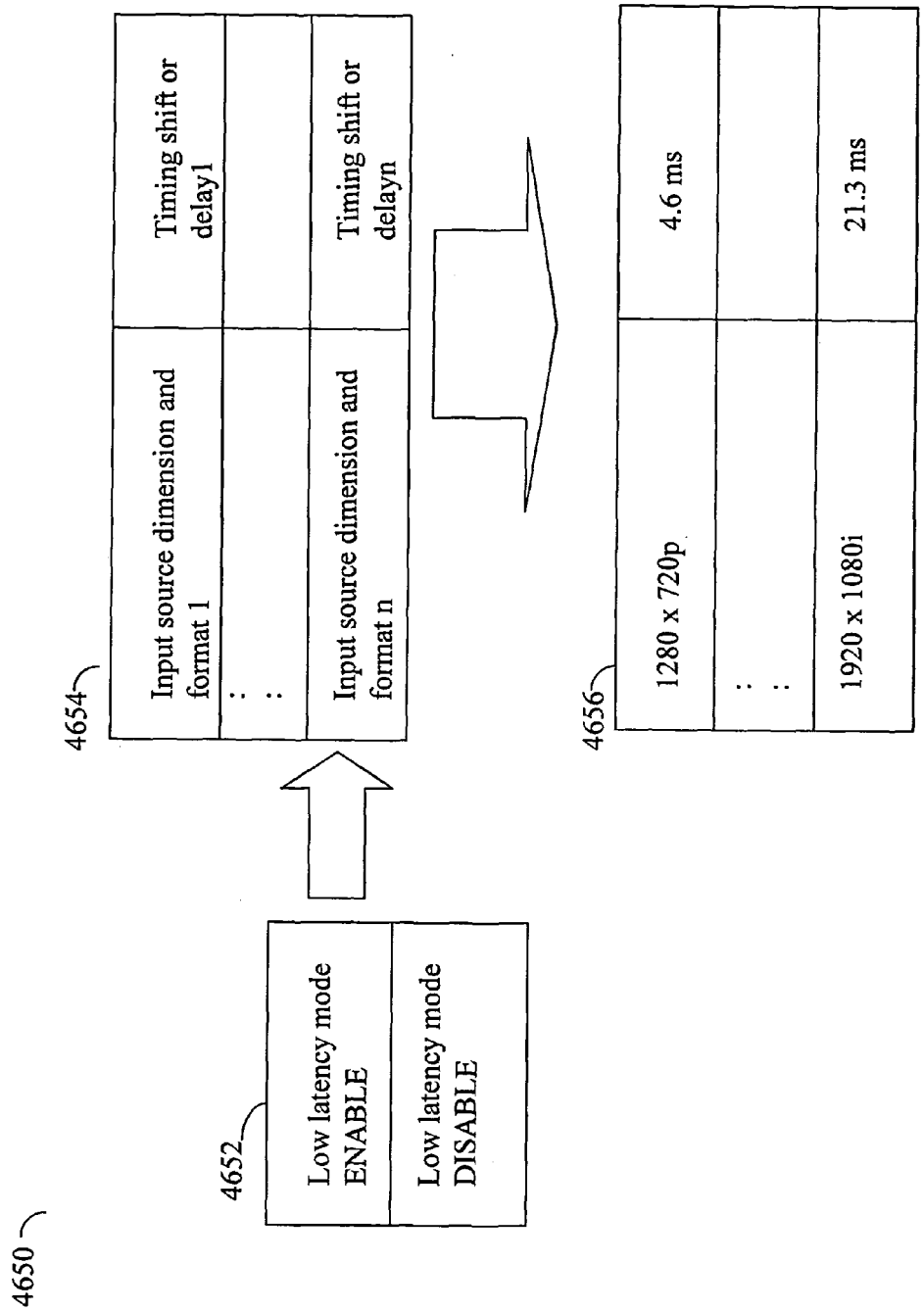
FIG. 50B is an example illustrating a low latency mode enablement feature that may be included in an embodiment using the techniques herein.

Referring to FIG. 50B, shown is an example illustrating selection of an option to enable or disable low latency mode operation. An embodiment may provide a user with a selectable option as illustrated by 4562 via a user interface. The user may configure or set options in connection with operation of a system by executing software on a computer system, such as with the workstation described elsewhere herein. The user may select the top option of 4652 to enable low latency mode as just described. Such selections may be made prior to using the system or modified at a point in time while the system is in operation. Selection of the top option of 4652 to enable low latency mode may cause the system to automatically select an appropriate time delay affecting the timing of components 4502 and 4506 of FIG. 50A. The computer system may include a table of time delays 4654 from which an entry may be selected based on the input source pixel dimensions and format (interlaced or progressive). As described above, the time shift or delay selected may be predetermined and stored in the table based on how long it takes the HD SD I/O board to convert from the input source pixel dimensions and format to 480p. Element 4656 illustrates more specifically information that may be included in such a table of time delays in an embodiment. If the input source changes such as by switching input sources for a show, the system may automatically perform any needed adjustments to the time delay by selecting the appropriate entry from the table 4656 in accordance with the input source pixel dimensions and format. It should be noted that the values provided in table 4656 and elsewhere herein represent approximate values for one embodiment. The timing values, such as those included in table 4656 and elsewhere herein, may vary with embodiment.

Attributes or characteristics of an input source, such as related to pixel dimensions of images therefrom and whether the source operates using interlaced or progressive format, may be determined in a variety of different ways that may vary with embodiment and input source. For example, characteristics or attributes of an input source may be specified by a user when configuring a system, determined by interrogating or sensing device characteristics through communicating with the input source, specified as system defaults, and the like. Characteristics or attributes of an output may also be determined in a manner similar to those described herein for input sources.

Figure 51:
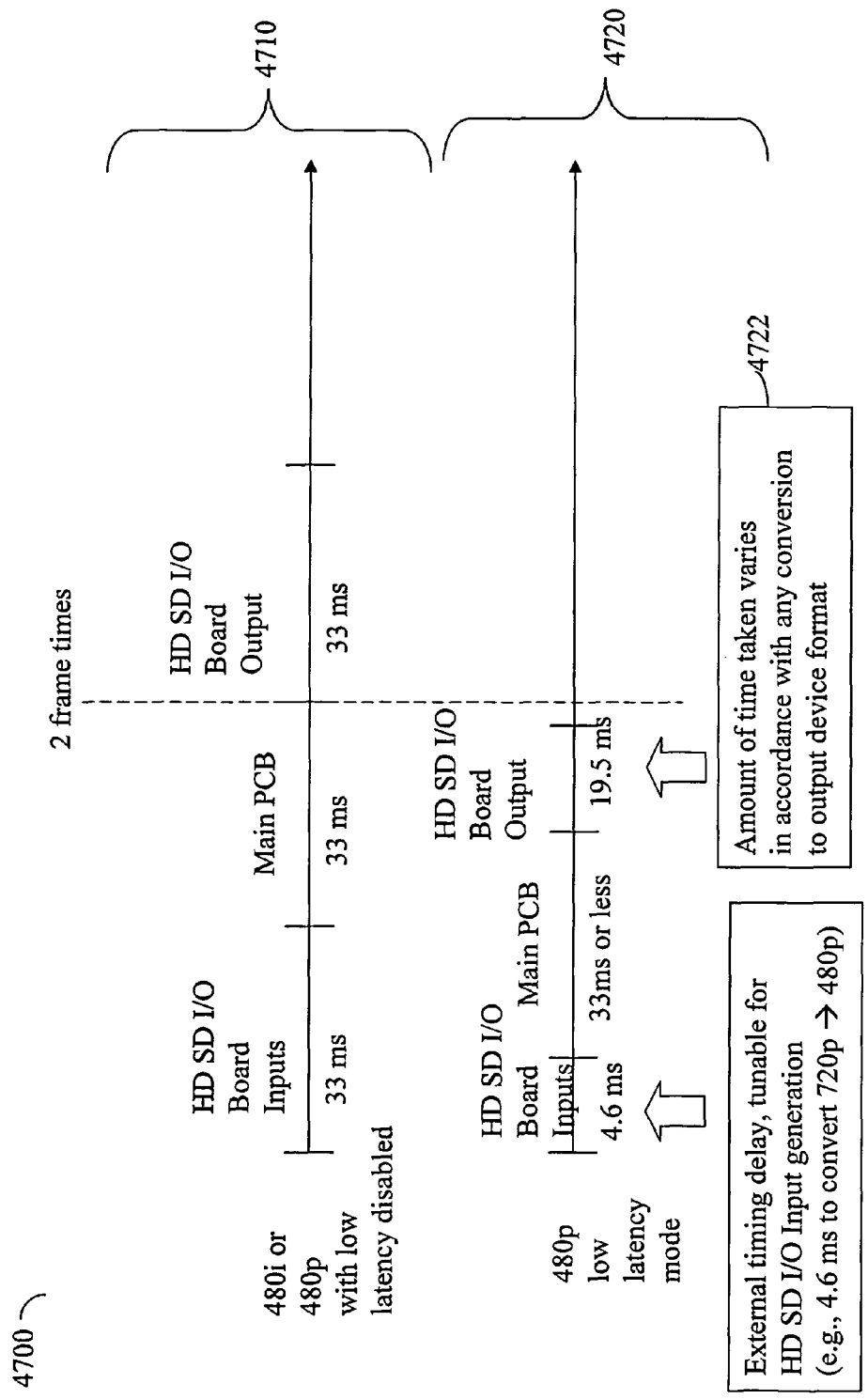
FIG. 51 is an example illustrating timing diagrams of an embodiment using the techniques herein.

Referring to FIG. 51, shown is an example of timing diagrams associated with low latency mode disabled and enabled. The example 4700 includes a first timing diagram 4710 illustrating timing in one embodiment with low latency mode disabled with output from the HD SD I/O board (e.g., from chip 1508e of FIG. 25) available in 3 frame times. The second timing diagram 4720 illustrates timing as may occur in an embodiment with low latency mode enabled and using an external timing delay of 4.6 ms for the particular input device as illustrated in FIG. 50A. In an embodiment performing the scaling conversion as described in connection with FIG. 49 to match that of the output device, the second time delay indicated by 4722 (e.g., which may be 19.5 ms in one embodiment for a particular 1280×720p output device when converting from 480p) may also vary in accordance with the amount of time it takes to perform the necessary conversion from 480p to the output device format. With reference to 4720, the output from the HD SD I/O board (e.g., from chip 1508e of FIG. 25) is available in 2 frame times.

It should be noted that a system may be configured to run in low latency mode using other chips and components than as described herein.

Figure 52:
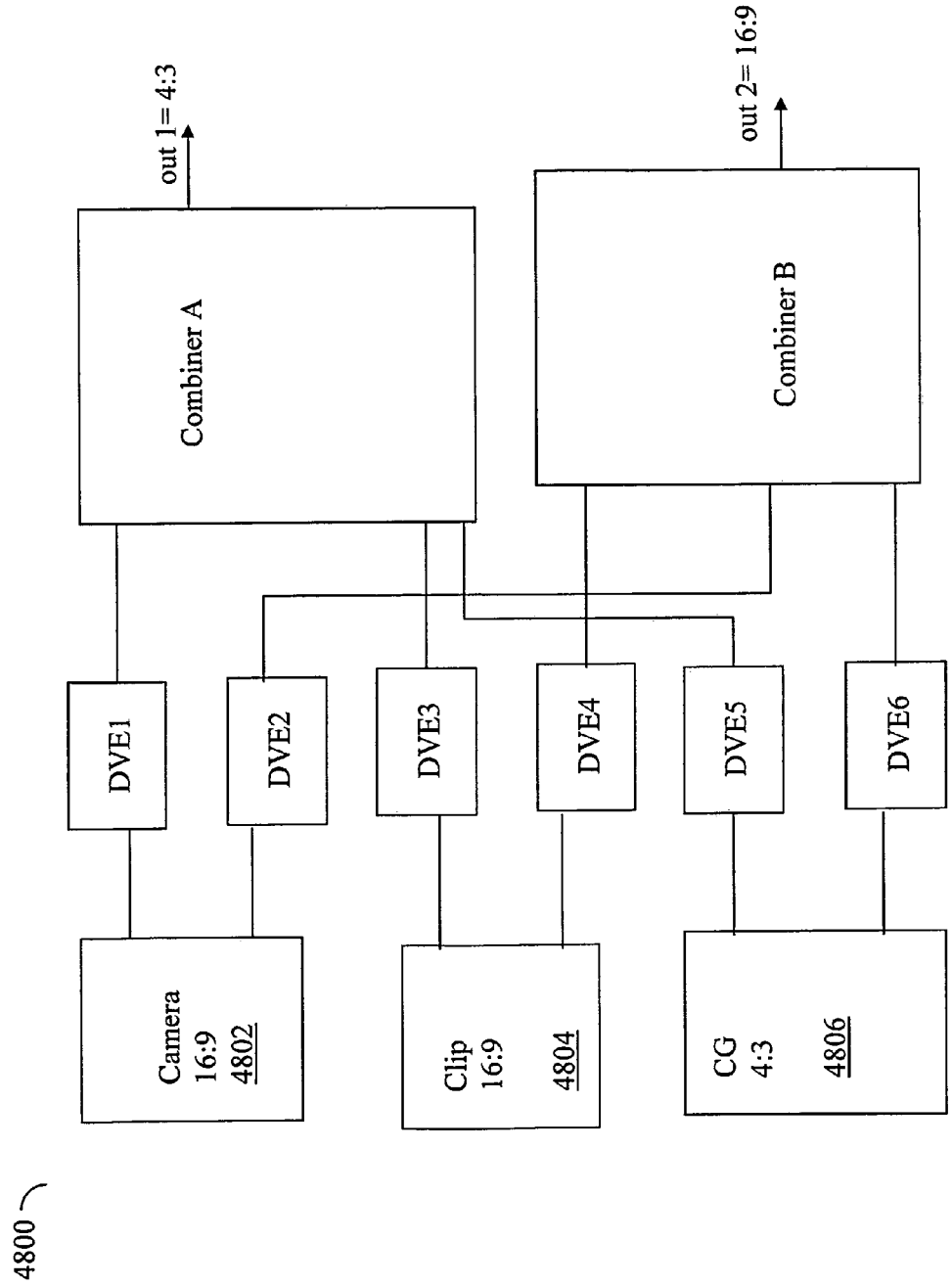
FIGS. 52 and 53 are examples illustrating embodiments of dual aspect ratio output using the techniques herein.

Referring to FIG. 52, shown is an example illustrating use of the techniques herein for dual aspect ratio output producing a first output having a first aspect ratio and a second output having a second aspect ratio. In this example 4800, aspect ratios of 4:3 and 16:9 are illustrated although the techniques may also be used with other aspect ratios. The example 4800 includes 3 input sources 4802, 4804, and 4806 having the indicated input aspect ratios. In an embodiment using the one pass or single pass architecture described herein, each of the DVEs 1-6 and combiners A and B may correspond, respectively, to one of the DVEs and combiners as illustrated in FIG. 29. Each of the DVEs 1-6 may receive the appropriate control parameters to perform automatic aspect ratio transformation processing alone, or in combination with applying video effects. When the aspect ratio of an input, such as 4802, matches that of an output, such as out 2 from combiner B, the DVE, such as DVE2, receives control parameters so that no conversion of the input source image to a different aspect ratio is performed. Thus, using the single pass architecture as described herein, multiple input sources having different aspect ratios may be combined to generate two outputs, each output having a different aspect ratio. The foregoing generation of two outputs each having a different aspect ratio may be performed using the single pass architecture by the Effects FPGA in one frame time or less.

In another embodiment not using the single pass architecture described herein, such as, for example, using components illustrated and described in connection with FIG. 15, the control parameters may be communicated to other components to perform the appropriate processing rather than communicating the control parameters to the main PCB and Effects FPGA.

Referring to FIG. 52, shown is another example illustrating use of the techniques herein for dual aspect ratio output producing a first output having a first aspect ratio and a second output having a second aspect ratio. The example 4800 illustrates another embodiment of the dual aspect ratio output technique that may be implemented using the single pass architecture as well as other hardware components which perform the processing needed based on the communicated control parameters. The example 4800 includes the same input sources as illustrated in FIG. 52 using 3 DVEs and a single combiner A of the main PCB/Effects FPGA 4810 generating out1 having aspect ratio 4:3. In this example, the HD SD I/O board may be configured to perform converting out1 to the pixel dimensions and format of the output device. As such, the first output, out 1, may be provided as an output in one aspect ratio which is converted by the HD SD I/O board if needed if the aspect ratio of the output device is 16:9. In this embodiment, control parameters may also be determined by the computer system and communicated to the HD SD I/O board so that the components thereon (e.g., such as chip 1508e of FIG. 25) performs digital video effect processing for automatic aspect ratio transformation processing as well as converting to the appropriate pixel dimensions and format of the output device. In such an embodiment in which the HD SD I/O board is performing conversion (e.g., scaling and conversion to progressive or interlaced) of the output to match characteristics of the output device, the automatic aspect ratio transformation processing for converting the 4:3 out1 to a 16:9 output (e.g., out2) can be performed as needed without additional time delay. If the output device has an aspect ratio of 4:3, as described herein, the control parameters communicated to the HD SD I/O board do not cause any aspect ratio conversion to be performed to out1 transmitted in 1514e.

The techniques described herein in connection with automatic aspect ratio transformation processing and dual aspect ratio output may be performed using the single pass architecture as described herein as well as other hardware components and architectures such as, for example, illustrated and described in connection with FIG. 15. With either architecture, code may be executed on a computer system to determine control parameters which are communicated to other components to perform the scaling, positioning, and the like.

It should be noted that the techniques and system described herein may be used in connection with a live production, for example, where the system output(s) are for a live television broadcast. The techniques and system herein may also be used in generating content which is stored, such as a recorded video. Subsequently, the same system and techniques described herein may be used to further process the first recorded video and generate a second recorded video which is a modified version of the first. For example, a first recorded video may be made from a live video camera input. The first recorded video may have a 16:9 aspect ratio. At a later point in time, the system and techniques herein may be used to select the first recorded video as the input to generate a second recorded video which has a 4:3 aspect ratio. Thus, using the techniques herein, an edited or modified version of the first recorded video may be generated in which the automatic aspect ratio transformation processing is applied, alone or in combination with other effects, to the first recorded video.

Figure 53:
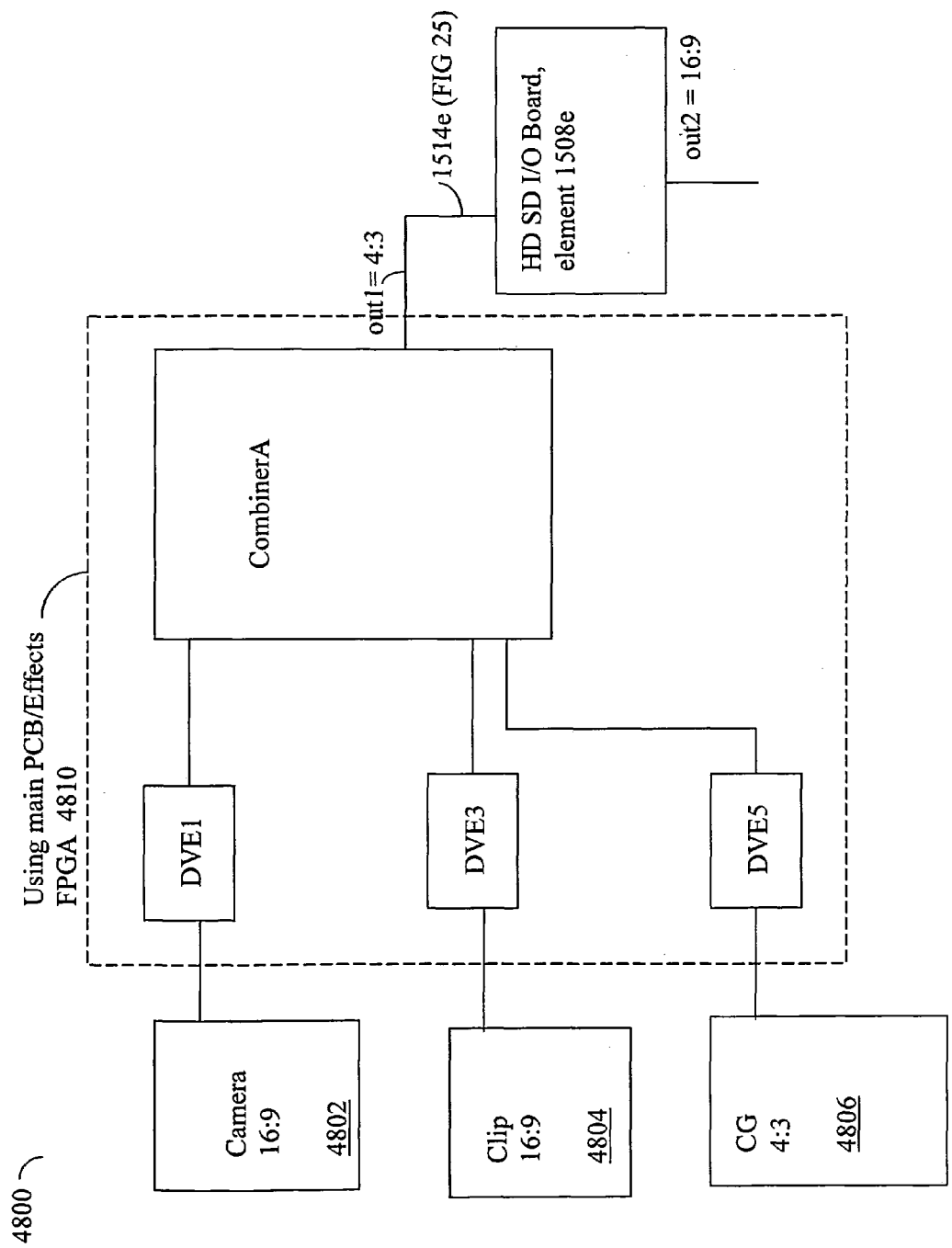

Also using the techniques herein, two outputs may be generated at a same time as illustrated, for example, in FIGS. 52 and 53.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing aspect ratio transformation comprising:
   receiving frames of image data from each of one or more input sources, wherein a first set of one or more options is associated with a first of said one or more input sources, said first set including a first input aspect ratio of said first input source;
   determining, for each frame received from said first input source, a set of control parameters, said determining being performed in accordance with said first input aspect ratio and an output aspect ratio; and
   performing processing of said each frame in accordance with said set of control parameters, said processing including first processing of a first image from said first input source having said first input aspect ratio to generate a second image having said output aspect ratio, wherein, said first processing includes converting said first image having said first input aspect ratio to said second image having said output aspect ratio if said first input aspect ratio is different from the output aspect ratio, and otherwise, as indicated by said set of control parameters, said first processing does not include performing said converting, and
   wherein said receiving receives image data from each of a plurality of input sources, wherein a different set of options is specified for each said plurality of input sources, each of said different set of options including an input aspect ratio of said each input source.

2. The method of claim 1, wherein said determining said set of control parameters is performed by code executing on a central processor of a computer system for each frame time and said set of control parameters is transmitted to a component of the computer system to perform said performing using said set of control parameters.

3. The method of claim 2, wherein said determining determines control parameters including one or more scaling parameters, one or more position parameters, and one or more cropping parameters.

4. The method of claim 1, wherein said first set of one or more options includes an aspect ratio treatment option and a justification option, said aspect ratio treatment option specifying a treatment option affecting how to transform frames from the first input source in said performing when converting from said first input aspect ratio to a different output aspect ratio, said justification option affecting how an image is positioned with respect to an output frame in said performing when converting from said first input aspect ratio to a different output aspect ratio.

5. The method of claim 4, wherein said aspect ratio treatment option specified for said first input source is selected from one of a plurality of options, said plurality of options including a box treatment option, a cropping treatment option, a 14:9 intermediate aspect ratio treatment option, and an anamorphic treatment option.

6. The method of claim 1, wherein said determining said set of control parameters includes performing processing to determine a combined effect of performing aspect ratio transformation processing for converting an image having said first input aspect ratio from said first input source to an image having said output aspect ratio when said first input aspect ratio and said output aspect ratio differ and one or more other video effects applied to said image from said first input source.

7. The method of claim 1, wherein said input sources include at least one of previously stored image data, data from a file stored on a storage device of a computer system, and previously stored video data.

8. A method for performing aspect ratio transformation comprising:
   receiving frames of image data from each of one or more input sources, wherein a first set of one or more options is associated with a first of said one or more input sources, said first set including a first input aspect ratio of said first input source;
   determining, for each frame received from said first input source, a set of control parameters, said determining being performed in accordance with said first input aspect ratio and an output aspect ratio; and
   performing processing of said each frame in accordance with said set of control parameters, said processing including first processing of a first image from said first input source having said first input aspect ratio to generate a second image having said output aspect ratio, wherein, said first processing includes converting said first image having said first input aspect ratio to said second image having said output aspect ratio if said first input aspect ratio is different from the output aspect ratio, and otherwise, as indicated by said set of control parameters, said first processing does not include performing said converting, and
   wherein said first set of one or more options includes an aspect ratio treatment option and a justification option, said aspect ratio treatment option specifying a treatment option affecting how to transform frames from the first input source in said performing when converting from said first input aspect ratio to a different output aspect ratio, said justification option affecting how an image is positioned with respect to an output frame in said performing when converting from said first input aspect ratio to a different output aspect ratio, wherein said justification option specified for said first input source is selected from one of a plurality of justification options, said plurality of justification options indicating whether to justify an image at a top, middle or bottom portion of an output frame and whether to justify an image at a left, center, or right portion of an output frame.

9. A method for performing aspect ratio transformation comprising:
   receiving frames of image data from each of one or more input sources, wherein a first set of one or more options is associated with a first of said one or more input sources, said first set including a first input aspect ratio of said first input source;
   determining, for each frame received from said first input source, a set of control parameters, said determining being performed in accordance with said first input aspect ratio and an output aspect ratio; and
   performing processing of said each frame in accordance with said set of control parameters, said processing including first processing of a first image from said first input source having said first input aspect ratio to generate a second image having said output aspect ratio, wherein, said first processing includes converting said first image having said first input aspect ratio to said second image having said output aspect ratio if said first input aspect ratio is different from the output aspect ratio, and otherwise, as indicated by said set of control parameters, said first processing does not include performing said converting, wherein said one or more input sources include a plurality of input sources, and the method further comprising:
  defining a plurality of sets of options, each of said plurality of sets of options being associated with one of the plurality of input sources, each of said plurality of sets of options including an input aspect ratio for images received from said one input source;
  selecting a first of said plurality of input sources associated with one of said plurality of sets of options, wherein said determining and said performing processing are performed in accordance with said first set of options; and
  selecting a different one of said plurality of input sources to be used in place of said selected one of said plurality of input sources, and wherein, in response to said selecting, said determining and said performing processing are performed in accordance with a different one of said plurality of sets of options associated with said different one of said plurality of input sources.

10. A method for performing aspect ratio transformation comprising:
  receiving a plurality of frames of image data from a plurality of input sources each having an associated input aspect ratio;
  performing, for each frame of image data received from each of said plurality of input sources, processing to mathematically combine one or more video effects to be applied to each of said plurality of input sources, wherein said video effects include converting from an input aspect ratio for said each input source to a first output aspect ratio only when said input aspect ratio and said first output aspect ratio differ, and wherein said video effects include converting from said input aspect ratio for said each input source to a second output aspect ratio only when said input aspect ratio and said second output aspect ratio differ;
  determining, for each frame from each of said plurality of input sources in accordance with said performing, a first set of control parameters in accordance with an input aspect ratio of said each frame and said first output aspect ratio, and a second set of control parameters in accordance with said input aspect ratio of said each frame and said second output aspect ratio;
  determining a third set of control parameters and a fourth set of control parameters, each of said third set and said fourth set used to combine one or more output frames;
  processing each of said plurality of frames from each of said plurality of input sources to generate a corresponding one of the output frames having said first output aspect ratio in accordance with the first set of control parameters;
  processing each of said plurality of frames from each of said plurality of input sources to generate a corresponding one of the output frames having said second output aspect ratio in accordance with the second set of control parameters; and
  combining a first portion of the output frames having said first output aspect ratio into a first result frame in accordance with said third set of control settings; and
  combining a second portion of the output frames having said second output aspect ratio into a second result frame in accordance with said fourth set of control settings.

11. The method of claim 10, wherein each of said plurality of input sources is associated with one of a plurality of sets of options, each of said plurality of sets of options including an input aspect ratio of said each input source.

12. The method of claim 11, wherein each of said plurality of sets of options includes an aspect ratio treatment option and a justification option, said aspect ratio treatment option specifying a treatment option affecting how to transform frames of said each input source when converting from said input aspect ratio to a different output aspect ratio, said justification option affecting how an image is positioned with respect to an output frame when converting frames from said each input source having said input aspect ratio to a different output aspect ratio.

13. The method of claim 10, wherein at least one of said plurality of input sources has an input aspect ratio different from another input aspect ratio of at least one other of said plurality of input sources.

14. The method of claim 13, wherein said performing, said determining a first set of control parameters and a second set of control parameters, and said determining a third set and a fourth set of control parameters are performed by code executed on a computer system, and the method includes:
  communicating the first sets of control parameters, said second set of control parameters, said third set of control parameters, and said fourth set of control parameters to a component included in the computer system, said component performing said processing to generate a corresponding one of the output frames having said first output aspect ratio, said processing to generate a corresponding one of the output frames having said second output aspect ratio, said combining said first portion of the output frames, and said combining said second portion of the output frames.

15. A system comprising:
  one or more frames of one or more input sources, wherein one or more frames of said one or more input sources are received for a frame time, each of said one or more input sources received on an associated input line;
  first computer readable memory including first instructions thereon to determine a set of one or more control parameters for each frame associated with each of said input sources for the frame time, said set of one or more control parameters used to control processing performed by a first component programmed to apply one or more video effects to a frame from said each input source, said one or more video effects for said each input source including converting a first frame received from said each input source having a first input aspect ratio to a second frame having an output aspect ratio when said first input aspect ratio and said output aspect ratio differ, wherein said set of one or more control parameters associated with said each input source are determined in accordance with said first input aspect ratio and said output aspect ratio, and the one or more control parameters include scaling and positioning parameters;
  a processor that executes said first instructions; and
  said first component configured to perform processing in accordance with said set of the one or more control parameters for each of one or more input sources, said processing including scaling and positioning of the one or more frames from the one or more input sources for a frame time using the scaling and positioning parameters for each of the one or more frames to generate one or more corresponding frames having said output aspect ratio, wherein the set of one or more control parameters for each of the one or more frames associated with one of the input sources is communicated to the first component.

16. The system of claim 15, wherein said first component generates a first component output having said output aspect ratio, and the system further comprising:
- a second component that receives as an input said first component output having a first format and generates a second component output having a second format in accordance with an output device, said second component performs processing including converting said first component output having said first format to said second component output having said second format, said first format having a first set of pixel dimensions and being one of interlaced or progressive, said second format having a second set of pixel dimensions and being one of interlaced or progressive.

17. The system of claim 16, wherein said first component generates a first output frame as said first component output having said output aspect ratio, wherein said first instructions of said first computer readable memory include instructions to determine a second set of one or more control parameters used to control processing performed by said second component; wherein the second set of control parameters is communicated to the second component; and wherein said second component processes said first output frame in accordance with said second set of control parameters to generate a second output frame as said second component output having said second output aspect ratio.

18. The system of claim 15, wherein said first component is selectively enabled or disabled to run in a low latency mode.

19. The system of claim 18, wherein, when said first component is enabled to run in low latency mode, said first component performs processing in accordance with an external timing delay determined in, accordance with an amount of time it takes to convert a frame from a format of an input source to another format used when communicating with said first component.

20. The system of claim 15, wherein said first instructions determine a first set of control parameters for a first of said one or more input sources in accordance with a first input aspect ratio of said first input source and said output aspect ratio, said first instructions determine a second set of control parameters for said first input source in accordance with said first input aspect ratio and a second output aspect ratio, said first component generating, from a first input frame from said first input source and in accordance with said first set of control parameters, a first output frame having said output aspect ratio in accordance with said first set of control parameters, and said first component generating, from said first input frame and in accordance with said second set of control parameters, a second output frame having said second output aspect ratio.

21. A system comprising:
- a plurality of input sources each having a set of options associated therewith, said set of options for each of said plurality of input sources including an input aspect ratio of said each input source;
- first instructions stored on a non-transitory computer readable medium for determining, for each frame from each of said plurality of input sources for a frame time, a set of control parameters used to control a first component that applies one or more video effects to said each frame, wherein, if said input aspect ratio of said each frame differs from an output aspect ratio, said set of control parameters includes scaling and positioning parameters incorporating an aspect ratio conversion of said each frame from said input aspect ratio to said output aspect ratio, and if said input aspect ratio matches said output aspect ratio, said set of control parameters includes scaling and positioning parameters which do not incorporate aspect ratio conversion, wherein said set of control parameters for each of said plurality of input sources for one or more frame times is communicated to said first component; and
- said first component configured to perform processing in accordance with said set of control parameters for each frame from each of said plurality of input sources for a frame time, said processing including applying said one or more video effects to said each frame by performing scaling and positioning of said each frame in accordance with said scaling and positioning parameters included in said set of control parameters, wherein if said input aspect ratio of said each frame is different from said output aspect ratio, said processing includes performing scaling and positioning of said each frame incorporating aspect ratio conversion from said input aspect ratio to said output aspect ratio.

22. The system of claim 21, wherein said set of options for each of said plurality of input sources are stored on a storage area, and said set of options for each of said plurality of input sources includes an aspect ratio treatment option and a justification option, said aspect ratio treatment option specifying a treatment option affecting how to transform frames of said each input source when converting from said input aspect ratio of said each input source to a different output aspect ratio, said justification option affecting how an image is positioned with respect to an output frame when converting frames from said each input source having said input aspect ratio to a different output aspect ratio.

23. The system of claim 21, wherein said control parameters include one or more cropping parameters indicating a number of pixels to be removed from each row and each column relative to a side of an input frame.

24. A system comprising:
- one or more input sources, wherein frames of images data are received from each of said one or more input sources and wherein a first set of one or more options is associated with a first input source, said first set including a first input aspect ratio of said first input source;
- executable code stored on a non-transitory computer readable medium for performing processing including determining, for each frame received from said first input source, a set of control parameters, said determining being performed in accordance with said first input aspect ratio and an output aspect ratio;
- a processor for executing said executable code; and
- a first component that performs processing of said each frame in accordance with said set of control parameters, said processing by said first component including first processing of a first image from said first input source having said first input aspect ratio to generate a second image having said output aspect ratio, wherein, said first processing includes converting said first image having said first input aspect ratio to said second image having said output aspect ratio if said first input aspect ratio is different from the output aspect ratio, and otherwise, as indicated by said set of control parameters, said first processing does not include performing said converting wherein said set of control parameters is communicated to said first component.

25. The system of claim 24, wherein said control parameters include scaling, positioning and cropping parameters.

* * * * *